United States Patent
Satou et al.

(12) 
(10) Patent No.: US 6,366,358 B1
(45) Date of Patent: Apr. 2, 2002

(54) METHOD AND APPARATUS FOR DETECTING STRIPE DEFECTS OF PRINTED MATTER

(75) Inventors: Hiroshi Satou; Hideto Sakata; Masahiko Soeda; Kenta Hayashi, all of Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 09/077,553

(22) PCT Filed: Oct. 8, 1997

(86) PCT No.: PCT/JP97/03611

§ 371 Date: Jun. 1, 1998

§ 102(e) Date: Jun. 1, 1998

(87) PCT Pub. No.: WO98/15919

PCT Pub. Date: Apr. 16, 1998

(30) Foreign Application Priority Data

Oct. 9, 1996 (JP) .............................................. 8-268375
Nov. 29, 1996 (JP) .............................................. 8-319230
Aug. 7, 1997 (JP) .............................................. 9-212976
Aug. 7, 1997 (JP) .............................................. 9-213211
Aug. 7, 1997 (JP) .............................................. 9-213212

(51) Int. Cl.$^7$ .................................................. G06K 15/00
(52) U.S. Cl. ........................................ 358/1.14; 358/1.9
(58) Field of Search ............................ 358/1.1, 1.5, 1.7, 358/1.9, 1.12, 1.13, 1.14, 455; 382/112, 148, 210, 274, 278, 280, 257; 348/126, 125, 127, 129; 259/559, 561

(56) References Cited

U.S. PATENT DOCUMENTS 4,172,524 A * 10/1979 Holm et al. ................. 209/524
4,185,298 A * 1/1980 Billet et al. .................. 348/129
4,692,943 A * 9/1987 Pietzsch et al. ............. 382/148
5,060,281 A * 10/1991 Ohnishi ....................... 382/112
5,517,234 A * 5/1996 Gerber et al. ............... 348/126
5,619,596 A * 4/1997 Iwaki et al. ................. 382/278
5,621,825 A * 4/1997 Masaki et al. .............. 382/274

FOREIGN PATENT DOCUMENTS

| JP | A-63-19078 | 1/1988 |
|---|---|---|
| JP | A-3-264359 | 11/1991 |
| JP | A-7-175926 | 7/1995 |
| JP | A-7-234933 | 9/1995 |

* cited by examiner

*Primary Examiner*—Gabriel Garcia
(74) *Attorney, Agent, or Firm*—Oliff & Berridge PLC

(57) ABSTRACT

A printed matter inspection method and device which detects a defect on the printed matter including a partially inputting camera capable of being moved in a width direction of the printed matter by a mover which inputs a partial image of a pattern on the printed matter and a whole image inputting camera disposed apart from the partially inputting camera by a predetermined distance in the direction the printed matter flows which inputs a whole image including the whole pattern and coordinating, based on a relationship between a position on the whole image, of the partial image and a width-directionwise reference point set on the whole image, the width-directionwise position on the whole image and the width-directionwise position on the mover with each other, when the partially inputting camera is located on an origin set on the mover, positioning and then setting a photographing point, which is to be input by said partially inputting camera, on said whole image, calculating a width-directionwise pixel number between said set photographing point and said width-directionwise reference point on said whole image, multiplying said calculated width-directionwise pixel number by a width-directionwise resolution of said whole image to calculate the width-directionwise moving amount on said moving mechanism; moving said partially inputting camera up to a target position corresponding to said width-directionwise moving amount; and inputting said partial image at an arbitrary timing by said partially inputting camera moved up to said target position.

16 Claims, 61 Drawing Sheets

INSPECTION POINT

MASK IMAGE (A) (ADDED IMAGE)

(B) (MASKED EDGE IMAGE)

FIG.26
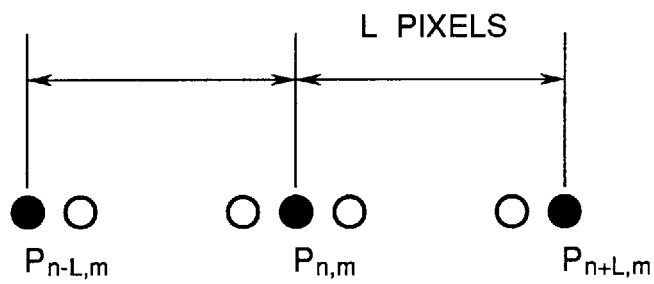
FIG.27
(METHOD OF CALCULATING EXPANSION FREQUENCY N)
$N = N_A + N_B$
L-W+ (W-1)/2
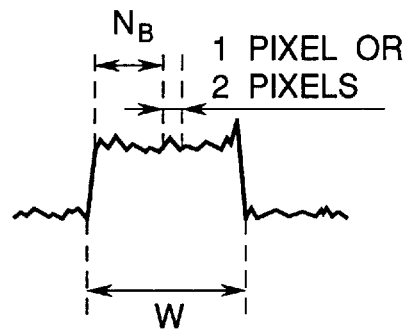
(A)
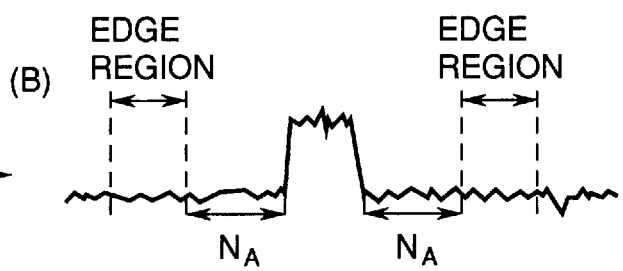
(B)
LENGTH (PIXELS) OF FLAT PORTION FROM EDGE TO EDGE REGION

FIG.34 {
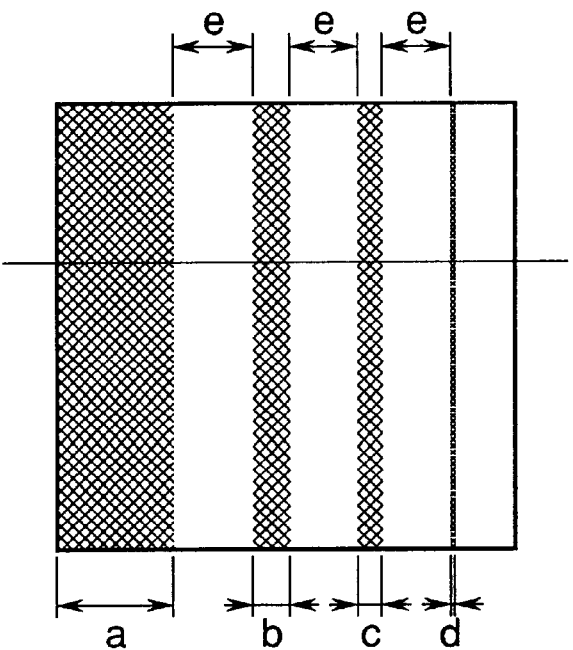
(A)
EDGE REGION EXTRACTION
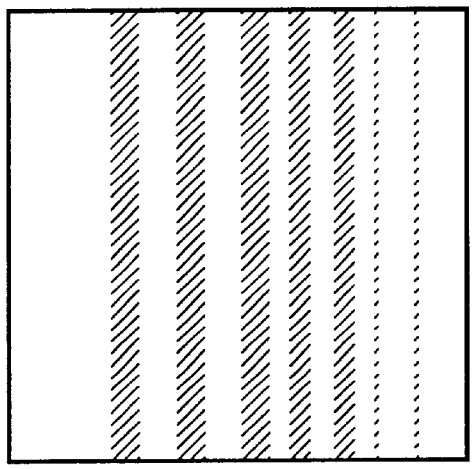
(C)
}

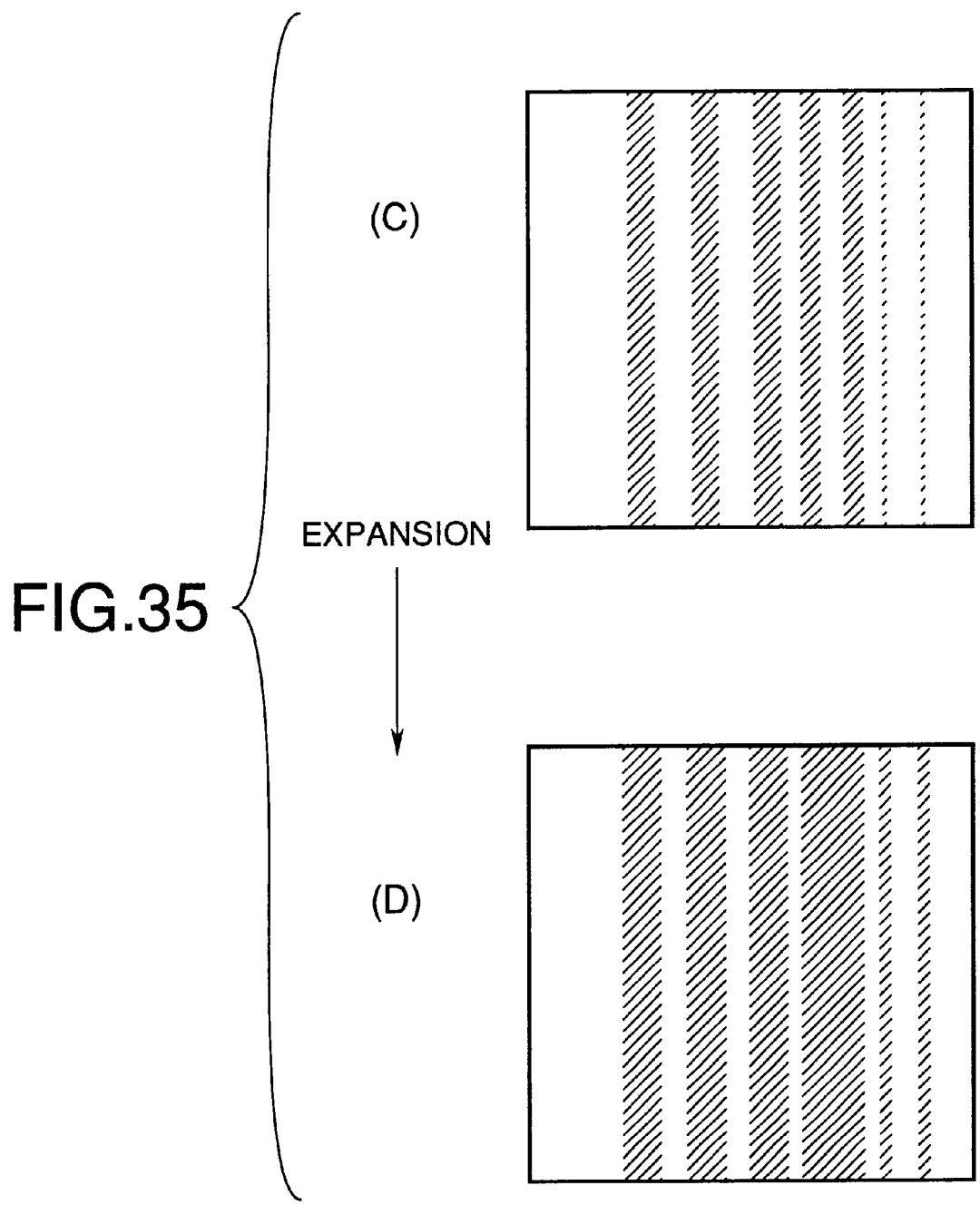

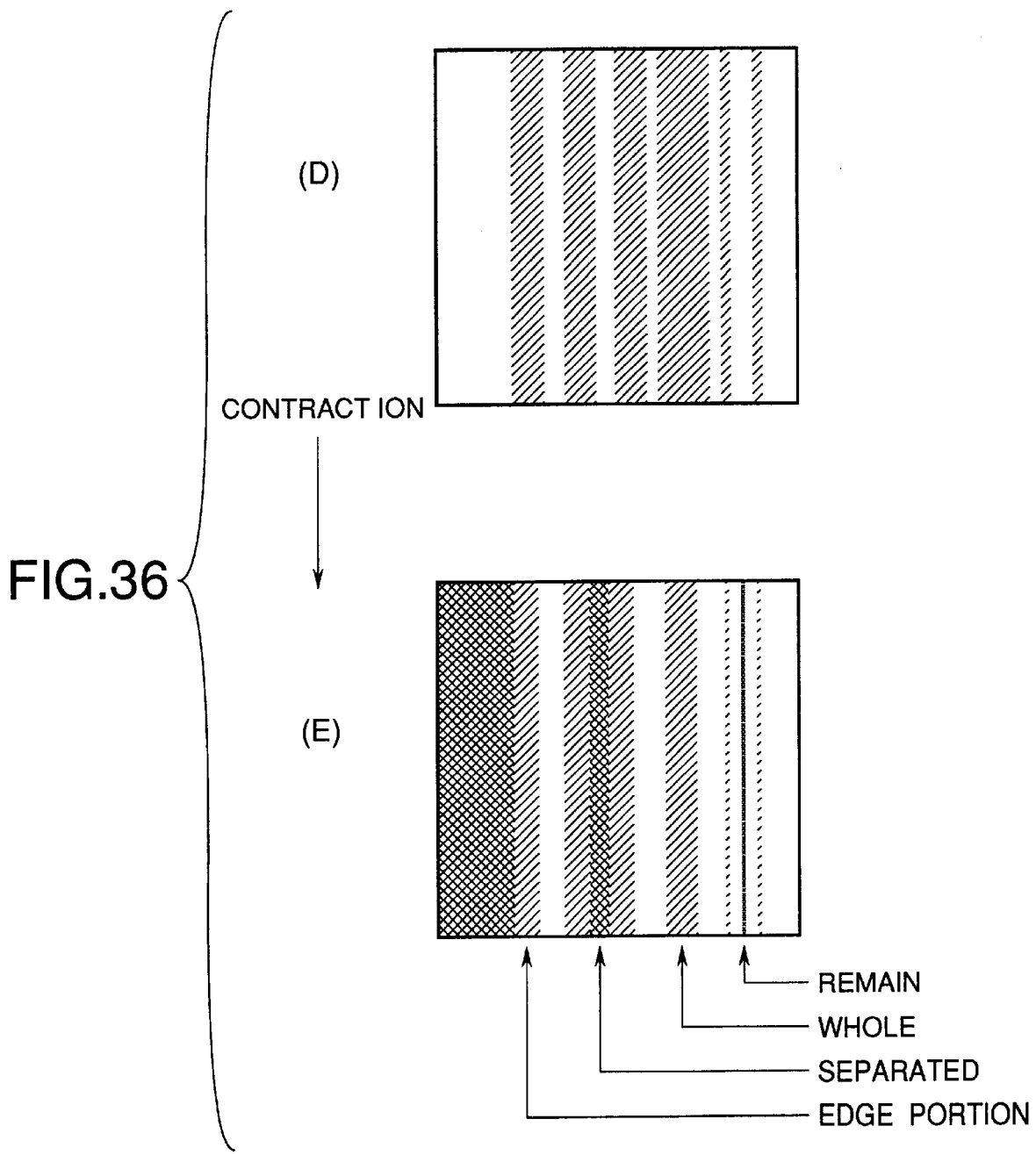

(IMAGE TO BE INSPECTED)

(MASK IMAGE)

(EDGE IMAGE)

(MASKED EDGE IMAGE)

- CONDITION IN WHICH CONTRACTION IS CARRIED OUT BY $P_1$ TIMES

EDGE REGION HAVING THE WIDTH OF W AT MOST

- CONDITION IN WHICH CONTRACTION IS FURTHER CARRIED OUT BY $(W+1)/2$

EDGE REGION DISAPPEARS

FIG. 46
- CONDITION IN WHICH CONTRACTION IS CARRIED OUT BY $P_1$ TIMES
(A) · NOT MORE THAN W
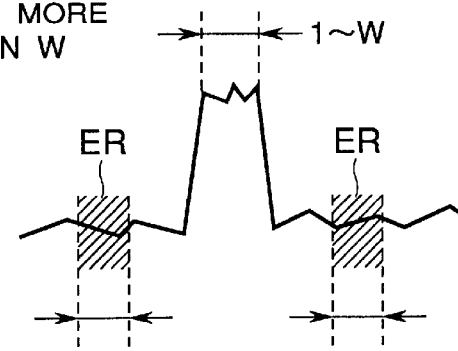
ENSURE EDGE REGION OF 1 TO W
(B) · WIDTH MORE THAN W
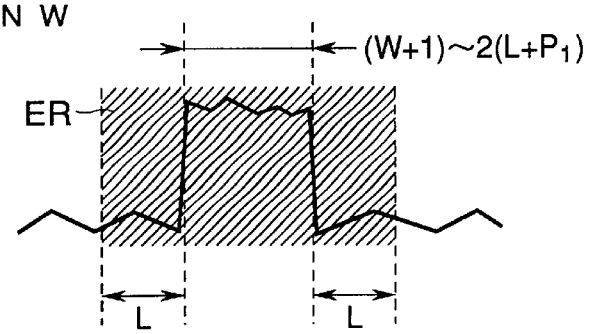
(C) · WIDTH SUFFICIENTLY MORE THAN W
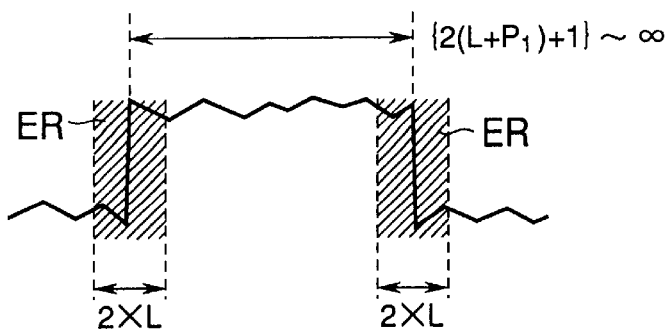

FIG.47
- CONDITION IN WHICH CONTRACTION IS FURTHER CARRIED OUT BY (L-1) TIMES
(A) · NOT MORE THAN W BECAUSE W≦L HOLDS,
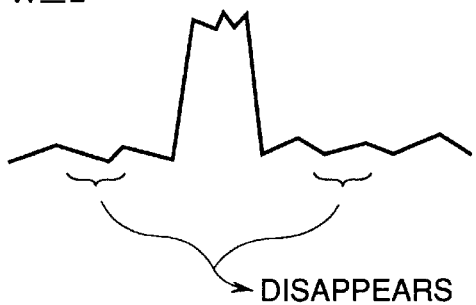
(B) · WIDTH MORE THAN W
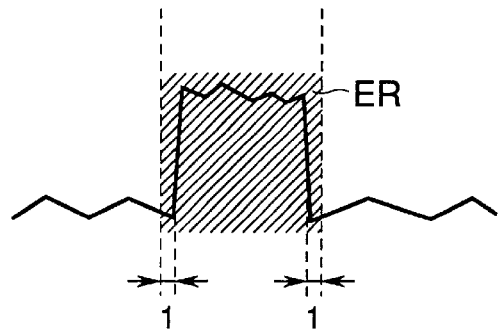
(C) · WIDTH SUFFICIENTLY MORE THAN W
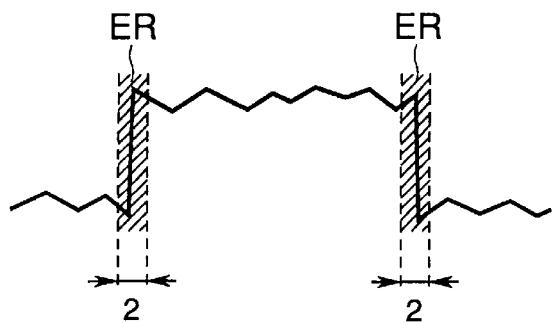

FIG.51
(A) R LONGITUDINALLY ADDED IMAGE
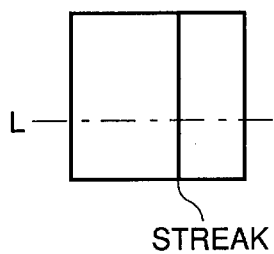
STREAK
(B) G LONGITUDINALLY ADDED IMAGE
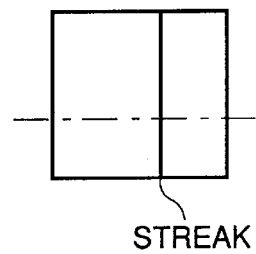
STREAK
(C) B LONGITUDINALLY ADDED IMAGE
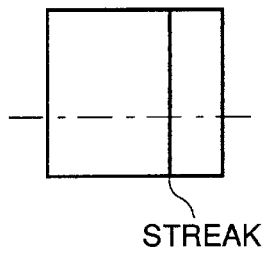
STREAK
(D)
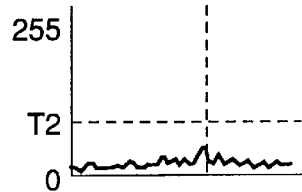
(E)
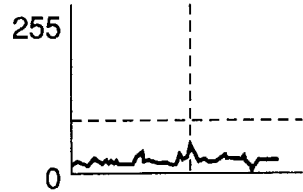
(F)
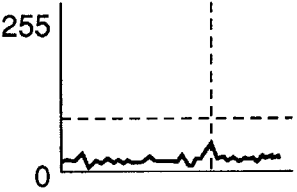
 OK JUDGMENT
 OK JUDGMENT
 OK JUDGMENT
⇩
OK JUDGMENT

METHOD AND APPARATUS FOR DETECTING STRIPE DEFECTS OF PRINTED MATTER

TECHNICAL FIELD

The present invention relates to a streak-like defect inspecting method for a printed matter and device therefor, an edge region extracting method for use in the inspection and device therefor, a binary image preparing method and a device therefor, an image inputting method for use in printed matter inspection and device therefor, and a plain region selecting method and a device therefor, and more particularly to a streak-like defect inspecting method for a printed matter and a device therefor, which is preferably applied to the detection of a fine streak-like defect caused on the printed matter, an edge region extracting method for use in the inspection and device therefor, which is preferably applied to the image processing carried out in the above inspection, a binary image preparing method and device therefor, which is applied in the same manner, an image inputting method for use in printed matter inspection and device therefor, which is preferably applied to the inspection of the printing condition, with a pattern printed on a running original piece as an inspection subject, based on an image to be inspected input by a camera which is movable in the width-direction of the original piece, and a plain region selecting method and device therefor, which select a plain region from the whole pattern on a printed matter, and which is preferably applied to the inspection of the printing condition based on an image to be inspected in which the selected plain region is input as an inspection point by a partially inputting camera disposed on an inspection device.

BACKGROUND OF THE TECHNIQUE

Generally, a web-like gravure rotary press continuously carrying out the printing by transferring ink adhered to a rotary print drum while passing an original piece through between the print drum and a nip roll pressing it.

In order to realize such a continuous printing, the ink is supplied to the surface of the rotating print drum and then the surplus of the ink is scraped by the doctor blade.

When the doctor blade, however, is minutely broken for some reason, ink is permanently left, although a little, on the print drum contacting to the broken portion, thereby resulting in the continuous, but fine, streak-like printing defect, what is called the doctor streak, on the printing surface of the original piece.

FIG. 1 conceptually shows an image to be inspected input to inspect whether or not such a doctor streak is caused, and the features thereof. FIG. 1(A) shows an input image corresponding to one example of a longitudinally added image described later in detail. The image has a longitudinally continuous streak portion L and noises N on a substantially flat background. Accordingly, as there are shown in FIG. 1(B), FIG. 1(C), and FIG. 1(D) the graduation values (brightness values) obtained on lateral scan lines (I), (II), (III) shown in FIG. 1(A), the peaks P1 are found out at substantially the same position corresponding to the streak portions of all the profiles, and the peaks Pn resulting from the noises N are found out at the different positions.

Conventionally, printed matters have been inspected by inputting an image of a pattern to be printed, by photographing means such as a CCD camera and then detecting printing defects through the image processing of the input image.

There is known that the image processing used for detecting such printing defects includes the application of a variety of differential operators for detecting lines from the input image, and the techniques of the Hough transformation, the pattern recognition, and the like.

However, according to the above-mentioned line detecting method of the conventional image processing, it is difficult to discriminate and then detect the edge of the pattern and the streak-like defect from the image including the input pattern. Moreover, many of streak-like defects, such as the doctor streaks, extending in the same direction are low in the contrast between the streak portion and the surroundings, which provides problems that it is difficult to detect the lines, and more difficult to detect them when noises are included in the image.

Moreover, the image processing for use in such printing defect detection includes the edge extraction for detecting the edge as the density boarder of the image from the input image. This edge extraction is executed by applying a variety of the differential operators to the image data comprising the respective pixel values of the input image, and further such operators include the Prewitt operator and the Sobel operator for a primary differential, the Laplacean operator for a second differential, and the like.

However, the above-mentioned edge detecting method according to the conventional image processing undesirably extracts the edge for all the pattern portion in the input image; therefore, applying it to the printing defect inspection carried out based on the input image results in the misjudgment.

In other words, in order to detect only the printing defects by preparing a mask for excluding the edge portion from the input image to be inspected and then applying the mask to the image to be inspected, applying the above-mentioned operators to the mask preparing processing causes, when the image to be inspected includes streak-like defects such as the doctor streaks, the defects also to be processed as is the case with the pattern. Therefore, applying the prepared mask to the above-mentioned image to be inspected causes the streaks also to be undesirably masked, which disables the streak-like defects to be detected.

The above-mentioned situation will now be described more concretely taking the conventional mask preparing method as an example.

Suppose that the image to be inspected input by the camera is schematically shown by the pattern of FIG. 2(A). The image shown in FIG. 2(A) comprises four kinds of patterns having widths of a to d, respectively, which are arranged at regular intervals e, in which the narrowest line having the width of d corresponding to the doctor streak. Further, FIG. 2(B) shows the graduation values of the respective pixels with respect to the horizontal direction of FIG. 2(A).

First, as shown in FIG. 3 as FIG. 3(C) while showing the image to be inspected in FIG. 3(A), applying the Laplacean operator or the like to the image causes the edge to be extracted; then the edge regions are set at the both sides of the edge up to several pixels.

Next, as shown in FIG. 4 while showing the respective edge regions of the above FIG. 3(C), the expansion-processing causes these regions to be enlarged toward the both sides thereof by several pixels, which brings about the condition shown in FIG. 4(D). Thereafter, the contraction-processing causes these regions to be returned to the condition which is equal in pixel number to that of FIG. 3(C), which is made into a mask image. On this occasion, subjecting the pattern of the width c in the image of FIG. 2(A) to the expansion-processing causes two of the edge regions to be connected as shown in FIG. 4(D), which connected portion is not subjected to the contraction. FIG. 5(E) shows the case in which the mask images prepared as described above are overlapped on the image to be inspected of FIG. 2(A).

As can be seen from FIG. 5, when preventing the edges of the pattern from being detected by applying the mask images prepared by the use of the conventional edge extracting method, the edge regions shown in FIG. 3(C) entirely include the doctor streak of the width d shown in FIG. 2(A), which disables the doctor streak to be detected.

Moreover, the presence of the streak portion on the input image such as the above-mentioned imaged to be inspected is expected to be judgment-processed based on the binary image prepared by binary-coding the pixel values. As to the binary-coding processing method of preparing the binary image used at that occasion, there is used as the most general method a fixed threshold value processing method of binary-coding the respective pixel values of the image by the use of a fixed threshold value.

Alternatively, there is known the so-called P tile method which is used when the ratio P (rate of pixel) of area occupied by the subject to be binary-coded to the background is previously known.

According to the P tile method, when determining the threshold value T for the input-image, shown FIG. 6(A), having a distribution profile of the graduation values of one line, the binary-coding is carried out by determining the threshold value T so as to equalize the rate P of the pixels to the area ratio P of the subject to be detected on the assumption that the rate P of the pixels which are turned on in the binary image is already known, for example, by the distribution of the pixel values of 1 (ON) and 0 (OFF) for one line of the corresponding binary image shown in FIG. 6(B).

Still alternatively, there are known the methods called the moving average method of determining the threshold values every pixels, and the partial image dividing method of dividing the whole image into a plurality of grid-like partial images and then determining the threshold values every partial image.

However, the above-mentioned fixed threshold value processing method has a problem that the threshold values are difficult to be suitably determined and then the subject streak portion and the background are difficult to be correctly separated from each other. This is conceptually shown in FIG. 7. In the case of the binary-coding for the purpose of extracting a streak portion L from an input image having a streak portion L longitudinally extending and noises N, which is the same as that of FIG. 1(A), setting the threshold value to a value less than a suitable value causes the pixels of the streak portion to be turned on as shown by the binary image (output image) of FIG. 7(B), but causes almost the pixels of the noises also to be turned on, which makes it difficult to distinguish between the both, whereas setting it to a higher value disables the pixels of the streak portion to be turned on, which provides a binary image which is highlighted in only noise.

Moreover, the P tile method which automatically determines the threshold value has a problem that the subject and the background cannot be separated from each other when the area of the subject to be detected is not previously known or the area of the subject to be detected is varied. This problem will now be described with reference to FIG. 8 which conceptually shows the results of the binary-coding processing obtained when subjecting the input image similar to that of FIG. 1(A) to the P tile method.

In the case of subjecting the input image of FIG. 8(A) to the P tile method on the assumption that the number of the pixels included in the streak portion is constant, the threshold value is set to a low value when the number of pixels for use in the area calculation for calculating the threshold value is more than that of the actual streak portion, which causes much noise to be extracted as shown in FIG. 8(B). On the contrary, when the number of the pixels for use in the area calculation is less than that of the streak portion, the threshold is raised, thereby disabling the streak portion to be extracted as shown in FIG. 8(C), but enabling only the noises N each having the large graduation value to be extracted.

So long as the noises, which have higher graduation values than the streak portion, but not less in the number of the pixels than the streak portion, exist on the input image even if the number of the pixels for use in the area calculation is set to an appropriate value, that is, the sum of the number of the streak portions and α, the pixels of the streak portion cannot be correctly binary-coded. This provides a problem that when the input image has such noises partially misdistributed and then locally concentrated on the input image, the locally concentrated noises and the like are extracted as shown by a circle in FIG. 8(D), which provides a problem that the subject streak portion cannot be correctly extracted. By inputting the image with the input range limited to a certain range in the subject pattern results in the high resolution inspection.

Further, the moving average method of dynamically processing the threshold value requires a long time to determine the threshold every pixel compared with the fixed threshold value processing method and the P tile method. Also, the partial image dividing method is to calculate the threshold value every pixel with respect to the respective grid-like partial images, but not so much as the moving average method, which is led to a problem that a longer processing time is required in the same manner.

As described above, the image inputting method by using the camera, which is applied to the inspection of the pattern being printed on the printer by the use of the visual check or an automatic inspection device includes a method of selecting and then inputting, by one CCD camera traversing (moving) in the width-direction, a part of the whole pattern as a photographing point from the whole pattern, corresponding to one round of the subject print drum, of the printed original piece w running in the arrow direction, as conceptually shown in FIG. 9. Thus inputting the image with the input range limited to a certain range in the subject pattern results in the high resolution inspection.

When thus inputting the image by the above-mentioned CCD camera in order to inspect a part of the pattern being printed on the printer by the use of the visual check or the inspection device, a method of determining and photographing the photographing point to be photographed, from the whole pattern includes the following three manners:

(1) To previously register the photographing points at specified fixed positions (six points with respect to the width-direction, in FIG. 10) for the whole pattern without being limited to the head, although the example in which the photographing point is set to the head is shown in FIG. 10, and then to move the camera in turn to automatically photograph there.

(2) To determine the photographing point at positions selected at random for the whole pattern, as shown in FIG. 11, and then photograph there.

(3) To move the photographing point manually and then photograph there.

However, the image inputting method related to the above items (1) to (3) which photographs a part of the whole pattern has the following problems:

In the case of the method of previously manually registering the photographing point as described in the above item (1), many points to be inspected makes the registering work difficult.

In the case of the method of determining the photographing points at random as described in the above item (2), the location which is not suitable for the photographing may be photographed, thereby degrading the inspection efficiency.

In the case of the method of moving the photographing point manually as described in the above item (3), one location to be inspected provides no problem, whereas many locations to be inspected requires the operation every movement, which degrades the efficiency.

Particularly, according to the methods of the items (1),and (2), the individual pattern existing on the subject to be inspected does not considered, which raises the possibility that a part of the pattern enters into the image to be inspected input from the determined inspection point. Accordingly, subjecting such an image to be inspected to the image processing in order to detect the fine defects provides a problem that the patterns included in the image to be inspected results in the false inspection.

Besides, in order to avoid the problem, carrying out the process of preventing the false inspection, e.g. excluding the pattern portion from the input image to be inspected, possibly causes the signals corresponding to the defects to be excepted, which provides a problem that the above prevention process unexpectedly leaves the fine defects undetected.

SUMMARY OF THE INVENTION

The present invention is made to solve the above conventional problems. It is therefore a first object of the present invention to provide a streak-like defect inspecting method for a printed matter and device therefor, which are capable of surely detect streak-like fine defects of low contract from an image to be inspected including patterns.

Further, it is a second object of the present invention to provide a streak-like defect inspecting method for a printed matter and device therefor, which are capable of detecting streak-like defects, which are low in detecting sensitivity for monochromatic images, at high accuracy when processing an image to be inspected of a color image as monochromatic images of frames of R, G, B, respectively.

Moreover, it is a third object of the present invention to provide an edge region extracting method for use in streak-like defect inspection and device therefor, which are capable of preventing the edge from being included in an edge region extracted from an image to which printing patterns and the like are input, only when a flat portion of an image signal corresponding to the pattern and the like has a width of not more than a predetermined value.

Besides, it is a fourth object of the present invention to provide a binary image preparing method for use in streak-like defect inspection and device therefor, which are capable of easily and surely preparing an image having the binary-coded streak portion from the image in which a streak portion continuing substantially in the same direction exist on a flat background, even if the image includes noises.

Also, it is a fifth object of the present invention to provide a streak-like defect inspecting method for a printed matter and device therefor, which are capable of surely detect streak-like fine defects of low contrast from an image to be inspected including patterns, by the use of the above-mentioned binary image preparing technique.

Further, it is a sixth object of the present invention to provide an image inputting method for use in printed matter inspection and device therefor, which are capable of, even when there are many photographing points to be input on the pattern, easily and surely inputting a pattern portion located at the points.

Furthermore, it is a seventh object of the present invention to provide a plain region selecting method for use in printed matter inspection and device therefor, which are capable of inputting a portion of the pattern having a low density difference as an image to be inspected, from the whole pattern on the printed matter, so as to prevent a pattern portion included in the input image to be inspected, from resulting in the false detection of the fine defects.

The present invention provides a streak-like defect inspecting method for a printed matter, which detects a streak-like defect caused on the printed matter, from an image to be inspected input on the printed matter, characterized by comprising: a pattern excepting step of exception-processing a pattern portion from the image to be inspected; a streak emphasizing step of emphasis-processing a streak portion existing on the exception-processed image; and a judging step of judging a streak-like defect based on the emphasis-processed image, which causes the above-mentioned first object to be resolved.

The present invention provides a streak-like defect inspecting device for a printed matter, which detects a streak-like defect caused on the printed matter, from an image to be inspected input on the printed matter, characterized by comprising: a pattern excepting means for exception-processing a pattern portion from the image to be inspected; a streak emphasizing means for emphasis-processing a streak portion existing on the exception-processed image; and a judging means for judging a streak-like defect based on the emphasis-processed image, which causes the above-mentioned first object to be resolved.

The present invention provides a streak-like defect inspecting method for a printed matter, which detects a streak-like defect caused on the printed matter, from a color image to be inspected input on the printed matter, characterized by comprising: a step of separating the input image to be inspected to monochromatic images of respective frames of R, G, B; a step of subjecting the respective monochromatic images to a predetermined image processing, respectively; a step of composing the respective image-processed monochromatic images to prepare a composed image; and a step of judging the presence of the streak-like defect based on the composed image, which causes the above-mentioned second object to be resolved.

The present invention provides a streak-like defect inspecting device for a printed matter, which detects a streak-like defect caused on the printed matter, from a color image to be inspected input on the printed matter, characterized by comprising: means for separating the input image to be inspected to monochromatic images of respective frames of R, G, B; means for subjecting the respective monochromatic images to a predetermined image processing, respectively; means for composing the respective image-processed monochromatic images to prepare a composed image; and means for judging the presence of the streak-like defect based on the composed image, which causes the above-mentioned second object to be resolved.

The present invention provides an edge region extracting method which extracts an edge region based on the edge which is rapidly changed in pixel value with respect to at least one of horizontal direction and vertical direction of an input image, characterized in that when there is no change of the pixel value or width of a small flat portion is not more than a predetermined value, edges positioned at both ends of the flat portion are prevented from being included in the edge regions; and otherwise, the edges are included in the edge regions, which causes the above-mentioned third object to be resolved.

The present invention provides an edge region extracting device which extracts an edge region based on the edge which is rapidly changed in pixel value with respect to at least one of horizontal direction and vertical direction of an input image, characterized in that the device comprises: means for inputting an image related to the subject; means for setting as a parameter for extracting the edge region at least a pixel number L of defining a position used for comparing pixel values and an edge-to-edge pixel number W of defining such a maximum width of a flat portion as to prevent the edge from being included in the edge region; means for comparing pixel values located apart from the subject image in opposite directions by a distance corresponding to L pixels, respectively, and extracting, as the edge region, such a subject image as to cause the compared difference to exceed a predetermined threshold value; means for calculating such an expansion pixel number N as to prevent both the edge regions from being connected, when expanding widths of a pair of the edge regions extracted for the flat portion having a width of the edge-to-edge pixel number W, with one pixel as a unit, respectively, and calculating such a contraction pixel number P as to cause the expanded edge regions to contract; means for expanding the widths of all the edge regions, which are extracted from the input image, by N pixels at a time at both sides thereof; and means for causing the widths of the expanded edge regions to contract by P pixels at a time at both sides thereof, which causes the above-mentioned edge region extracting method to be executed.

In other words, the present invention comprises the steps of inputting the image, subjecting the input image to the edge region extraction-processing, and outputting the extracted image including the resultant edge region.

The input image as the subject of the present invention may comprises any one of a binary image, a multivalued monochromatic image, and a color image. Further, the above edge region extraction-processing comprises three of (A) extraction-processing of only vertical directionwise edges, (B) extraction-processing of only horizontal directionwise edges, and (C) simultaneous extraction-processing of horizontal and vertical directionwise edges. Further, the above output image, which comprises a two dimensional binary image, is output with the edge region and the others distinguished from each other by e.g. assuming "1 (or ON)" to indicate the edge region and "0 (or OFF)" to indicate the others, and vice versa.

Moreover, the relationship between the edge region extracted according to the present invention and the input image will be described in brief while taking the case of the image signal comprising a horizontal one dimensional pixel values (graduation value) shown in FIG. 12.

FIG. 12(A) shows the case of the image in which light lines are vertically displayed on a dark background, whereas FIG. 12(B) shows the reverse case. Any one of the drawings shows that the edge is formed on the pixels which are abruptly changed in pixel value and-then exists on the boarder between one flat portion which is not changed so much in pixel value and another flat portion which is different in brightness from the one flat portion.

According to the present invention, the edge region is extracted so as to include the edge therein, as shown by half-tone dot meshing in FIG. 12, when the number of the pixels between both the edges is larger than the W value, whereas the edge region is extracted so as not to include the edge therein or no edge region is extracted at all when not larger than the W value, as described later.

As a result, it is possible to clearly distinguish very thin lines such as doctor streaks and usual patterns including the other lines; therefore, preparing a mask image based on the extracted edge region and then applying it to the printing inspection enables e.g. the doctor streaks to be surely detected.

The above-mentioned FIG. 12 corresponds to a vertical edge being extracted, as shown in FIG. 13 (A). However, changing the processing direction by 90° enables a horizontal edge to be extracted, as shown in FIG. 13(B), and further, carrying out the vertical process and the horizontal one simultaneously enables both of the horizontal and the vertical edge regions to be simultaneously extracted.

The present invention provides a binary image preparing method for use in streak-like defect inspection, characterized by comprising: a step of inputting an image in which a streak portion continuing substantially in a same direction is expected to exist; a step of dividing the input image into continuous partial images each having a width of not less than one line and perpendicular to the streak portion; and a step of binary-coding the respective pixels by subjecting each of the divided partial images to the P tile method, which causes the above-mentioned fourth object to be resolved.

The present invention provides a binary image preparing device for use in streak-like defect inspection, characterized by comprising: means for inputting an image in which a streak portion continuing substantially in a same direction is expected to exist; means for dividing the input image into continuous partial images each having a width of not less than one line and perpendicular to the streak portion; and means for binary-coding the respective pixels by subjecting each of the divided partial images to the P tile method, which causes the above-mentioned fourth object to be resolved.

According to the present invention, the P tile method which realizes the binary-coding accurately and in a short time, if the area of the ON pixels exposed on binary-coding is previously known, is applied to the partial image comprising one or more lines perpendicular to the streak portion generating direction on the assumption that the number of the pixels to be turned on (area) is the number of the pixels included in the streak portion or a constant near thereto, which enables the streak portions existing on the respective partial images to be binary-coded accurately and in a relatively short time even if the input image has noises.

The above matter will now be described while taking the case of the input image in which the noises each having a large graduation value are locally concentrated, from which the conventional P tile method can merely obtain the binary-coded image shown in FIG. 8(D). On about upper ⅓ of the region including the noises are many partial images having non-binary-coded streak portion as before, whereas on about lower ⅔ of the region are many partial images having the noises of not more than a predetermined value and binary-coded streak portions, which enables the streak portions to be binary-coded continuously substantially in the same direction as the whole input image; although discontinuous portions are included. This enables the binary image, in which the streak portion continuing substantially in the same direction is shown clearly, to be easily and surely prepared.

The present invention provides a streak-like defect inspecting method for a printed matter, which detects a streak-like defect caused on the printed matter, from an image to be inspected input on the printed matter, characterized by comprising: a pattern excepting step of exception-processing a pattern portion from the image to be inspected; a streak emphasizing step of emphasis-processing a streak portion existing on the exception-processed image; a step of inputting the emphasis-processed image in which a streak portion continuing substantially in the same direction is expected to exist; a step of dividing the input image into continuous partial images each having a width of not less than one line and perpendicular to the streak portion; a step of binary-coding the respective pixels by subjecting each of the divided partial images to the P tile method; and a step of judging the streak-like defect based on the binary-coded image, which causes the above-mentioned fifth object to be resolved.

The invention provides a streak-like defect inspecting device for a printed matter, which detects a streak-like defect caused on the printed matter, from an image to be inspected input on the printed matter, characterized by comprising: a pattern excepting means for exception-processing a pattern portion from the image to be inspected; a streak emphasizing means for emphasis-processing a streak portion existing on the exception-processed image; means for inputting the emphasis-processed image in which a streak portion continuing substantially in the same direction is expected to exist; means for dividing the input image into continuous partial images each having a width of not less than one line and perpendicular to the streak portion; means for binary-coding the respective pixels by subjecting each of the divided partial images to the P tile method; and means for judging the streak-like defect based on the binary-coded image, which causes the above-mentioned fifth object to be resolved.

The present invention provides an image inputting method for use in printed matter inspection, which is applied to the inspection of the printing condition, with a pattern printed on a running original piece by a print drum as an inspection subject, based on a partial image to which a part of the pattern is input by a partially inputting camera which is capable of being moved in the width-direction of the original piece by a moving mechanism, characterized by comprising: a step of inputting whole image including whole pattern by a wholly inputting camera disposed apart from the partially inputting camera by a predetermined distance in such a direction as that the original piece flows; a step of coordinating, based on the relationship between a position, on the whole image, of the partial image which is capable of being input by the partially input camera and a width-directionwise reference point set on the whole image, the width-directionwise position on the whole image and the width-directionwise position on the moving mechanism with each other, when the inputting camera is located on an origin set on the moving mechanism; a step of positioning and then setting a photographing point, which is to be input by the partially inputting camera, on the whole image; a step of calculating a width-directionwise pixel number between the set photographing point and the width-directionwise reference point on the whole image; a step of multiplying the calculated width-directionwise pixel number by a width-directionwise resolution of the whole image to calculate the width-directionwise moving amount on the moving mechanism; a step of moving the partially inputting camera up to a target position corresponding to the width-directionwise moving amount; and a step of inputting the partial image at an arbitrary timing by the partially inputting camera moved up to the target position, which causes the above-mentioned sixth object to be resolved.

The present invention provides an image inputting device for use in printed matter inspection, which is applied to the inspection of the printing condition, with a pattern printed on a running original piece by a print drum as an inspection subject, based on a partial image to which a part of the pattern is input by a partially inputting camera which is capable of being moved in the width-direction of the original piece by a moving mechanism characterized by comprising: a wholly inputting camera for inputting whole image including whole pattern, disposed apart from the partially inputting camera by a predetermined distance in such a direction as that the original piece flows; means for coordinating, based on the relationship between a position, on the whole image, of the partial image which is capable of being input by the partially input camera and a width-directionwise reference point set on the whole image, the width-directionwise position on the whole image and the width-directionwise position on the moving mechanism with each other, when the partially inputting camera is located on an origin set on the moving mechanism; means for positioning and then setting a photographing point, which is to be input by the partially inputting camera, on the whole image; means for calculating a width-directionwise pixel number between the set photographing point and the width-directionwise reference point on the whole image; means for multiplying the calculated width-directionwise pixel number by a width-directionwise resolution of the whole image to calculate the width-directionwise moving amount on the moving mechanism; means for moving the partially inputting camera up to a target position corresponding to the width-directionwise moving amount; and means for inputting the partial image at an arbitrary timing by the partially inputting camera moved up to the target position, which causes the above-mentioned sixth object to be resolved.

In the image inputting method according to the present invention, the whole image including the whole pattern is input by the wholly inputting camera, and then the position on the whole image and the actual position of the partially inputting camera (position on the hardware) are coordinated based on the relationship between the whole image and the partial image input by the partially inputting camera, which enables the partial image of the photographing point to be easily input by only setting the photographing point to be input by the partial inputting camera to a predetermined width-directionwise position on the whole image by a pointing device or the like.

The present invention provides the above image inputting method characterized by comprising: a step of calculating a reference inputting timing in which the partially inputting camera is capable of inputting a pattern portion positioned at the flow-directionwise reference point on the whole image, based on a flow-directionwise distance between the wholly inputting camera and the partially inputting camera, and a print drum circumferential length; a step of positioning and then setting a photographing point, to be input by the partially inputting camera, on the whole image also with respect to a flow direction other than the width-direction; a step of calculating the flow-directionwise pixel number between the set photographing point and the flow-directionwise reference point; a step of calculating a waiting time from the reference inputting timing based on the actual distance obtained by multiplying the calculated flow-directionwise pixel number by the flow-directionwise resolution of the whole image; and a step of inputting the partial image at a timing after the elapse of the waiting time from the reference input timing, based on the partially inputting camera moved up to the target position by the moving mechanism, which enables the photographing point to be set in the flow direction.

The present invention provides the above image inputting device characterized by comprising: means for calculating a reference inputting timing in which the partially inputting camera is capable of inputting a pattern portion positioned at the flow-directionwise reference point on the whole image, based on a flow- directionwise distance between the wholly inputting camera and the partially inputting camera, and a print drum circumferential length; means for positioning and then setting a photographing point, to be input by the partially inputting camera, on the whole image also with respect to a flow direction other than the width-direction; means for calculating the flow-directionwise pixel number between the set photographing point and the flow-directionwise reference point; means for calculating a waiting time from the reference inputting timing based on the actual distance obtained by multiplying the calculated flow-directionwise pixel number by the flow-directionwise resolution of the whole image; and means for inputting the partial image at a timing after the elapse of the waiting time from the reference input timing, based on the partially inputting camera moved up to the target position by the moving mechanism, which enables the photographing point to be set in the flow direction.

The present invention provides an image inputting method for use in printed matter inspection, which is applied to the inspection of the printing condition, with a pattern printed on a running original piece by a print drum as an inspection subject, based on a partial image to which a part of the pattern is input by a partially inputting camera which is capable of being moved in the width-direction of the original piece by a moving mechanism, characterized by comprising: a step of inputting a whole image including the whole pattern as a reference image by a wholly inputting camera disposed apart from the partially inputting camera by a predetermined distance in a direction that the original piece flows; a step of coordinating, based on the relationship between a position, on the reference image, of the partial image which is capable of being input by the partially input camera and a width-directionwise reference point set on the reference image, the width-directionwise position on the reference image and the width-directionwise position on the moving mechanism with each other, when the partially inputting camera is located on an origin set on the moving mechanism; a step of positioning and then setting a photographing point, which is to be input by the partially inputting camera, on the reference image; a step of calculating a width-directionwise pixel number between the set photographing point and the width-directionwise reference point on the reference image; a step of multiplying the calculated width-directionwise pixel number by a width-directionwise resolution of the reference image to calculate the width-directionwise moving amount on the moving mechanism; a step of moving the partially inputting camera up to a target position corresponding to the width-directionwise moving amount; and a step of inputting the partial image at an arbitrary timing by the partially inputting camera moved up to the target position; a step of inputting the whole image as the newest image suitably by the wholly inputting camera; and a step of amending the width-directionwise moving amount of the partially imputing camera based on the width-directionwise difference between the newest image and the reference image, which causes the above-mentioned sixth object to be resolved.

The present invention provides an image inputting device for use in printed matter inspection, which is applied to the inspection of the printing condition, with a pattern printed on a running original piece by a print drum as an inspection subject, based on a partial image to which a part of the pattern is input by a partially inputting camera which is capable of being moved in the width-direction of the original piece by a moving mechanism, characterized by comprising: a wholly inputting camera for inputting a whole image including a whole pattern as a reference image, disposed apart from the partially inputting camera by a predetermined distance in a direction that the original piece flows; means for coordinating, based on the relationship between a position, on the reference image, of the partial image which is capable of being input by the partially input camera and a width-directionwise reference point set on the reference image, the width-directionwise position on the reference image and the width-directionwise position on the moving mechanism with each other, when the partially inputting camera is located on an origin set on the moving mechanism; means for positioning and then setting a photographing point, which is to be input by the partially inputting camera, on the reference image; means for calculating a width-directionwise pixel number between the set photographing point and the width-directionwise reference point on the reference image; means for multiplying the calculated width-directionwise pixel number by a width-directionwise resolution of the reference image to calculate the width-directionwise moving amount on the moving mechanism; means for moving the partially inputting camera up to a target position corresponding to the width-directionwise moving amount; and means for inputting the partial image at an arbitrary timing by the partially inputting camera moved up to the target position; means for inputting the whole image as the newest image suitably by the wholly inputting camera; and means for amending the width-directionwise moving amount of the partially imputing camera based on the width-directionwise difference between the newest image and the reference image, which causes the above sixth object to be resolved.

According to the present invention, the whole image including the whole pattern is input by the wholly inputting camera as a reference image, and then the position on the whole image and the actual position of the partially inputting camera (position on the hardware) are coordinated based on the relationship between the whole image (reference image) and the partial image input by the partially inputting camera, which enables the partial image of the photographing point to be easily input by only setting the photographing point to be input by partial inputting camera to a predetermined width-directionwise position on the whole image by a pointing device or the like. In addition, when there is caused an offset (difference) between the newest image and the reference image suitably compared to each other, the width-directionwise position of the partially inputting camera is amended based on the above-mentioned offset, which enables the partial image of the photographing point to be permanently accurately input even when the original piece undergoes the width-directionwise offset in time sequence, or the pattern undergoes the flow-directionwise offset.

The present invention provides the image inputting method characterized by comprising: a step of calculating a reference inputting timing in which the partially inputting camera is capable of inputting a pattern portion positioned at the flow-directionwise reference point on the reference image, based on a flow-directionwise distance between the wholly inputting camera and the partially inputting camera, and a print drum circumferential length; a step of positioning and then setting a photographing point, to be input by the partially inputting camera, on the reference image also with respect to a flow direction other than the width-direction; a step of calculating the flow-directionwise pixel number between the set photographing point and the flow-directionwise reference point, on the reference image; a step of calculating a waiting time from the reference inputting timing based on the actual distance obtained by multiplying the calculated flow-directionwise pixel number by the flow-directionwise resolution of the reference image; and a step of inputting the partial image at a timing after the elapse of the waiting time from the reference input timing, based on the partially inputting camera moved up to the target position by the moving mechanism; and a step of amending the partial image inputting timing of the partially imputing camera based on the flow-directionwise difference between the newest image and the reference image, which enables the photographing point to be set in the flow direction.

The present invention provides the image inputting device characterized by comprising: means for calculating a reference inputting timing in which the partially inputting camera is capable of inputting a pattern portion positioned at the flow-directionwise reference point on the reference image, based on a flow-directionwise distance between the wholly inputting camera and the partially inputting camera, and a print drum circumferential length; means for positioning and then setting a photographing point, to be input by the partially inputting camera, on the reference image also with respect to a flow direction other than the width-direction; means for calculating the flow-directionwise pixel number between the set photographing point and the flow-directionwise reference point, on the reference image; means for calculating a waiting time from the reference inputting timing based on the actual distance obtained by multiplying the calculated flow-directionwise pixel number by the flow-directionwise resolution of the reference image; and means for inputting the partial image at a timing after the elapse of the waiting time from the reference input timing, based on the partially inputting camera moved up to the target position by the moving mechanism; and means for amending the partial image inputting timing of the partially inputting camera based on the flow-directionwise difference between the newest image and the reference image, which causes the photographing point to be similarly set in the flow direction.

The present invention provides a plain region selecting method for use in printed matter inspection, which selects a plain region from the whole pattern on the printed matter, and which is applied to the inspection of the printing condition based on an image to be inspected in which the selected plain region is input as an inspection point by a partially inputting camera disposed on an inspection device, wherein the method comprises: a step of inputting the whole image including the printed whole pattern; a step of cutting partial images from the input whole image with the size corresponding to the image to be inspected, as a unit; a step of calculating the evaluation value representing the flatness of the brightness for the respective cut partial images; a step of selecting the partial image which is high in the flatness of the brightness therefrom based on the calculated evaluation value and then judging a predetermined number of the partial images as the inspection point on the image; and a step of outputting the position information related to the judged inspection points to the inspection device, which causes the above-mentioned seventh object to be resolved.

In other words, the present invention comprises the steps of dividing the whole image to which the whole pattern as the subject to be inspected is input, into the partial images of a predetermined size, evaluating the flatness of each of the respective partial images, judging the partial image having the high flatness as the inspection point, and then outputting the positional information of the inspection point to the inspection device, which enables the plain region having a remarkably small density difference, on the printed matter to be selected and then the image to be input. Moreover, the plain region means the region which has almost no density difference on the printed matter, or the region which is near thereto as much as possible.

The present invention provides the plain region selecting method characterized in that the evaluation value representing the flatness of the brightness comprises at least one of the maximum frequency of the brightness distribution related to the whole pixels included in the partial images, the dispersion of the brightness distribution, the brightness value of dividing the brightness distribution at a predetermined rate offsetting toward the higher brightness or the lower brightness.

The present invention provides the plain region selecting method characterized by cutting in turn all over the whole image while shifting the partial image on the whole image by one pixel at a time at least in the lateral direction.

The present invention provides a plain region selecting device for use in printed matter inspection, which selects a plain region from the whole pattern on the printed matter, and which is applied to the inspection of the printing condition based on an image to be inspected in which the selected plain region is input as an inspection point by a partially inputting camera disposed on an inspection device, wherein the device comprises: means for inputting whole image including printed whole pattern; means for cutting partial images from the input whole image with the size corresponding to the image to be inspected, as a unit; means for calculating the evaluation value representing the flatness of the brightness for the respective cut partial images; means for selecting the partial image which is high in the flatness of the brightness therefrom based on the calculated evaluation value and then judging a predetermined number of the partial images as the inspection point on the image; and means for outputting the position information related to the judged inspection points to the inspection device, which causes the above-seventh object to be resolved.

The present invention provides the plain region selecting device characterized in that the evaluation value representing the flatness of the brightness comprises at least one of the maximum frequency of the brightness distribution related to the whole pixels included in the partial images, the dispersion of the brightness distribution, the brightness value of dividing the brightness distribution at a predetermined rate offsetting toward the higher brightness or the lower brightness.

The present invention provides the plain region selecting characterized by cutting in turn all over the whole image while shifting the partial image on the whole image by one pixel at a time at least in the lateral direction.

BRIEF DESCRIPTION OF THE DRAWINGS

FIG. 26 is an explanatory view schematically showing the extraction principle of the edge region in the second embodiment;

FIG. 27 is an explanatory view showing an expansion/contraction frequency calculating method in the same embodiment;

FIG. 34 are explanatory views showing the image to be inspected, and the extracted image in the edge region according to the second embodiment;

FIG. 35 are explanatory views showing the extracted image and an expansion-processed image thereof;

FIG. 36 are explanatory views showing the expansion-processed image and a contraction-processed image thereof;

FIG. 46 are explanatory views showing the condition of edge region of the flat portions having different widths exhibited after subjecting to the P1 time-contractions;

FIG. 47 are explanatory views showing the operation of a fourth embodiment of the present invention;

FIG. 51 are diagrams showing problems exhibited when using the above monochromatic images;

THE BEST MODE OF EXECUTING THE INVENTION

Embodiments of the present invention will now be described in detail with reference to the drawings.

Figure 14:
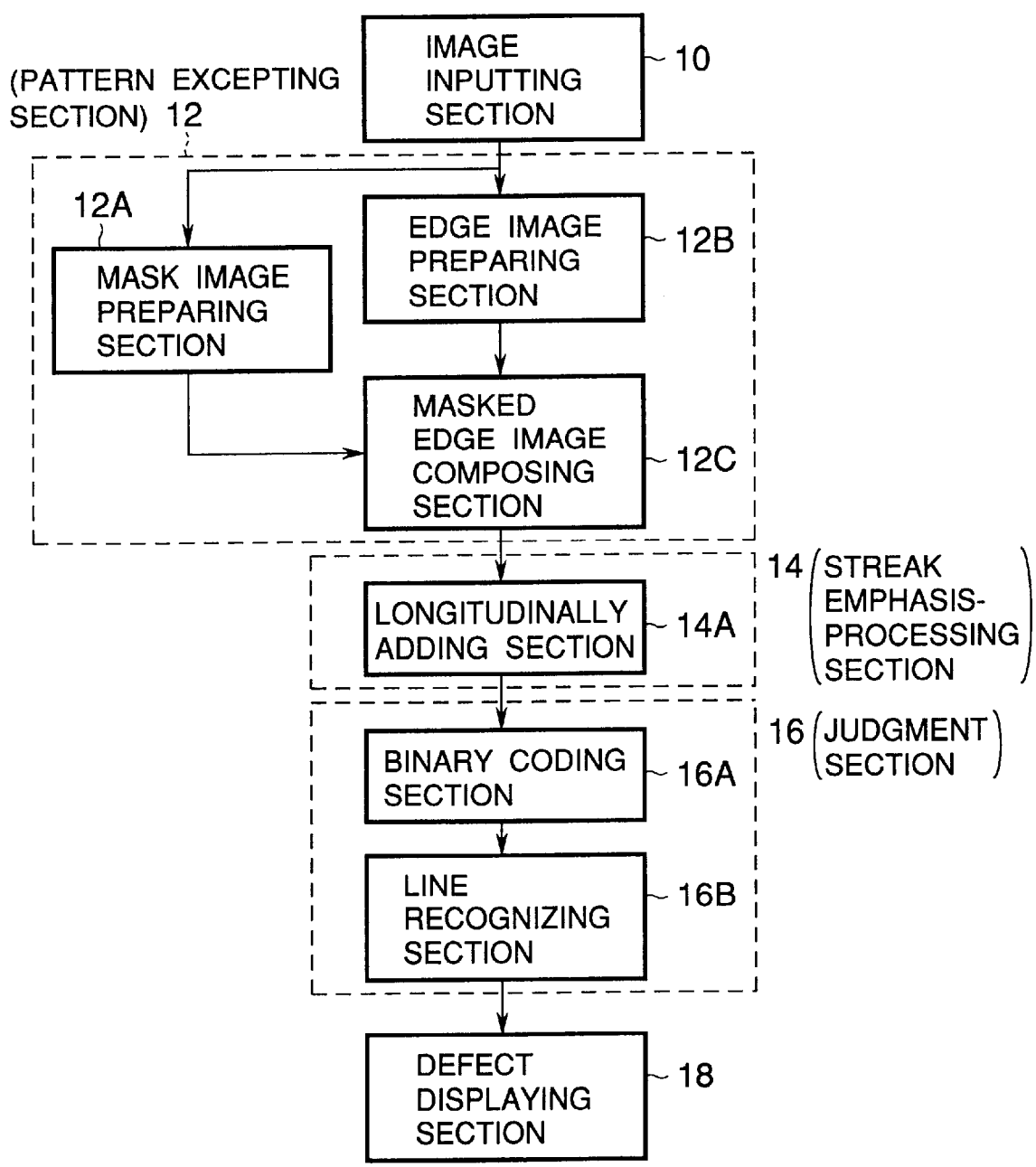
FIG. 14 is a block diagram showing the arrangement of a streak-like defect inspection device according to a first embodiment of the present invention.

FIG. 14 is a block diagram showing a general arrangement of a streak-like defect inspection device according to a first embodiment of the present invention.

The inspection device of this embodiment, which aims to detect streak-like defects caused on a printed matter, from an image to be inspected input on the printed matter, comprises an image inputting section 10 for optically inputting the image to be inspected, from the printed matter by means of a CCD camera or the like, a pattern excepting section 12 for exception-processing a pattern portion from the input image to be inspected, a streak emphasis-processing section 14 for emphasis-processing a streak portion existing on the image from which the pattern portion has been exception-processed, a judgment section 16 for judging the streak-like defects based on the image in which the streak portions have been emphasis-processed, and a defect displaying section 18 for displaying the judged streak-like defects on a monitor.

In this embodiment, the pattern excepting section 12 includes a mask image preparing section 12A, an edge image preparing section 12B, and a masked edge image composing section 12C, and then the streak emphasis-processing section 14 includes a longitudinally adding section 14A, and the judgment section 16 includes a binary-coding section 16A and a line recognizing section 16B, respectively.

Respective functioning sections constructing the above-mentioned inspection device will be described hereinbelow in detail. Incidentally, suppose that the image is, unless otherwise provided, of a monochromatic image in which respective pixels are displayed by 256, that is, 0 to 255 graduation pixel values in this embodiment. Accordingly, a color image can be processed similarly as monochromatic images of three frames of R, G, B.

The mask image preparing section 12A has the function of preparing a mask image for masking the edge of the pattern portion which is extracted from the image to be inspected.

Figure 15:
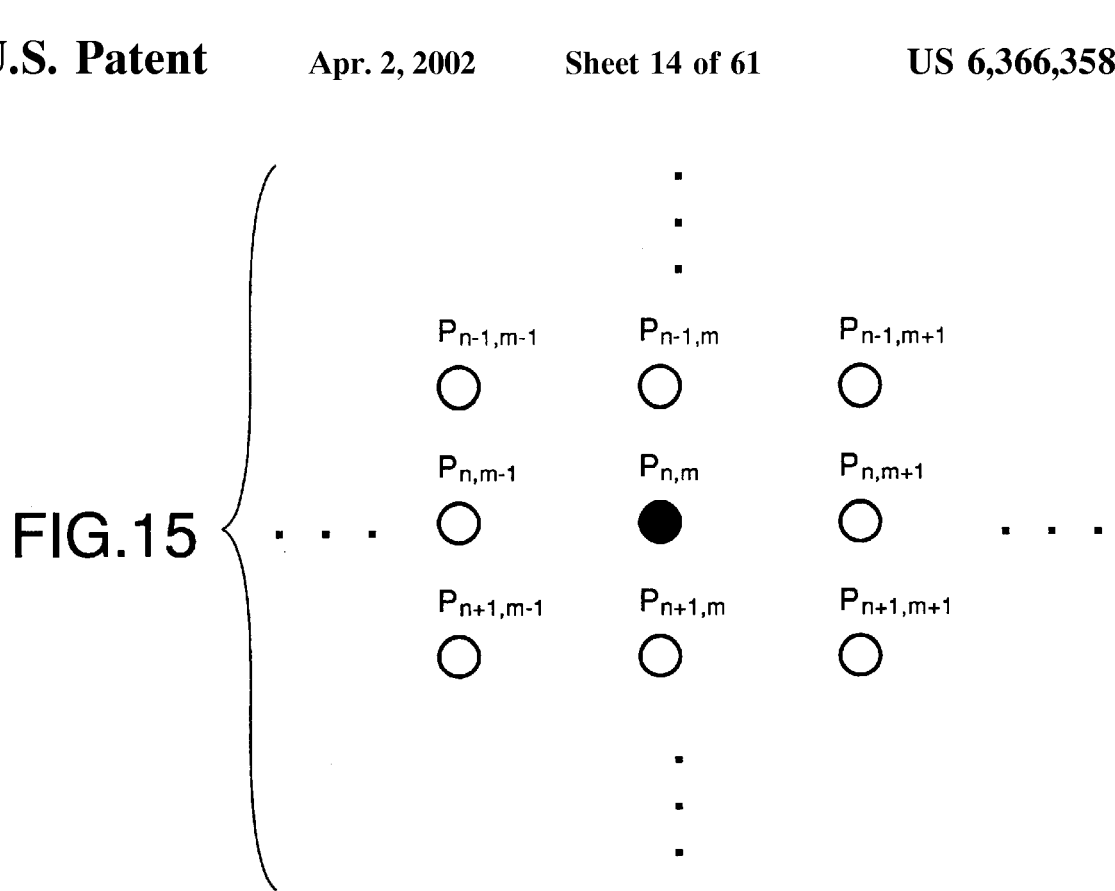
FIG. 15 is an explanatory view showing an edge extraction carried out when preparing a mask image in the first embodiment.

That is, the mask image preparing section 12A has the function of preparing a mask image for excepting, from the subject of the detection-processing, edge portions of lines and patterns, other than streak-like defects included in the image to be detected input by the image inputting section 10. In concrete terms, as the arrangement of the pixels conceptually is shown in, for example, FIG. 15, binary mask image corresponding to only the clear line or the pattern edge, for example, can be prepared by calculating the difference between the pixel values adjacent to each other and then threshold-processing the difference. Suppose that the pixel value is described with the same symbol as that of the pixel, the above mask image can be represented by the use of the following equations (1) and (2):

(when $P_{n,m}$ represents the edge of the pattern)

$$|P_{i,j} - P_{n,m}| \geq T1 \qquad (1)$$

(when $P_{n,m}$ does not represent the edge of the pattern)

$$|P_{i,j} - P_{n,m}| < T1 \qquad (2)$$

where i=n−1, n, n+1, j=m−1, m, m+1, $P_{i,j} \neq P_{n,m}$

T1: threshold value

The above condition $P_{i,j} \neq P_{n,m}$ means that no calculation is carried out between the same pixels. Also, the threshold T1 is not a fixed value, but separately obtained experimentally as a limit value at which the edge of the streak-like defect is not extracted.

Figure 16:
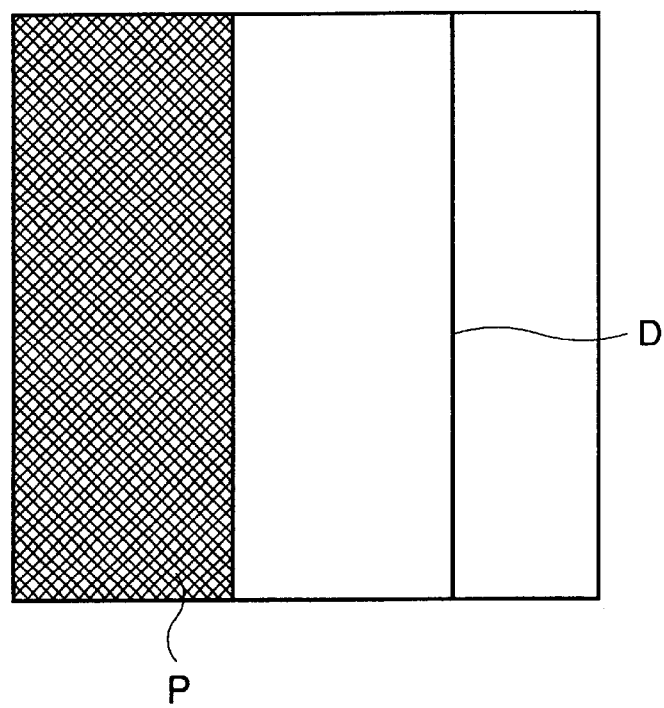
FIG. 16 is an explanatory view schematically showing an image to be inspected in the same embodiment.
Figure 17:
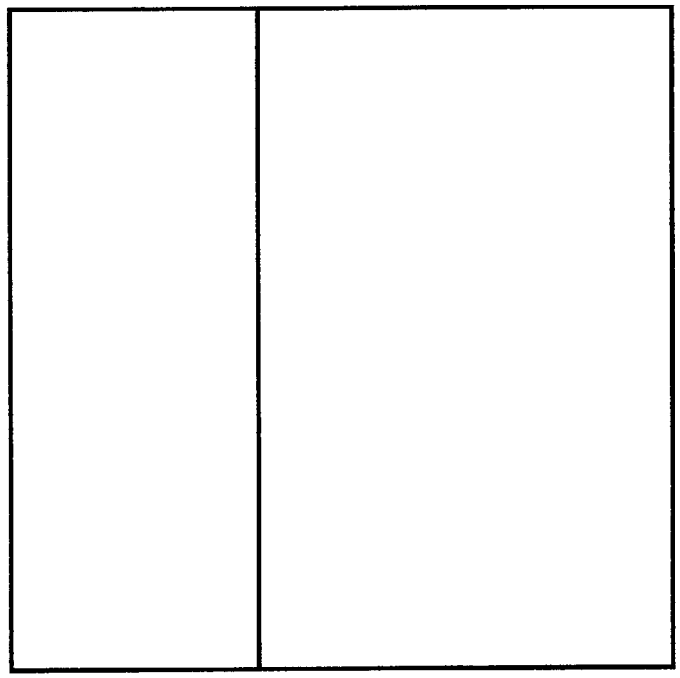
FIG. 17 is an explanatory view showing an image in which only an edge of a pattern is extracted from the above image to be inspected.
Figure 18:
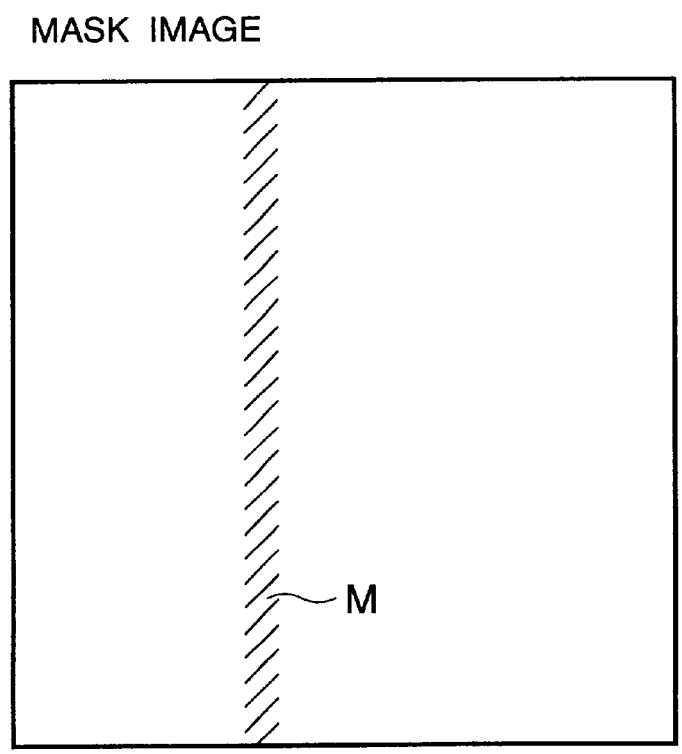
FIG. 18 is an explanatory view showing a mask image prepared based on the above image to be inspected.

As the result of the calculation using the above equations (1) and (2), there can be prepared the binary image having the density difference of not less than the threshold value T1, that is, comprising only the edges of the clear extracted line or pattern. There is shown in FIG. 17 the above binary image taking the case of FIG. 16 schematically showing an image to be inspected comprising a pattern P and a streak-like defect (doctor streak) D. That is, there can be obtained the binary-coded image in which the edge of only the pattern P having a clear shade is extracted, whereas the edge of the line-like (streak-like) portion, which is low in contrast, such as the doctor streak or the like is not extracted. Then, according to the edge of the image shown in FIG. 17, the mask image comprising a mask portion M having a width enough to mask the edge can be prepared, as shown in FIG. 18.

On this occasion, a continuous clear edge may not be extracted due to the noise or the like in the actual image to be inspected; therefore, the edge may be clarified by expansion-processing the edge. Further, the extraction-processing by using the above-mentioned equations (1) and (2) causes the edge in any direction to be detected; however, the calculation with respect to the omnidirection is not necessarily required, that is, the one with respect to only the horizontal, for example, may be enough.

The above-mentioned edge image preparing section 12B has the function of preparing the edge image including an arbitrary edge which is extracted from the same image to be inspected. That is, the edge image preparing section 12B extracts all the horizontal edges in order to detect the longitudinal streak-like defects.

Figure 19:
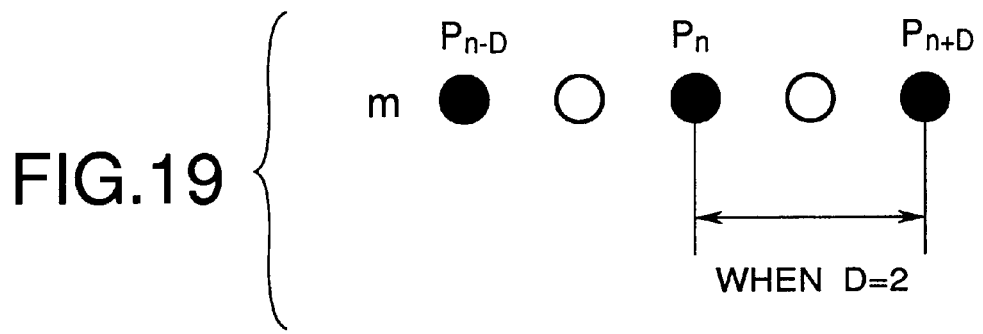
FIG. 19 is an explanatory view conceptually showing a differential operator for use in an edge extraction in the first embodiment.

In concrete terms, in order to detect the longitudinal streak-like defects, calculating the difference of the pixel values between the pixels with respect to the horizontal direction causes all the edges to be obtained. On this occasion, applying to the respective pixels the differential operator, represented by the use of the following equation (3), corresponding to the arrangement of the pixels in the horizontal direction schematically shown in FIG. 19 causes all the edges each including a line portion having a low contrast to be extracted, which enables the edge image including an arbitrary edge corresponding to the density difference to be prepared. Incidentally, in the equation (3), D designates a separately set constant (D≧1) of not less than 1. Suppose D=2 in this embodiment.

$$P_{n,m}=(2P_n-P_{n+D}-P_{n-D}) \quad (3)$$

Moreover, the edge image preparing portion 12B is adapted to normalize the result calculated by the use of the operators of the equation (3). The normalization is carried out for the purpose of displaying the subject image having the pixel values of 0 to 255 graduation values, although the simple calculated values by the equation (3) include minus and plus values (minimum: −510, maximum: +510) with the perfect flat portion as zero because the subject image has the pixel values of 0 to 255 graduation values.

The normalization is concretely to carry out "the subtraction before the normalization" by separating the equation (3) into the first term and the second term as shown by the following equation (4), and then to carry out "addition after the normalization" to the subtracted result; as a result, to carry out the calculation by the use of the following equation (5), in which M designates the graduation value correspond ing to the origin employed after the normalization. This M is set to 128 (=256÷2) in this embodiment.

$$P_{n,m}=(P_n-P_{n+D})+(P_n-P_{n+D}) \quad (4)$$

$$P_{n,m}=(2P_n-P_{n+D}-P_{n+D}+4M)/4 \quad (5)$$

In other words, to normalize the calculated results of the equation (3) by the equation (5) means that the calculation results of the equation (3), e.g. −510, 0, +510 is transformed to 1, 128, 255 which are obtained by dividing −510, 0, +510 by 4, and then shifting the divided results by 128, respectively. Therefore, this normalization enables the calculated results of the equation (3) to be displayed as the pixel values which are changed in the plus and the minus directions, respectively, with the graduation value 128 as an origin (median value).

The above-mentioned normalization is substantially the same processing as the image processing, which is carried out by a general image processing device, of realizing the display of 0 to 255 graduation when the pixel value resulting from the addition and the subtraction of the so-called frame-to-frame calculation becomes minus. For concrete example, provided that the result of the subtraction (image A-image B) is the image C, in which the images A and B are displayed by 0 to 255 graduation, respectively, the image C is of −255 to +255, that is, does not fall within the range of 0 to 255; therefore, M=128 holds, and then the image C is normalized by the use of the equation of Image C=(Image A+Image B)/2, which causes the image to fall with in a range of C 1 to 255.

Figure 20:
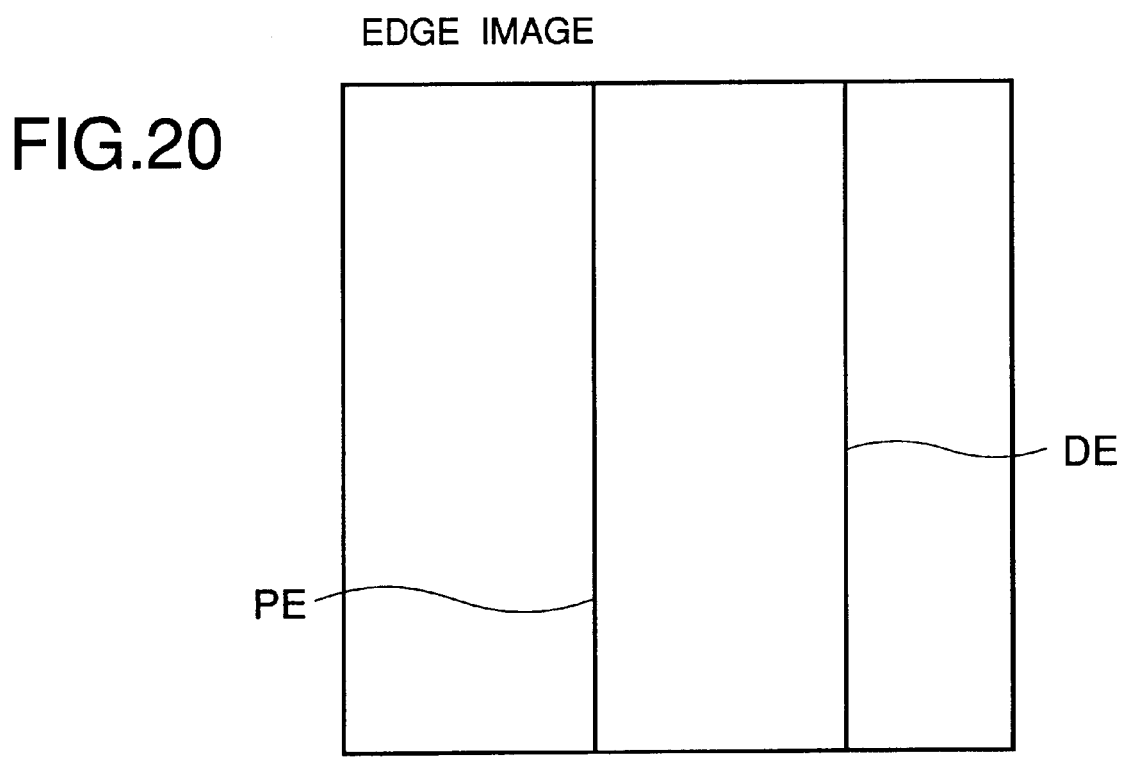
FIG. 20 is an explanatory view showing an edge image prepared by applying the differential operator in the same embodiment

FIG. 20 schematically shows the edge image obtained by applying the above-mentioned differential operator to the image to be inspected of FIG. 16, in which a strong edge PE exposed due to the pattern P and a weak edge DE exposed due to the doctor streak D are extracted. Moreover, it goes without saying that the edge image may be prepared by employing other edge extracting method except the differential operator.

The masked edge image composing portion 12C has the function of composing the edge image and the mask image which have been prepared. That is, the masked edge image composing portion 12C serves to compose the edge image and the mask image which have been prepared by the above-mentioned image processing, to determine the pixels which are outside the subject of inspection, and then to except the pixels in the subsequent processes.

Figure 21:
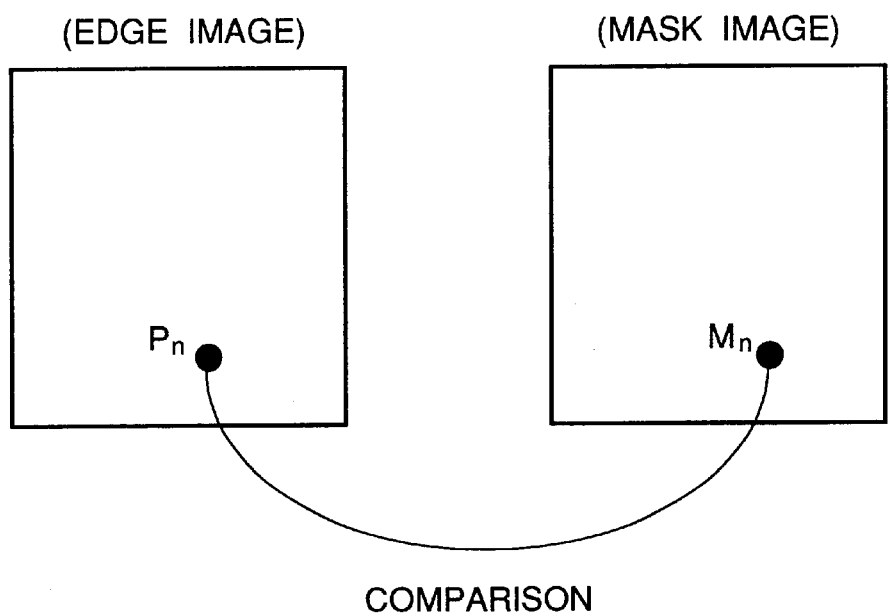
FIG. 21 is an explanatory view conceptually showing the composing principle of the mask image and the edge image in the same embodiment.

In concrete terms, referring to FIG. 21 which schematically shows the edge image and the mask image, the composition-processing is carried out by comparing the pixels Pn on the edge image and the corresponding pixels Mn on the mask image with each other, and then leaving the pixels Pn as they are when the pixels Mn do not constitute the edge portion (mask portion), but masking the pixels Pn when the pixels Mn constitute the edge portion (excepting them from the subject of inspection). In other words, this composition-processing is to set the pixels corresponding to the composed image to the pixel values of the pixels Pn as they are when the pixels Mn do not constitute the edge portion, but to set them to the graduation value 128 corresponding to the origin employed after the normalization when the pixels Mn constitute the edge portion, and then to subject the strong edge PE in the edge image to the mask-processing.

Accordingly, the above-mentioned masking-processing means that the pixels of the composed image corresponding to the edge portion of the mask image are set to the graduation value 128 set as the pixel value of the origin normalized by the equation (5), thereby enabling the masked image also obtained by the composition to be normalized to 128, and enabling the edge PE to be masked and then excepted from the subject of inspection, which enables the result, on a side of the minus, calculated by the use of the equation (3) to be displayed by graduation values 0 to 127.

Figure 22:
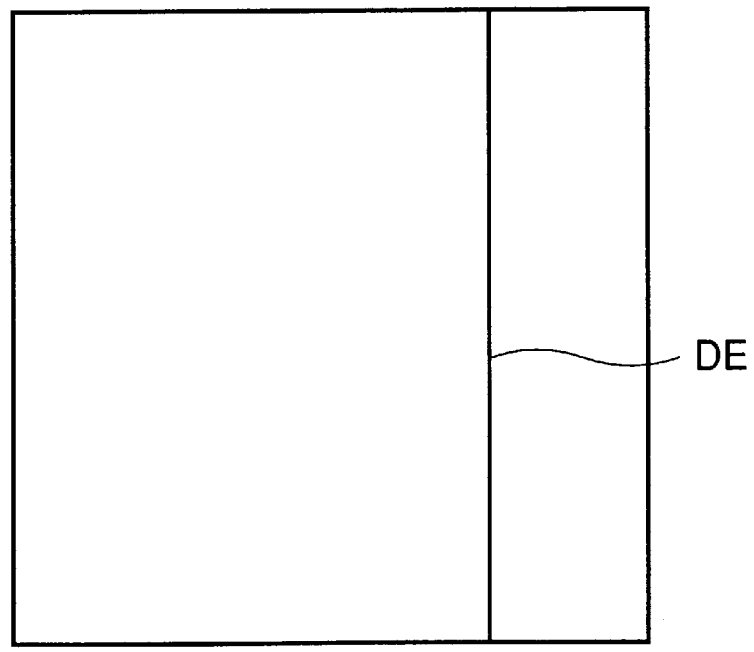
FIG. 22 is an explanatory view showing the composed masked edge image in the same embodiment.

FIG. 22 schematically shows the masked image prepared by subjecting the mask image of FIG. 18 and the edge image of FIG. 20 to the above-mentioned composition-processing, in which the image shows that the strong edge PE is excepted and that the weak edge ED exposed due to the doctor streak D remains.

A longitudinally adding portion 14A included in the streak emphasis-processing section 14 has the function of replacing the pixel values of the subject pixel with the sum of the pixel values of a predetermined number of the pixels including the subject pixel and arranged in the same direction, for the image, from which the pattern portion is excepted, obtained after the exception-processing, that is, the masked image shown in FIG. 22. This function will now be described taking the case in which a longitudinal streak is emphasized by adding the pixel values of the masked edge image longitudinally, thereby causing the noise component to be controlled.

The masked edge image prepared by the image composing section 12C comprises the pixels which are changed in graduation value in the upper and lower directions with the graduation 128 as the origin (reference value), respectively, according to the strength of the edge; however, its change amount is small. Therefore, there cannot be employed a method of setting the threshold value to the difference of the pixel value (density difference) to carry out the contraction-processing.

However, with the graduation 128 as the origin (=0), the masked edge image has the pixel values which distribute substantially equally in both the plus and the minus directions on the flat portion, whereas the streak-like defect portion has the pixel values which distribute partially on any one of the plus and the minus directions.

Therefore, adding the pixel values of the pixel located within a predetermined longitudinal range to the above-mentioned image increases the pixel values of the streak-like portion in any of the plus and the minus directions, but not so much for the flat portion due to the compensation, which enables the pixel values to be emphasized.

Figure 23:
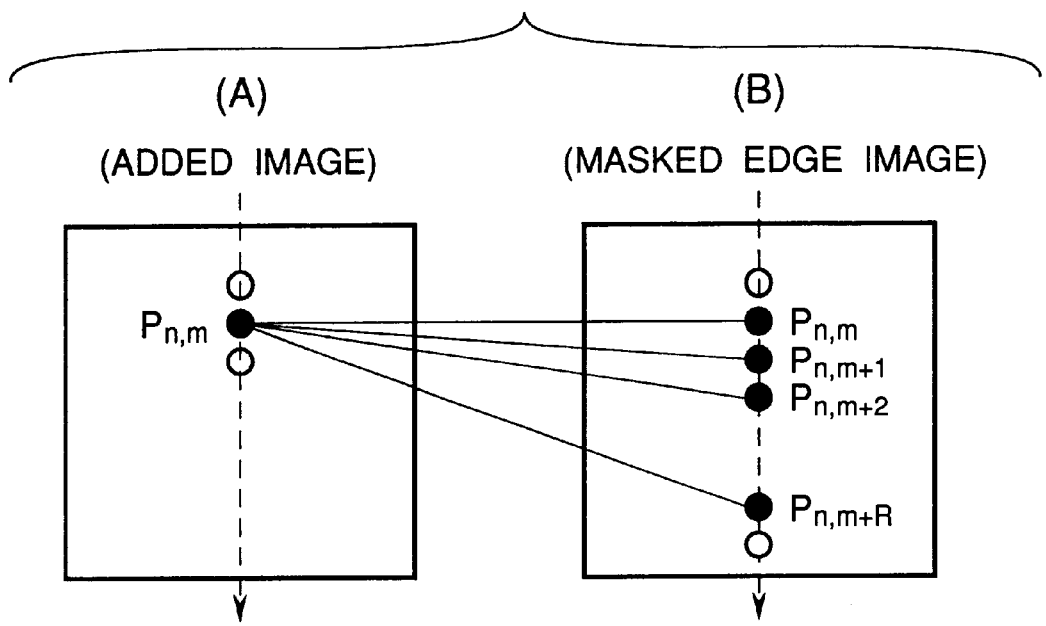
FIG. 23 are explanatory views showing an adding method of emphasizing longitudinal image pixel values in the same embodiment.

FIG. 23 schematically shows the principal of the above-mentioned emphasis-calculation of adding the respective pixel values to the masked edge image shown in FIG. 23(B) from the pixel $P_{n,m}$ up to the R pixel in the vertical direction, and setting the added pixel value as the pixel value of the pixel $P_{n,m}$ of the added image shown in FIG. 23(A). That is, the pixel values of the added image are calculated by the use of the following equation (6). However, the respective pixel values are given, when carrying out the above addition-processing, by the pixel value normalized by the use of the equation (5) marked with the plus sign when it is more than 128 with the original as the graduation value 128, and the pixel value with the minus sign when it is less than 128. Moreover, R designates a constant which is experimentally determined.

$$P_{n,m}=P_{n,m+1}+P_{n,m+2}+\ldots P_{n,m+R} \qquad (6)$$

Figure 9:
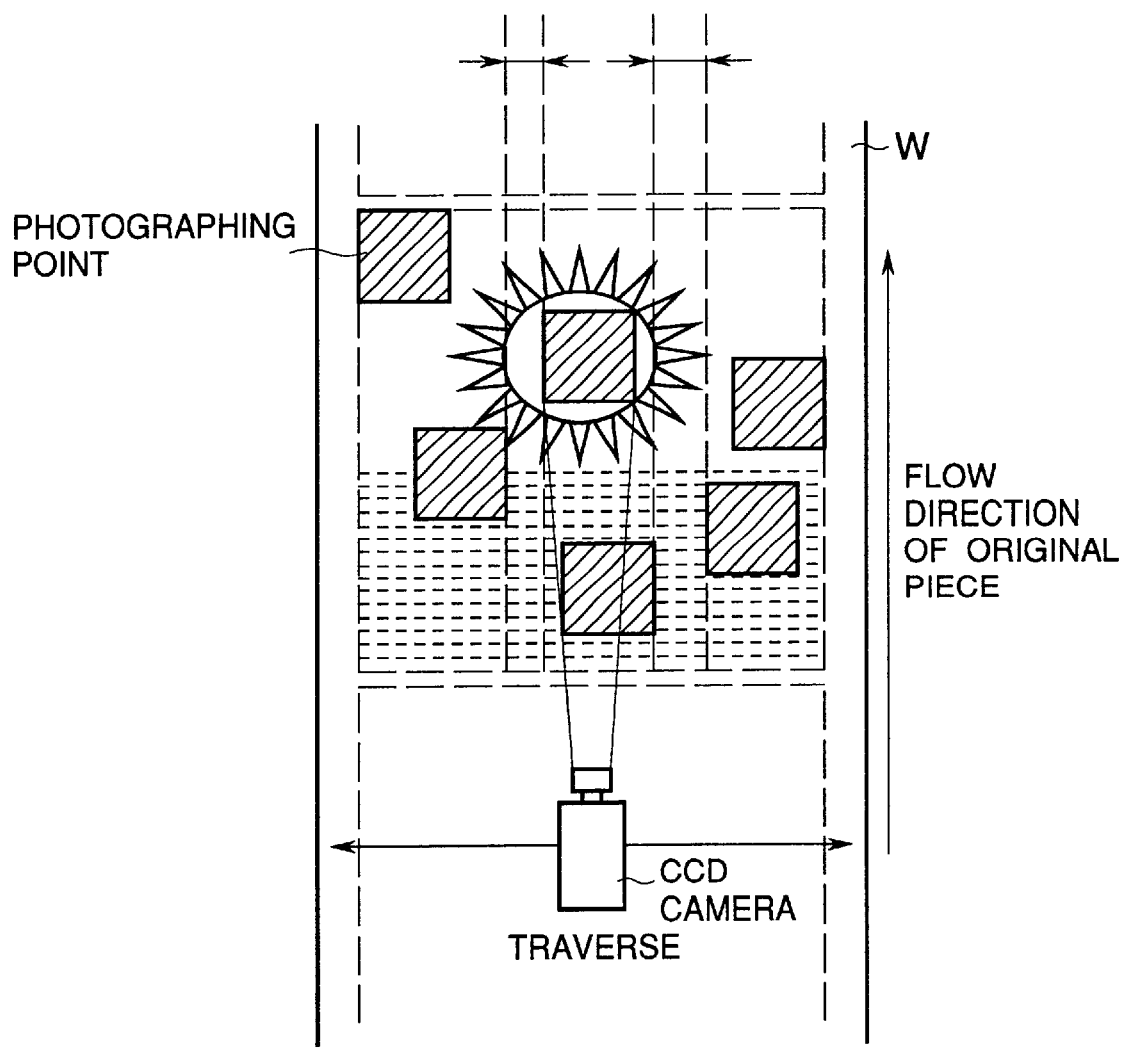
FIG. 9 is an explanatory view conceptually showing an inputting method using a partially inputting camera.
Figure 10:
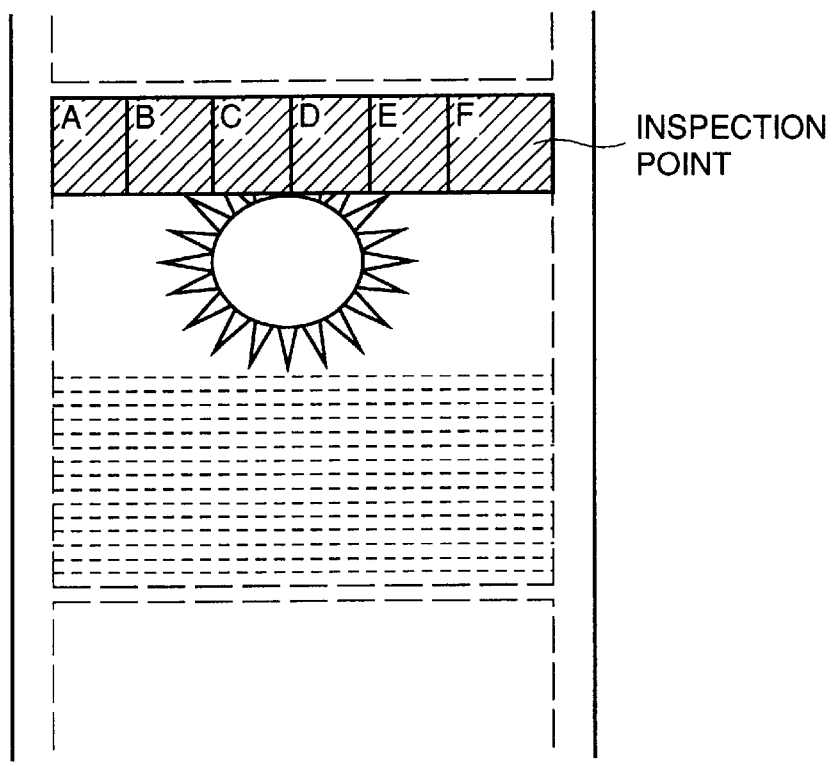
FIG. 10 is an explanatory view showing an example of an inspection point setting method.
Figure 11:
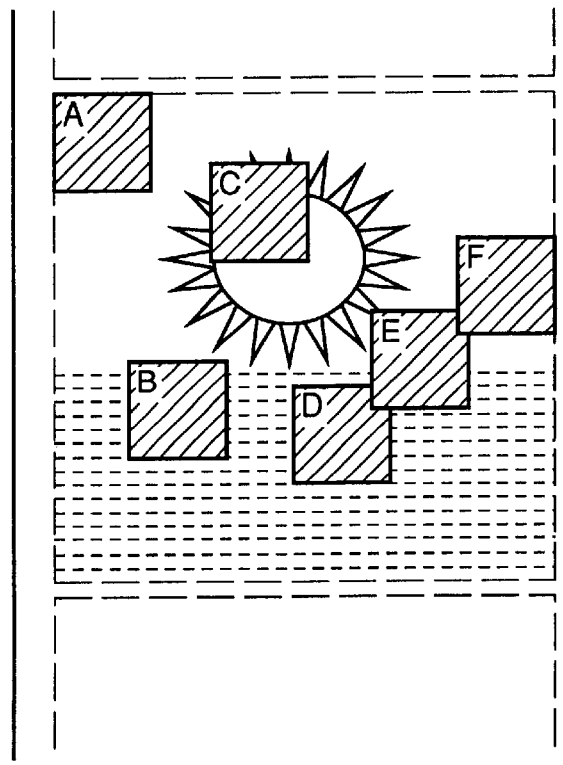
FIG. 11 is an explanatory view showing another example of an inspection point setting method.
Figure 12:
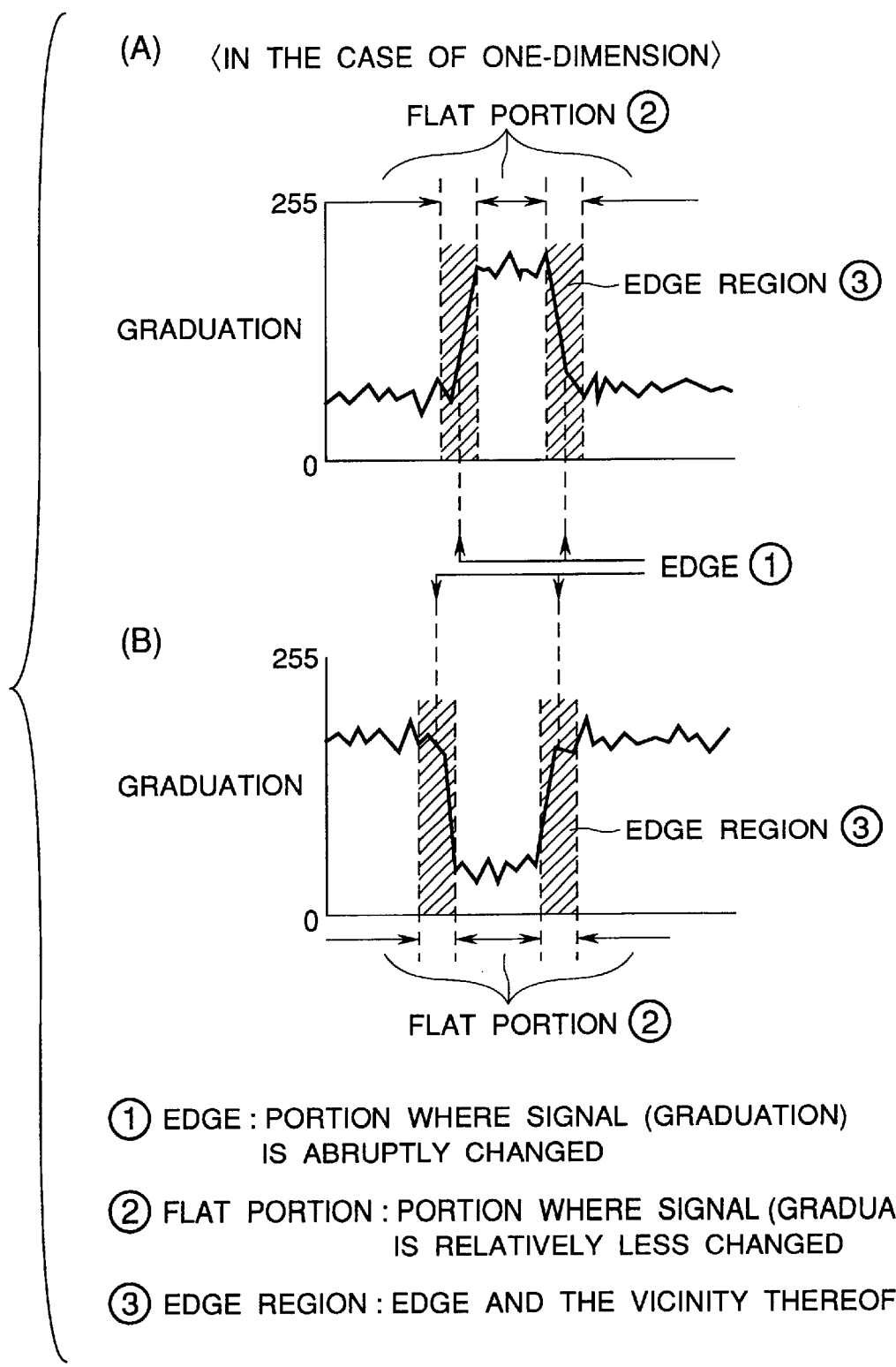
FIG. 12 are diagrams conceptually showing the relationship between an image signal and an edge region.
Figure 13:
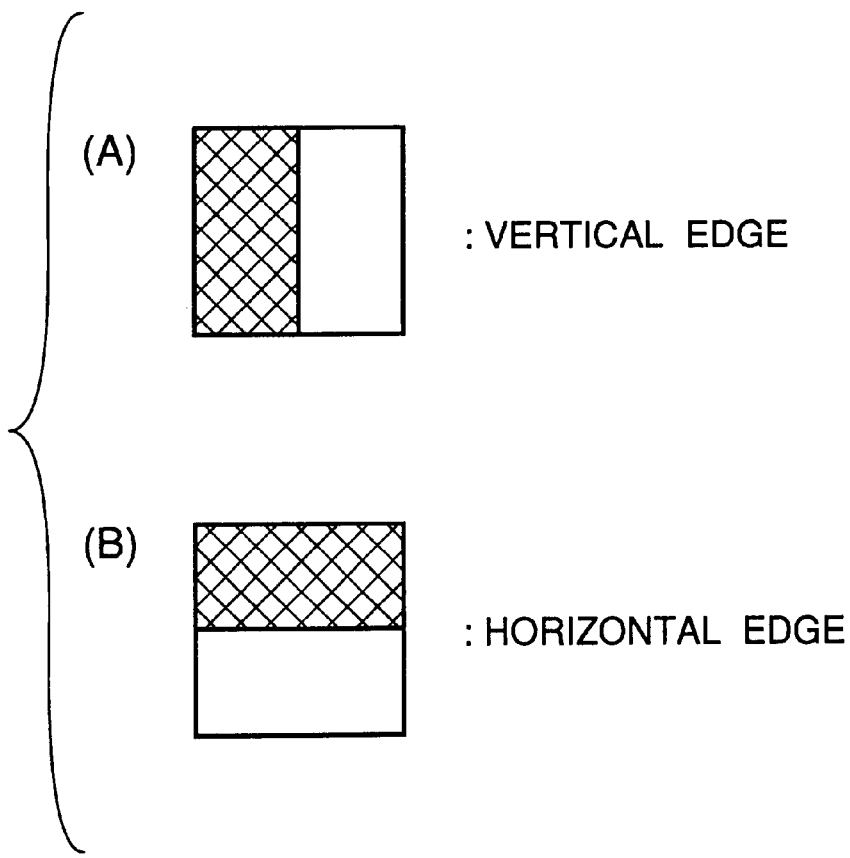
FIG. 13 are explanatory views schematically showing vertical and horizontal edges.

Subjecting $P_{n,m+1}$, $P_{n, m+2}$ . . . to the similar addition-processing in turn disables the plus and the minus pixel values to be compensated on the pixels of the flat portion as described above, thereby preventing them from being remarkably changed from the graduation 0, but enables the added image having the pixel values emphasized to any one of the plus and the minus values to be prepared on the pixels of the streak-like defect portion. This causes the image having the weak edge DE exposed due to the streak-like defect of FIG. 9 being emphasized and the pixel values which are distinct in the plus and the minus signs to be obtained.

Moreover, the adding method for the streak emphasis-processing is not limited to the method of adding the pixel values of the pixel blow the head pixel as calculated by the use of the equation (6), but any other method may be employed insofar as it is capable of adding the pixel values of a predetermined number of the pixels arranged in the same direction. For example, the medial pixel value may be calculated by the following equation (6'):

$$P_{n,m}=P_{n,m-R/2}+\ldots+P_{n,m}+\ldots P_{n,m+R/2} \qquad (6')$$

A binary-coding section 16A included in the judging section 16 has the function of preparing a binary-coded image by providing a threshold value on and binary-coding the added image which is prepared by the longitudinally adding section 14A and the longitudinal streak portion is emphasized.

In concrete terms, in order that the emphasis-processed image having the pixel values, emphasized in the plus or the minus direction, obtained by adding the pixel values of the longitudinal streak portions is separated into the streak-like points (pixels) and the others, the threshold value T2 (determined experimentally), for example, is provided. The pixel having the pixel values each is not less than the threshold T2 in absolute value may be possible to be a part of the streak; therefore, the pixel is turned on in order to be proposed as the streak-like point when $|P_{n,m}| \geq T2$ holds, whereas it is turned off because it is determined not to be the streak-like point when $|P_{n,m}| < T2$ holds. Moreover, the binary-coding processing carried out here is not limited to the above-mentioned method, but the moving average method, the discriminant analysis method and the like may be employed.

A line recognizing section 16B included in the judging section 16 has the function of judging whether or not the pixel constitutes a longitudinal line(streak)-like defect based on whether or not the turned on pixels of not less than a predetermined number exist on the above-mentioned binary-coded image, which is binary-coded after the emphasis-processing, in the longitudinal direction (substantially in the same direction).

Figure 24:
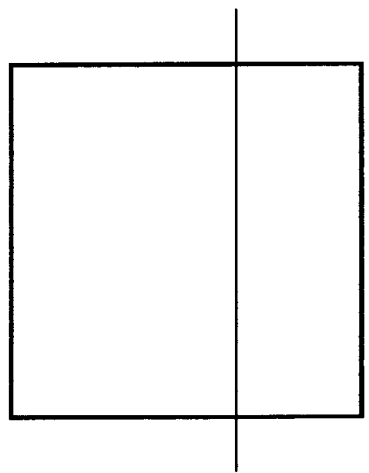
FIG. 24 is an explanatory view conceptually showing an judgment process of the streak-like defect in the same embodiment.

In concrete terms, the above-mentioned judgment is carried out in the following, for example. When the streak-like defect to be detected is very thin and narrow, they may not possibly be connected as one line on the binary-coded image. Therefore, as conceptually shown in FIG. 24, the binary-coded image, having the turned on pixel of not less than a threshold T3 in one line in the longitudinal direction with the pixel as a unit, is decided to be of the streak-like defect to be detected. This threshold T3 is previously determined by the use of the experiment.

By the way, the above-mentioned judgment is not necessarily limited to carry out up to pixels of a single line. Number of turned on pixel may be calculated over not less than 2 lines. Because the streak-like defect may be spread over adjacent 2 lines. Further, on occasion demands, the processing of previously excepting the isolated point or the like may be carried out by causing the turned on pixels to contract by a plurality of pixels in the longitudinal direction, and then expanding the expanding pixels by the same number.

As described above, in this embodiment, the masked edge image is prepared by inputting the image to be inspected, preparing the mask image and edge image from the image to be inspected, and then composing both the images. From the image is prepared a longitudinally added image in order to emphasize the pixel values, and then from the emphasized image is prepared a binary-coded image, and further the binary-coded image is subjected to the line recognition.

In other words, even if the image to be inspected includes a pattern, it is subjected to the masking-processing for excepting the edge portion, which is high in contrast, from the subject of the processing, and further to the addition-processing, thereby causing the streak-like defect which is low in contrast to be emphasized and then detected.

According to this embodiment, even if the image to be inspected includes the pattern, the streak-like defect which is low in contrast can be detected from the image without detecting the edge portion of the pattern. This enables the fine streak-like defect which is low in contrast, called the doctor streak, to be automatically detected, although the defect has been capable of being detected by only the visual check according to the conventional inspection of the printed matter.

Next, a streak-like defect inspection device according to a second embodiment of the present invention will now be described. This second embodiment is to prepare the mask image of the first embodiment by the use of the method of claims 3 and 4.

The inspection device of the second embodiment is substantially identical with that of the first embodiment, except that the mask image preparing section 12A is constituted by an edge region extracting device having the function of preparing a mask image having an edge region extracted by the use of the method described later, as a mask portion.

Figure 25:
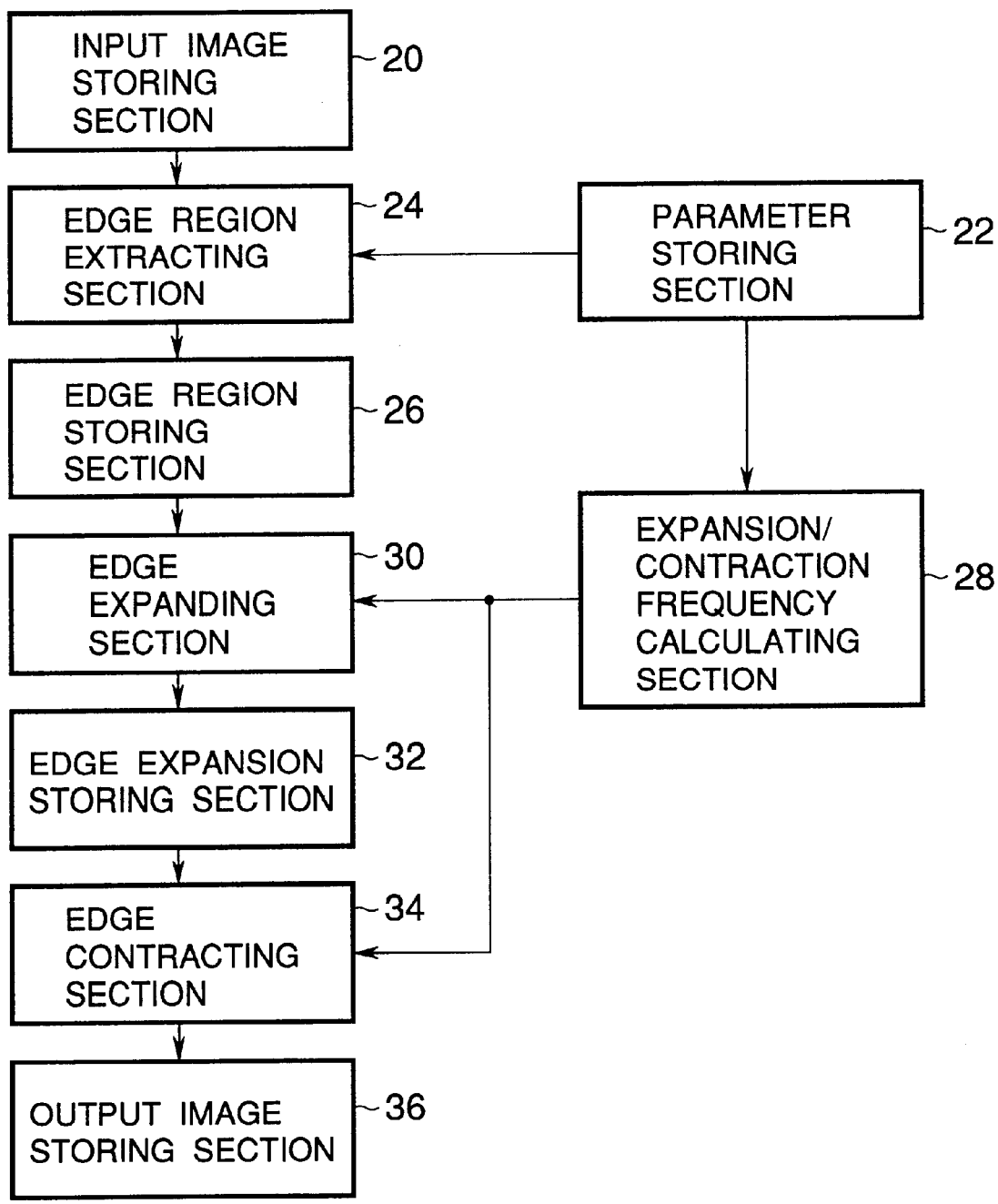
FIG. 25 is a block diagram showing the general arrangement of an edge region extracting device applied to a second embodiment of the invention.

The edge region extracting device applied to this embodiment, the general arrangement of which is shown in FIG. 25, comprises an input image storing section 20 for storing the image to be inspected to which the pattern and the like from the printed matter is input by the image inputting section 10 comprising a CCD area sensor camera having the size of sight of 30 mm×30 mm, for example, and further comprises a parameter storing section 22, an edge region extracting section 24, an expansion/contraction number calculating section 28, an edge expanding section 30, and an edge contracting section 34, which are capable of carrying out the respective processings, described later in detail, to the input image (image to be inspected) read out from the storing section 20, and further comprises an edge region storing section 26, an edge expansion storing section 32, and an output image storing section 36, which stores the results processed by the edge extracting section 24, the edge expanding section 30, and the edge contracting section 34, respectively.

The parameter storing section 22 aims to set, as parameters, the number of pixels L for defining the position of comparing the pixel values when extracting the edge regions from the input image read out from the input image storing section 20, a threshold value T for use in the judgment thereof, and an edge-to-edge pixel number W for defining the maximum width of the flat portion used for excepting the edge from the edge region. The values of these parameters are previously input by a key board, for example. However, these parameters are restricted by the following equations:

$W \geq 1$ $L \geq W$ $0 \geq T \geq$ Maximum pixel value

In the case of the doctor streak, W may be to ten pixels, for example.

Moreover, the above-mentioned threshold value T includes the equality taking the case in which this embodiment is applied to the inspection device; although it is not required to include the equality when preparing the mask image. That is, the actual inspection device is adapted to cope with the case, by satisfying T=0, in which the inspection work is actually stopped with overall masking and without stopping the inspection device, and with the case, by satisfying T=Maximum pixel value, in which all the edges are desired to be inspected irrespective of the width of the flat portion, or the pattern having no edge is inspected.

FIG. 26 schematically shows the case of extracting the edge region extending vertically. The edge region extracting section 24 aims to compare the pixel values of the pixel $P_{n-L,m}$ and $P_{n+L,m}$ each represented by symbol ●, which are located L pixels apart from the subject pixel $P_{n,m}$ represented by symbol ● in the respective reverse direction, by using the parameters L and T read out from the parameter storing section 22, and judging and extracting the subject pixel as the edge region when the compared difference exceeds the threshold value T. The edge region extracted by the edge region extracting section 24 is once stored in the storing section 26. Incidentally, when the edge region extends horizontally, or both horizontally and vertically, the extraction is realized based on the same principal of calculation.

The expansion/contraction number calculating section 28 aims to input the parameter W from the parameter storing section 22, calculating such an expansion pixel number N as an expansion number as to prevent both the edge regions from being contacted (connected), when expanding widths of a pair of the edge regions extracted for the flat portion having the edge-to-edge pixel number of W, and calculating such a contraction pixel number P as a contraction pixel number as to cause the expanded edge region to contract.

FIG. 27 schematically shows the meaning of the expansion number N calculated by the calculating section 28. As shown in FIG. 27, the frequency N satisfies: $N=N_A+N_B$, where $N_A=L-W$, and $N_B=(W-1)/2$.

As shown in FIG. 27(B), $N_A$ designates the length of the flat portion (the number of the pixels) from the edge to the edge region extracted by the use of the above method, and NAS are the same for left and the right edge regions; however, $N_A$ is given by L−W because the pixel number between the right end of the edge region and the right end of the flat portion is represented by L due to the principal of extraction shown by FIG. 17, as illustrated here as to only the left edge region for convenience.

$N_B$ is calculated by (W−1)/2, as shown in FIG. 27(A), because it requires to be of such the number of pixels as to leave one pixel at least a center of the flat portion in order to, when expanding the left and the right edge regions by N pixels, respectively, prevent both the edges from contacting to each other. However, the number of pixels left at the center is not limited to one, but two may be employed. In that case, $N_B=(W-2)/2$ holds. Moreover, the fractions of $N_B$ are omitted.

In this manner, setting the frequency N absolutely prevents both the edge regions from being connected so long as the edge-to-edge width is not more than the pixel number W even if the left and the right edge regions are subjected to the expansion by N pixels, otherwise, causes both the edge regions to be unfavorably connected.

Further, the calculating section 28 calculates such a contracting pixel number P1 as to cause the edge region exposed after the N pixels are expanded to contract. In this embodiment, P1=N holds as shown in the following equation:

$$P1=N=L-W+(W-1)/2 \qquad (7)$$

The edge expanding section 30 carries out an expansion-processing to expand the edge region extracting image read out from the edge region storing section 26 by the pixel number corresponding to the expansion number N obtained by the calculating section 28. There is schematically shown with respect to one-dimensional signal in FIG. 28 the above-mentioned expansion-processing taking the case of horizontally expanding the edge region by one pixel (frequency N=1).

Figure 28:
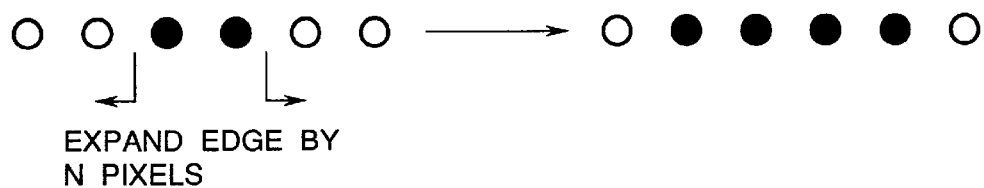
FIG. 28 is an explanatory view showing the principle of expansion-processing the edge region in the same embodiment.

As shown in FIG. 28, symbol ● designates the edge region, and one time expansion means that the width of the edge region is extended by one pixel in both the horizontal directions.

The image data expansion-processed by the edge expanding section 30 is stored by the edge expansion storing section 32, and then read out by the edge contracting section 34 where the image data is contraction-processed by the same pixel number as that of the pixels expanded by the edge expanding section 30.

Figure 29:
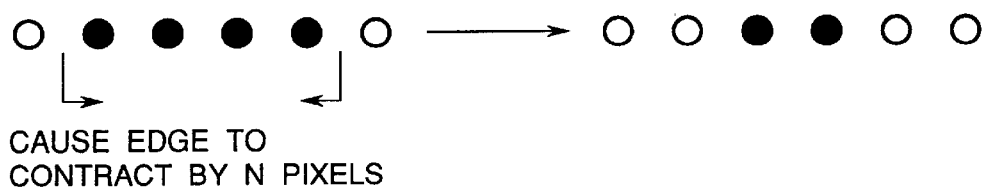
FIG. 29 is an explanatory view showing the principle of contraction-processing the edge region in the same embodiment.

FIG. 29 schematically shows the contraction-processing carried out to the edge region which is expansion-processed as explained by FIG. 28. As shown in FIG. 29, the contraction-processing means that the pixels of the same number as the expanded ones are decreased from the both sides of the expanded edge region; therefore this processing causes the expanded edge region to return to the former non-expanded edge region except the case in which both the edge regions have been connected. The contracting edge region image is stored by the output image storing section 36.

Next, the operation of the second embodiment will be described.

In this embodiment, predetermined numeral are input as the parameters L, W, and T, and the input image is subjected to respective extraction-, expansion-, and contraction-processings of edge region according to the above-mentioned principals, thereby enabling the edge region to be extracted to the position including no edge in the case of the flat portion having the edge-to-edge pixel number of not more than W (corresponding to a fine streak), conversely enabling the edge region to be extracted to the region including an edge when more than W.

This situation will be described in detail with reference to FIGS. 30 to 32, taking the case in which W=3, L=5 hold, and the expansion number N and the contraction number P1 each is L−W+(W−1)/2=5−3+(3−1)/2=3.

Figure 30:
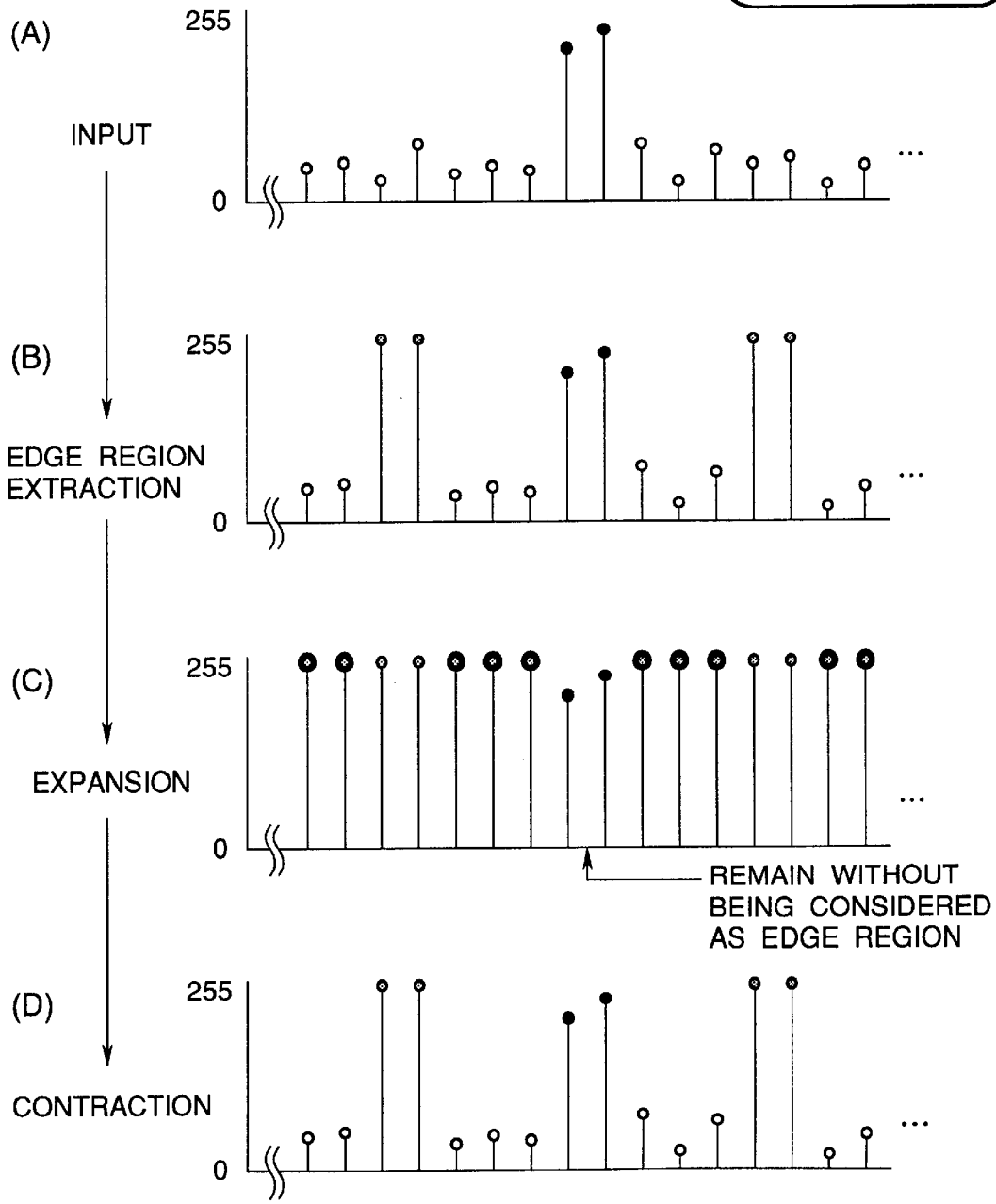
FIG. 30 are explanatory views showing an edge region extraction-processing procedure to a thin line in the same embodiment.

FIG. 30 shows the case in which the edge of the line having the width (edge-to-edge pixel number) of 2 is not determined to be of the edge region. When one-dimensional input image has the width of two pixels as shown by the symbol ● in FIG. 30(A), the pixel numbers located five pixels apart from the subject pixel in the left and the right directions, respectively, are compared according to the principal shown in FIG. 26, and the subject pixel which causes the compared value to exceed the threshold T is determined to be of the edge region, which provides the image shown in FIG. 30(B) in which the edge regions each having two pixels shown by half-tone dot meshing circles at both sides of the two symbols ● are extracted.

Next, the two edge regions are subjected to the expansion-processing of extending them by three pixels (N=3) in the left and the right width-directions, respectively, as shown in FIG. 30(C) and then are subjected to the contraction-processing of decreasing three pixels similarly, which provides the final edge region extracted image shown in FIG. 30(D).

In this example, as can be seen from FIG. 30(C), the expansion-processed edge regions shown by a half-tone dot meshing double circle are not connected to each other, thereby causes the respective edge regions to be contraction-processed at the both sides. This causes the edge regions to be finally extracted at a position apart from the symbol ● corresponding to the both side edges of the streak, as shown in FIG. 30(D).

Figure 31:
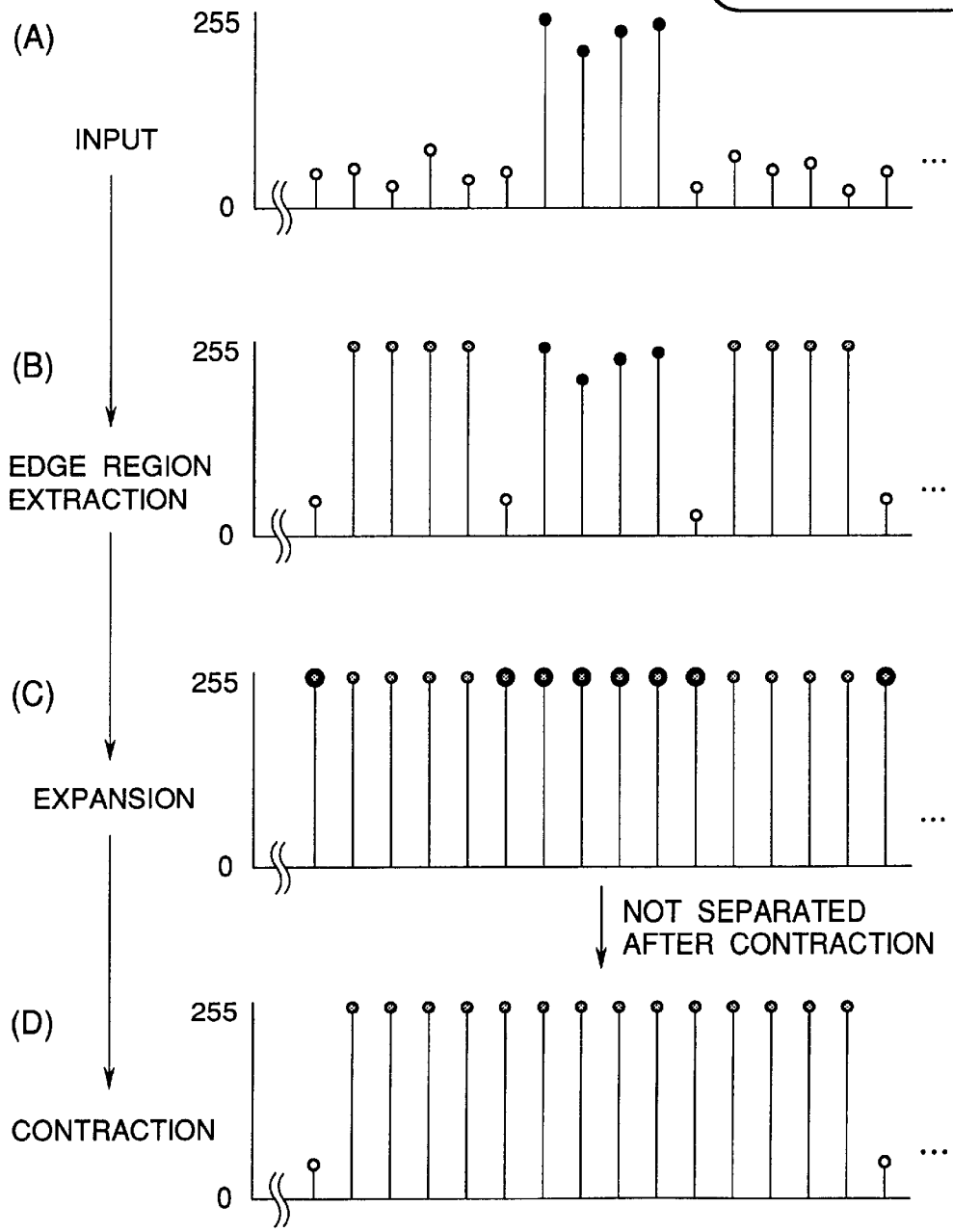
FIG. 31 are explanatory views showing an edge region extraction-processing procedure to a middle line in the same embodiment.

On the contrary, the processing result of the case of the line having the width of 4 more than the case of W=3 shows that the expansion-processed two edge regions are connected to each other as shown in FIG. 31(C), forming one large edge region as shown in FIG. 31 corresponding to FIG. 30.

In this manner, when the two edge regions are connected into one, the connected portion is not subjected to the contraction-processing, thereby causing the contracting edge regions to continue, as shown in FIG. 31(D), from the left end of the left-hand edge region to the right end of the right-hand edge region which are extracted as shown in FIG. 31(B), thereby causing the four pixels of the symbols ● corresponding to the line shown in FIG. 31(A) of the input image to be perfectly broken and then included inside the contracting edge region, which causes the edge to be, of course, included therein.

Figure 32:
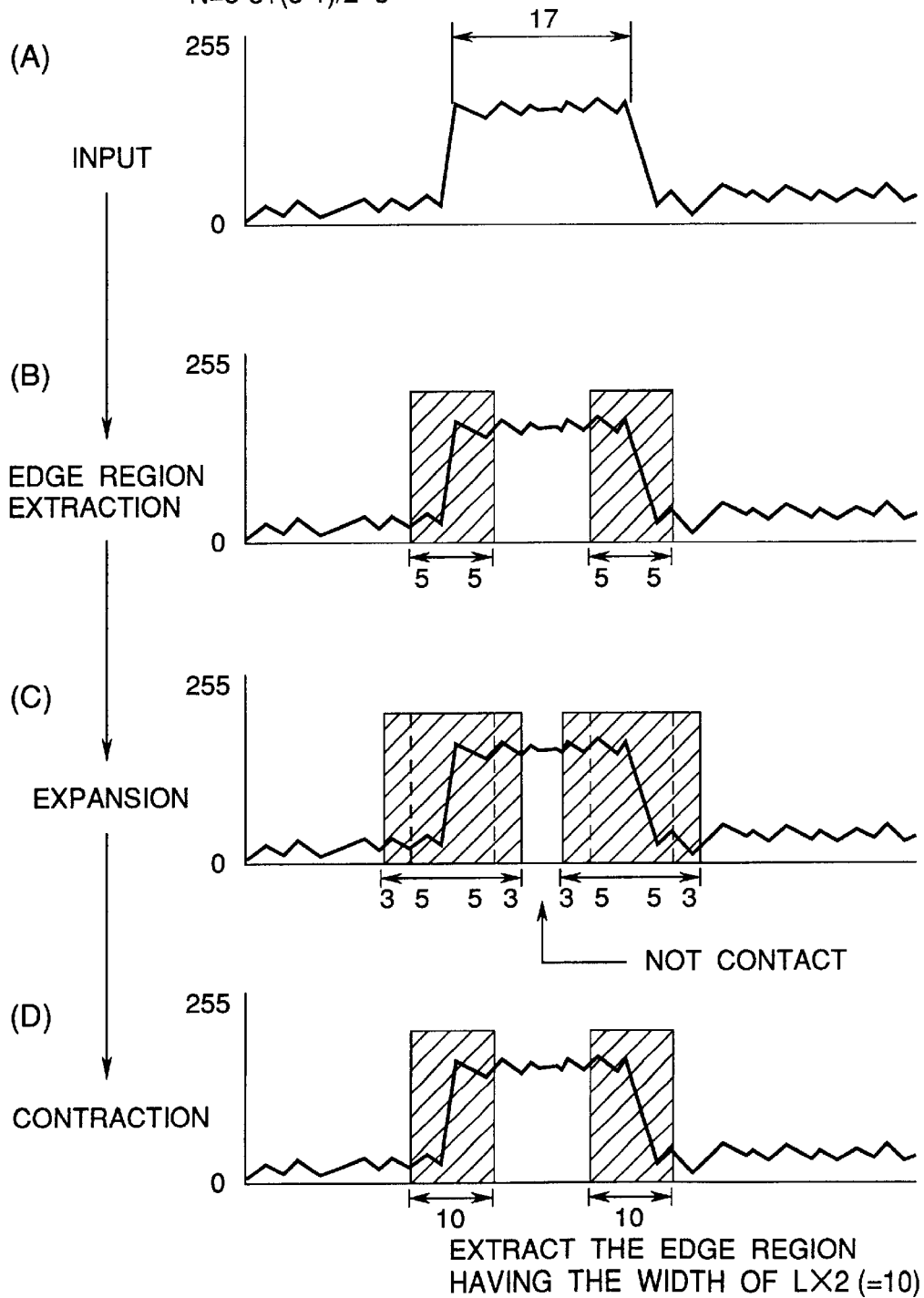
FIG. 32 are explanatory views showing an edge region extraction-processing procedure to a heavy line in the same embodiment.

Moreover, in the case of the width of 17 pixels, which is sufficiently wider than the line of the input image to be inspected of FIG. 30(A), the edge region having the width of 2 L (5×2=10) with the edge as a center is extracted at a stage of FIG. 32(B), as shown in FIG. 32 which is simplified more than FIGS. 30 and 31, which prevents the left and the right edge regions to be connected to each other at an inside thereof as shown in FIG. 32(C) even if these edge regions are subjected to the expansion-processing of N=3. This causes the respective edge regions to contract by N=3 at both sides thereof for the next contraction-processing, which causes the edge regions to return to the same condition of FIG. 32(B), as shown in FIG. 32(D). In this case, the left and the right edges are perfectly included in the left and the right corresponding edge regions (half-tone dot meshing range), respectively.

Figure 33:
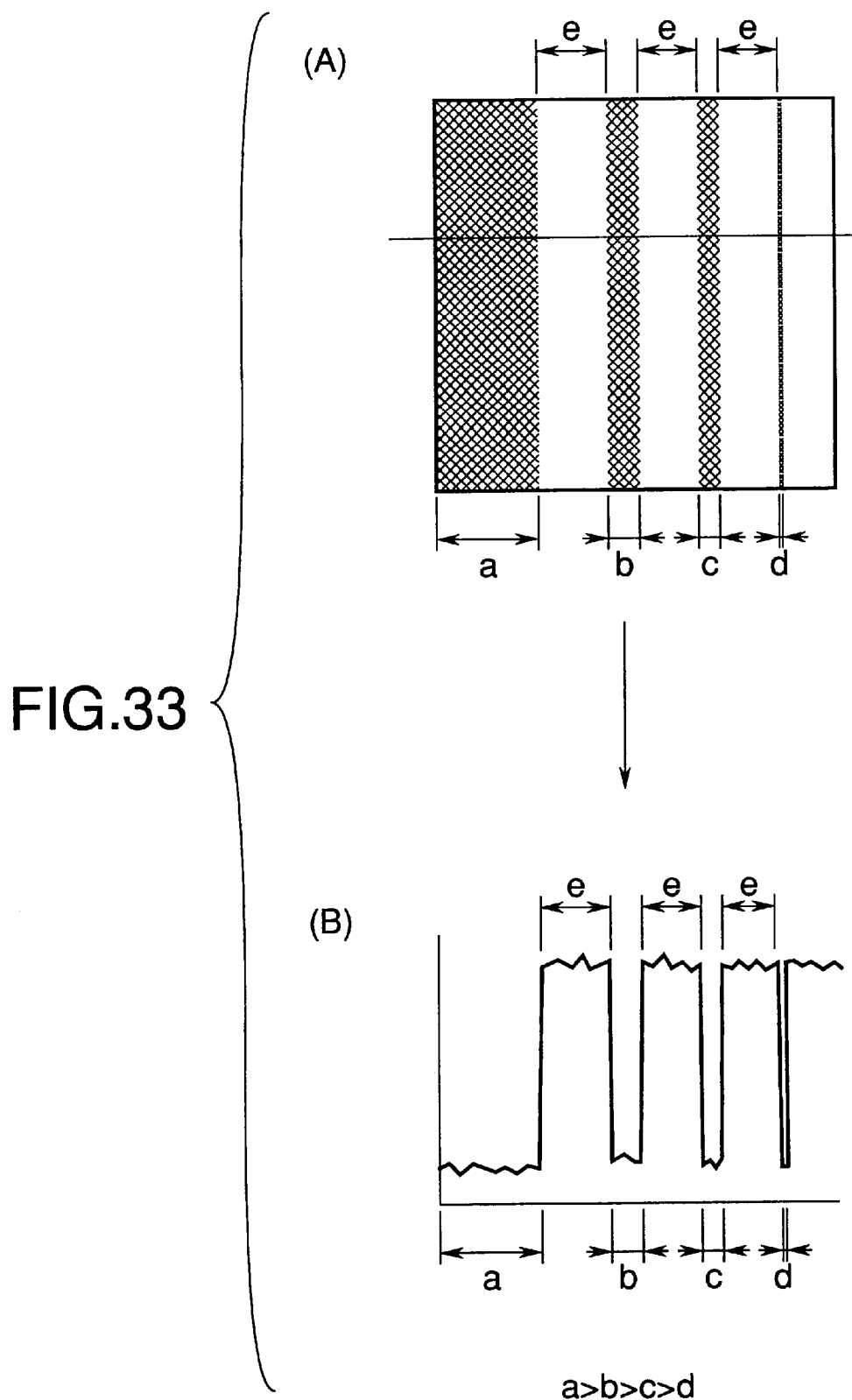
FIG. 33 are explanatory views schematically showing the image to be inspected.

Moreover, an edge region extracting method according to this embodiment will be described taking the case in which it is applied to the whole image to be inspected shown in FIG. 33(A). This image to be inspected, which schematically shows the pattern, corresponds to the image in which four kinds of rectangular patterns and the like having widths of a to d are arranged at regular intervals e. The line having the narrowest width d corresponds to the doctor streak. Further, FIG. 33(B) schematically shows the horizontal graduation values of the respective pixels shown in FIG. 33(A).

FIGS. 34 to 36 show the results (C) to (E) of the extraction-, expansion-, the contraction-processing of the edge region, together with the results of the former processings, respectively. As shown in these drawings, the edge region having the width corresponding to that of the line is extracted at a position apart from the line (streak) only in the case of the width d corresponding to the line which is not more than parameter W. As a result, as can be seen from FIG. 36, only the edges of the line having the width d is not included in the contracting edge region, and then the edges of all the line having the other wider width are included in the edge regions.

This embodiment is capable of extract the edge region based on the vertical edge in the image, but prevents, when the width of the flat portion between the edges is not more than a constant (=W), the edge from being extracted, which enables thin lines to be excepted, and then enables the edge regions including thick lines thicker than the thin lines, and usual patterns to be extracted.

In other words, the mask image is prepared with thus extracted edge region as the mask portion, thereby enabling only the edges of the patterns to be excepted with the flat portion and the thin streak-like defects remained.

Figure 37:
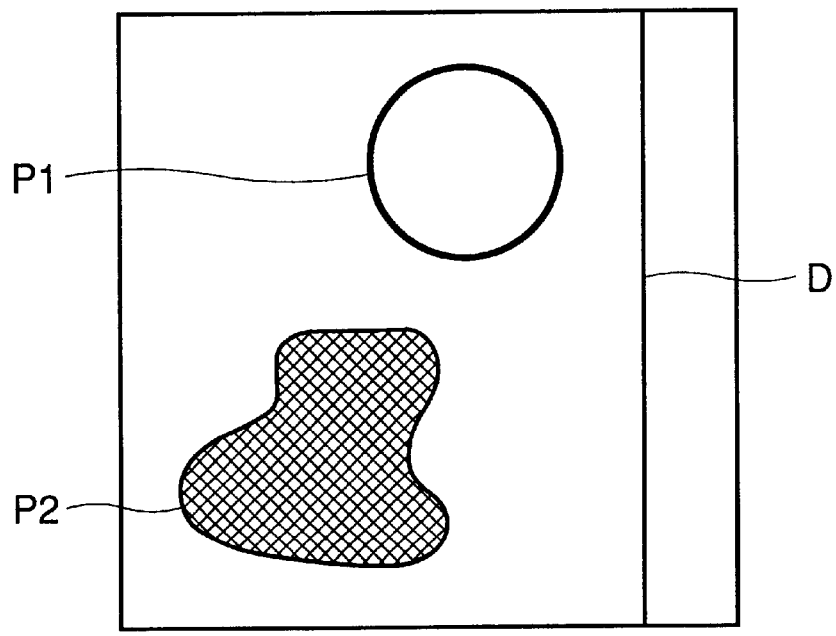
FIG. 37 is an explanatory view schematically showing one example of another image to be inspected obtained by inputting a pattern to be printed.
Figure 38:
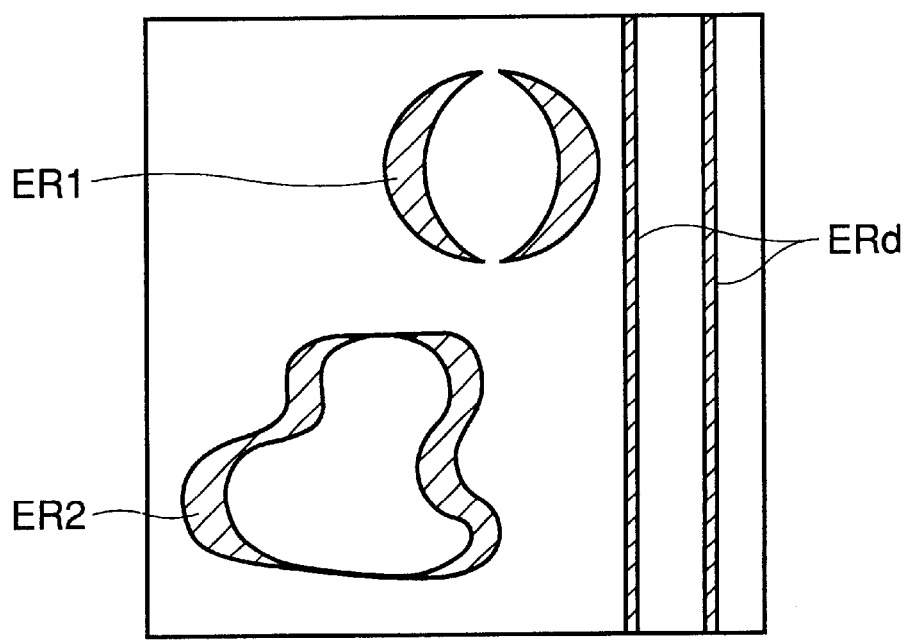
FIG. 38 is an explanatory view showing a mask image prepared from the image to be inspected.

There is shown in FIG. 38 the mask image prepared with the edge region, extracted by the use of the method of this embodiment, as the mask portion, in which the original image (image to be inspected), to which the pattern to be printed is input, includes a fine doctor streak D together with a usual pattern P1 (shaped like ring), P2 (color pattern), as shown in FIG. 37. That is, the usual pattern is extracted as the edge region at its portion in the vicinity with the edge as a center (shown by hatching), but the doctor streak D is not included in the edge region, as is the case with FIG. 35.

Figure 39:
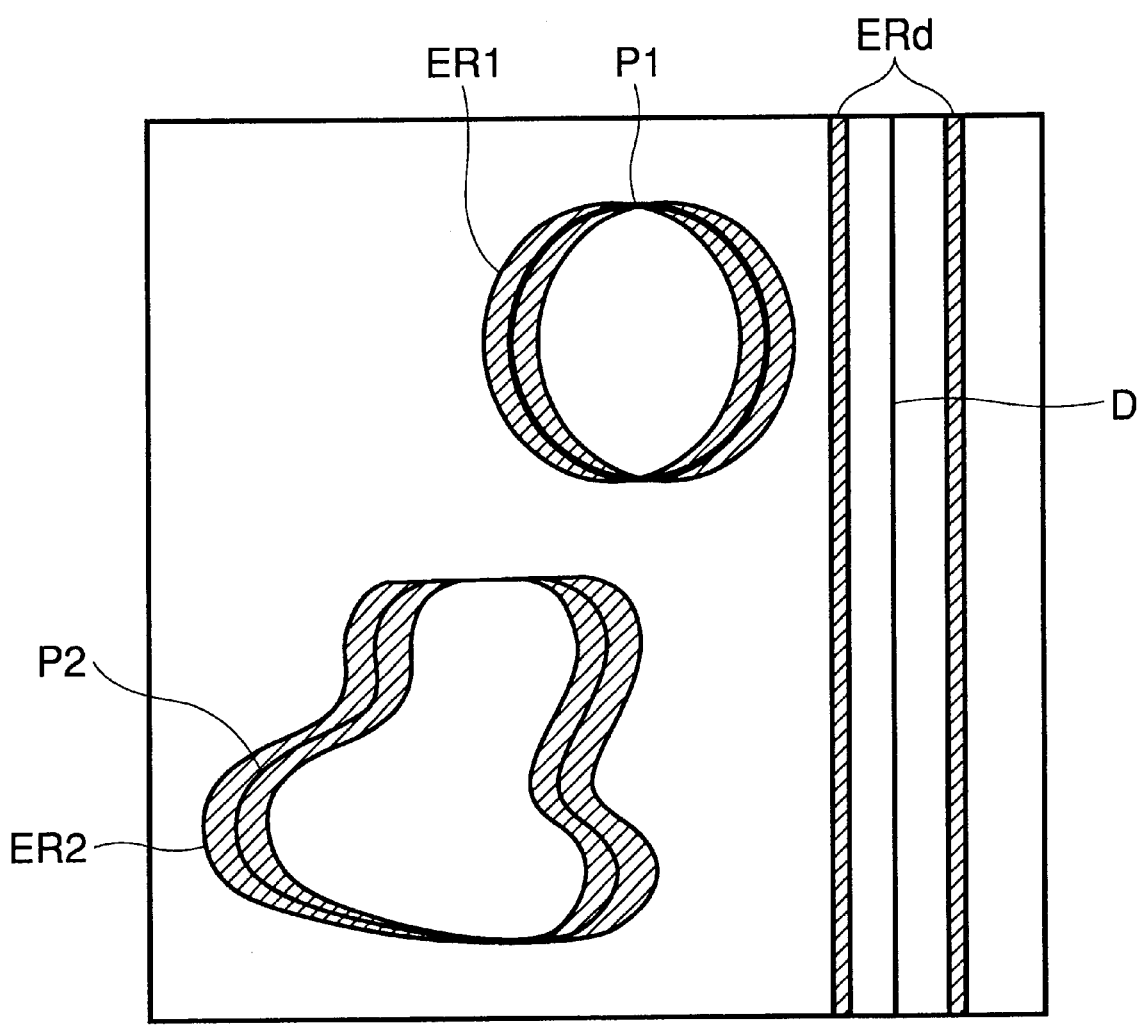
FIG. 39 is an explanatory view of conceptually showing the relationship between an original image and a mask image.

Therefore, as shown in FIG. 38, there is prepared the mask image in which the mask portions (edge region) designated by ER1, ER2 are formed on the patterns P1, P2, and two mask portions designated by ERd are formed on both sides of the doctor streak. There are schematically shown in FIG. 39 the relationship between the mask image and the original image of FIG. 37. On the other hand, preparing the edge image from the image to be inspected of FIG. 37 by the edge image preparing section 12B enables the image, from which all the edges PE1, PE2, DE are extracted, to be obtained.

Figure 40:
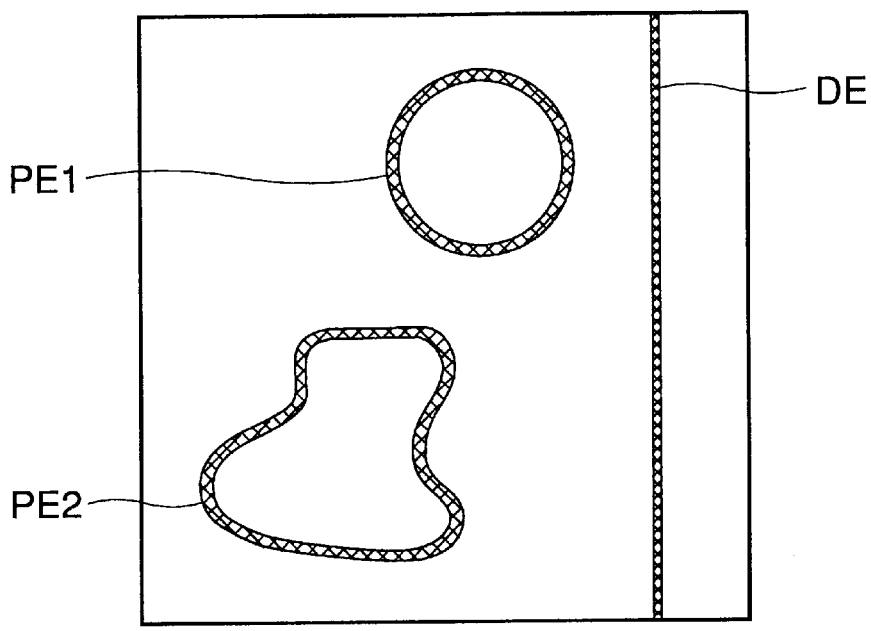
FIG. 40 is an explanatory view showing an edge image prepared from the image to be inspected.
Figure 41:
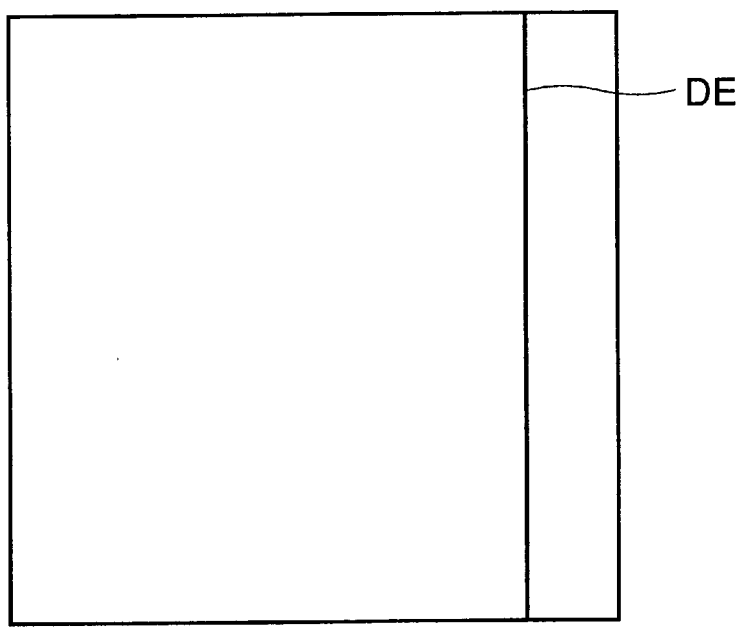
FIG. 41 is an explanatory view showing the masked edge image by obtaining by composing the mask image and the edge image.

Further, composing the mask image of FIG. 38 and the edge image of FIG. 40 by the image composing section 12C enables the masked edge image shown in FIG. 41, which is substantially the same as that of FIG. 22, to be prepared.

Thereafter, carrying out the same processing as the above-mentioned first embodiment enables streak-like defects, e.g. the doctor streak for the printing, which cannot be detected under normal conditions, to be detected.

According to the second embodiment described above, the thin streak-like defects which are low in contrast can be automatically detected as is the case with the first embodiment, even if the image to be inspected includes the patterns.

Next, a streak-like defect inspection device according to a third embodiment of the present invention will now be described. This third embodiment is to prepare the mask image of the first embodiment by the use of the method of claims 3 and 5.

This embodiment can be substantially identical with the second embodiment, except that the expansion/contraction frequency calculating section 28 of FIG. 25 calculates the contraction frequency (pixel number) P2 by the following equation:

$$P2 = L - W + (W-1)/2 + (W+1)/2 \qquad (8)$$
$$= Pl + (W+1)/2$$

As can been seen from the above equation (8), according to this embodiment, the contraction is further carried out by the pixels of (W+1)/2 compared with the contracting pixel number P1 (=N) of the second embodiment represented by the equation (7). This situation will now be described with reference to FIGS. 42 and 43.

Figure 42:
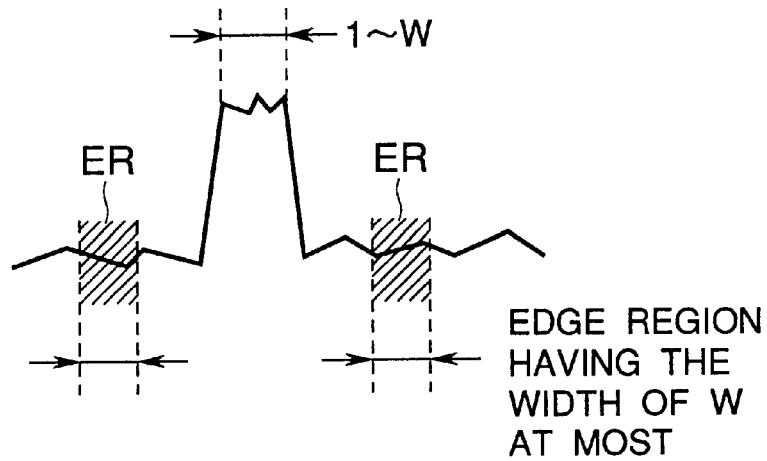
FIG. 42 is an explanatory view showing the condition of an edge region of the flat portions each having a width of not more than W exhibited after subjecting to the P1 time-contractions.

FIG. 42 schematically shows the image from which the edge regions are extracted by subjecting the input image with the flat portion having the width of not more than W to the same processing of FIGS. 30(A) to 30(D). That is, FIG. 42 corresponds to FIG. 30(D) in which the image expanded by N times corresponding to FIG. 30(C) is subjected to the contraction by P1 (=N) times as is the case with the first embodiment.

Figure 43:
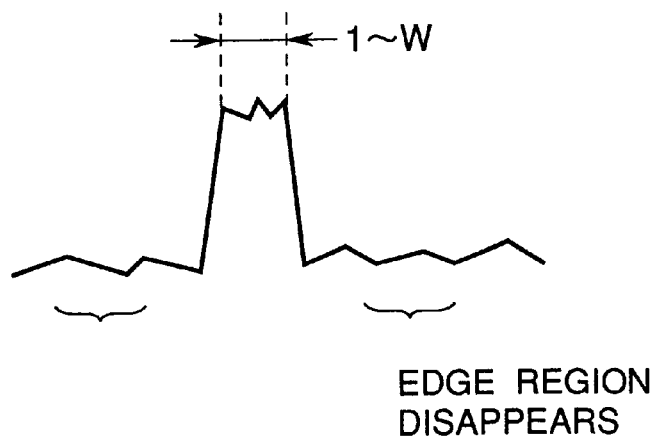
FIG. 43 is an explanatory view showing the operation of a third embodiment of the present invention.

This embodiment aims to extinguish, as shown in FIG. 43, the edge region ER shown in FIG. 42, extracted in the vicinities of the left and the right portions of the flat portion having the width of not more than W according to the second embodiment, by further carrying out the contraction by the pixels of (W+1)/2.

In other words, the maximum width of the edge region ER shown in FIG. 42 is W according to the extraction principal shown in FIG. 26, W/2 is necessary in order to cause it to contract and then disappear by one pixel at a time from the both sides thereof. Further, the case in which W is of an odd number, where the fractions are omitted, (W+1)/2 is used. That is the reason why the contracting frequency is increased by the additional contraction frequency (W+1)/2 compared with the case of the second embodiment.

According to the third embodiment described in detail as above, there can be extinguished the edge regions extracted on the both sides of the streak-like input image having the width of not more than W.

Figure 44:
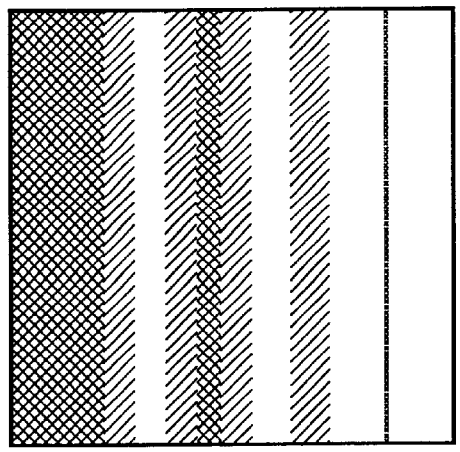
FIG. 44 is an explanatory view showing the effect of the third embodiment.
Figure 45:
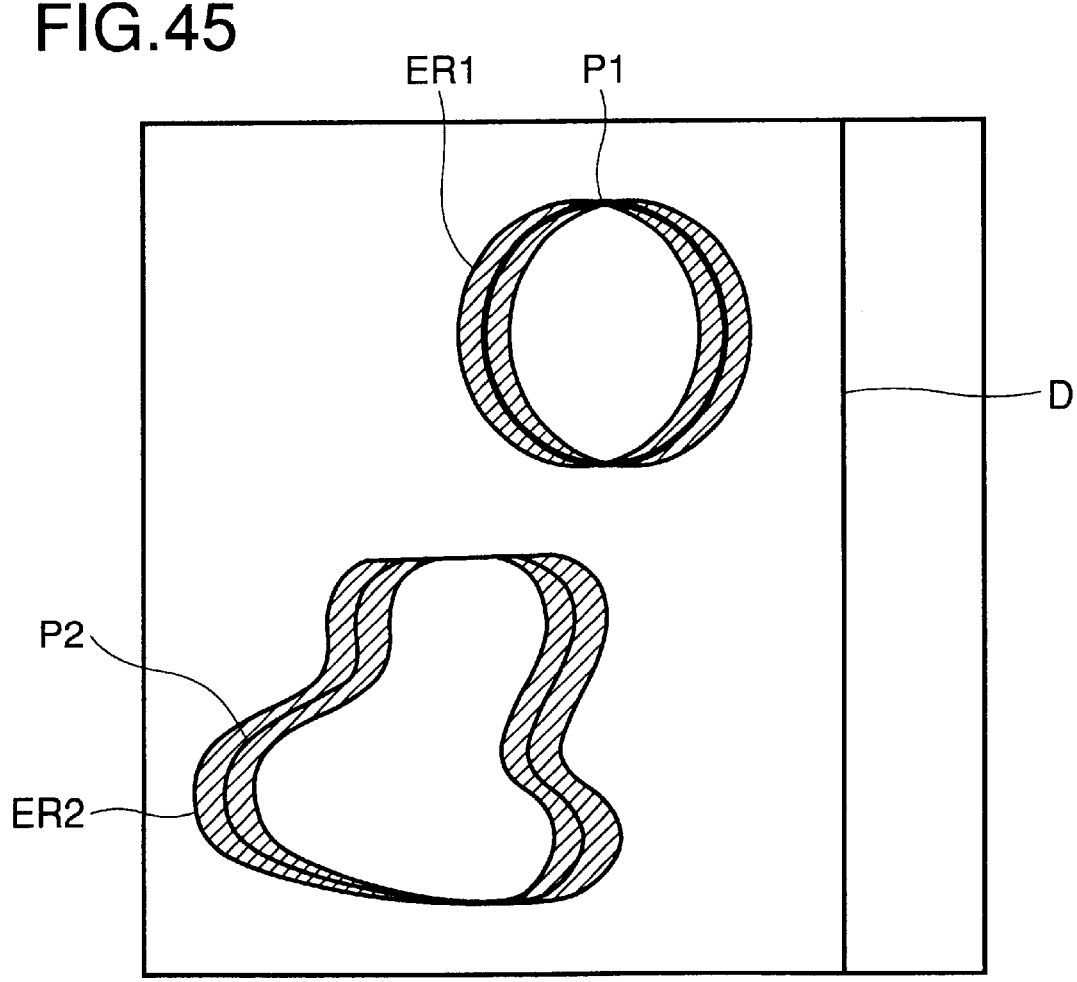
FIG. 45 is another explanatory view showing the effect of the third embodiment.

Therefore, when the mask image is prepared by using the edge region extracted according to this embodiment, the edge regions are prevented from being extracted on the both sides of the doctor streak D as shown in FIG. 44 corresponding to FIG. 36(E) and in FIG. 45 corresponding to FIG. 39 both showing the function of the second embodiment, thereby enabling the region of the subject of inspection to be extended in the image to be inspected, which raises the reliability of the inspection.

Next, a streak-like defect inspection device according to a fourth embodiment of the present invention will now be described. This fourth embodiment is to prepare the mask image of the first embodiment by use of the method of claims 3 and 6.

This embodiment can be substantially identical with the second embodiment, except that the expansion/contraction frequency calculating section 28 of FIG. 25 calculates the contraction frequency (the number of pixels) P3 by the following equation (9):

$$P3 = L - W + (W-1)/2 + (L-1) \qquad (9)$$
$$= Pl + (L-1)$$

As can been seen from the above equation (9), according to this embodiment, the contraction is further carried out by the pixels of (L−1) compared with the contracting pixel number P1 (=N) of the second embodiment represented by the equation (7). This situation will now be described with reference to FIGS. 46 and 47.

FIG. 46(A) is substantially identical with FIG. 42 which schematically showing the image from which the edge regions ER are extracted by subjecting the input image with the flat portion having the width of not more than W to the same processing of FIGS. 30(A) to 30(D). Further, FIG. 46(B) corresponds to FIG. 31(D) in which the input image with the flat portion having the width of not more than W is subjected to substantially the same processing as those of FIGS. 31(A) to 31(D), and FIG. 46(C) corresponds to FIG. 32(D) in which the input image with the flat portion having the width of sufficiently larger than W is subjected to substantially the same processing as those of FIGS. 32(A) to 32(D).

According to this embodiment, the respective edge regions ER of FIGS. 46(A) to 46(D) corresponding to the condition in which the contraction is carried out by P1 times in the second embodiment are further subjected to the contraction according to the pixels of (L−1) as shown by the equation (9), which provides the conditions of corresponding FIGS. 47(A) to 47(D). The additional contraction frequency number (L−1) employed in this embodiment corresponds to the contracting pixel number which makes the edge region small to the very edge of the flat portion.

When carrying out the contraction additionally by (L−1) times compared with the P1 of the second embodiment like this embodiment, W≧L holds for the flat portion having the width of not more than W, as is the case with the third embodiment, which enables the edge regions ER to be extinguished as shown in FIG. 47(A). Further, when the width of the flat portion exceeds W as shown in FIG. 46(B), the edge region ER integrally connected due to the expansion-processing can be caused to contract up to the first pixel from the edges of the left and the right ends thereof, which decreases the edge region in size down to such a minimum size as to cover the edge. Moreover, when the width of the flat portion is sufficiently lager than W as shown in FIG. 46(C), only for respective one pixels on both sides of the edges, the edge region can be extracted.

Generally, when the mask image is prepared by using the extracted edge region, the edge region (mask portion) means the region which is excepted from the subject of inspection in the image to be inspected; therefore, the edge region (area) is ideally made as narrow as possible with the edges in the image to be¥ inspected masked.

Therefore, the method employed in this embodiment is the most suitable as the general edge extracting method, and then employing the edge region extracted by the use of this embodiment enables the ideal mask image for use in inspection to be prepared.

Figure 48:
FIG. 48 is an explanatory view showing the effect of the fourth embodiment.
Figure 49:
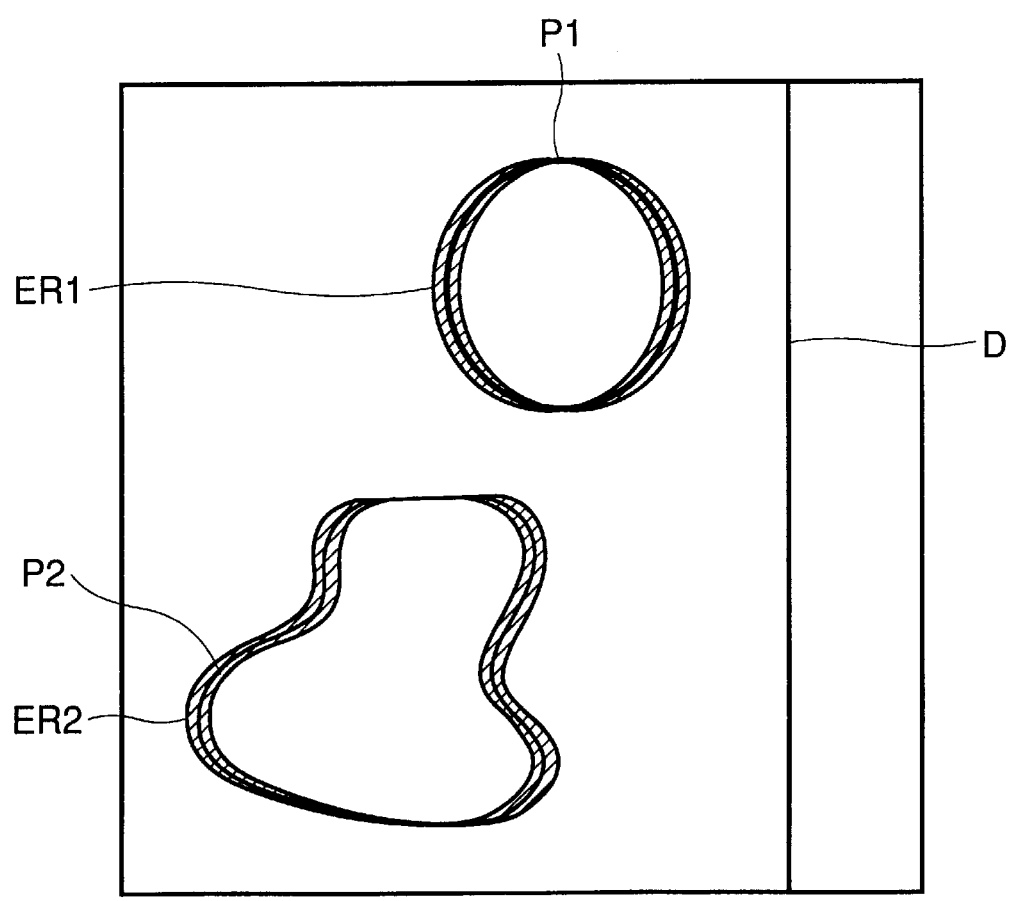
FIG. 49 is another explanatory view showing the effect of the fourth embodiment.

As a result, according to the fourth embodiment, the edge region cannot be extracted for the doctor streak D having the width of not more than W as is the case with the third embodiment; however, the edge region ER which is further narrower than that of the third embodiment can be extracted for the usual pattern having the width of not less than W, as shown in FIGS. 48 and 49 corresponding to the FIGS. 44 and 45 for the third embodiment, respectively.

Figure 50:
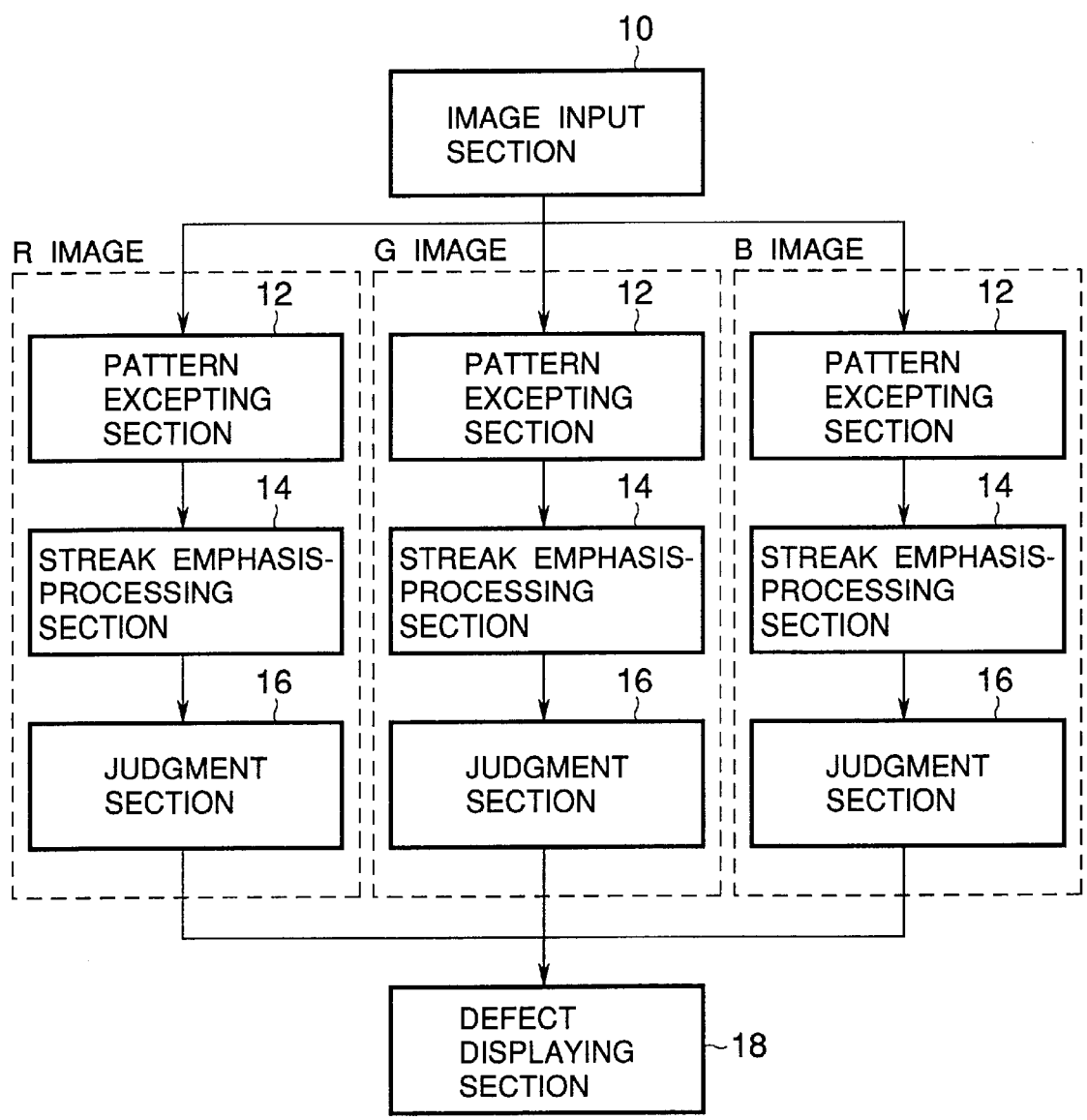
FIG. 50 is a block diagram showing the arrangement of an inspection device wherein the image to be inspected is separated to monochromatic images of R, G, B.

The inventors has further investigated in detail the streak-like defect inspection technique described above. As a result, they found out that when the inspection device shown in FIG. 14 is applied to the color image, that is, when the color image is input as the image to be inspected, from the image inputting section 10, carrying out the respective processings described above by the pattern excepting section 12, the streak emphasizing section 14 and the judgment section 16 provided individually as monochromatic images of three frames of R, G, B, as shown in FIG. 50, provides the following new problems.

FIGS. 51(A) to 51(C) schematically show longitudinally added images which are obtained by subjecting the monochromatic images of R, G, B to the streak emphasis-processing, respectively, by the method shown in FIG. 23. In these longitudinally added images of R, G, B, the streak-like defect having the streak portion which are changed little in respective brightness value (gradation value) compared with the background lowers the sensitivity, thereby disabling the streak-like defect to be detected.

In other words, as there is shown in FIGS. 51(D) to 51(F), the brightness value distribution profiles detected on the same scan lines L on the respective images of FIGS. 51(A) to 51(C), any one of the monochromatic images does not exceed the threshold value T2 set for the purpose of the binary-coding processing, thereby providing the OK (no streak-like defect) judgment, which finally results in the OK judgment even if the streak-like defects are caused on the printed matter.

Figure 52:
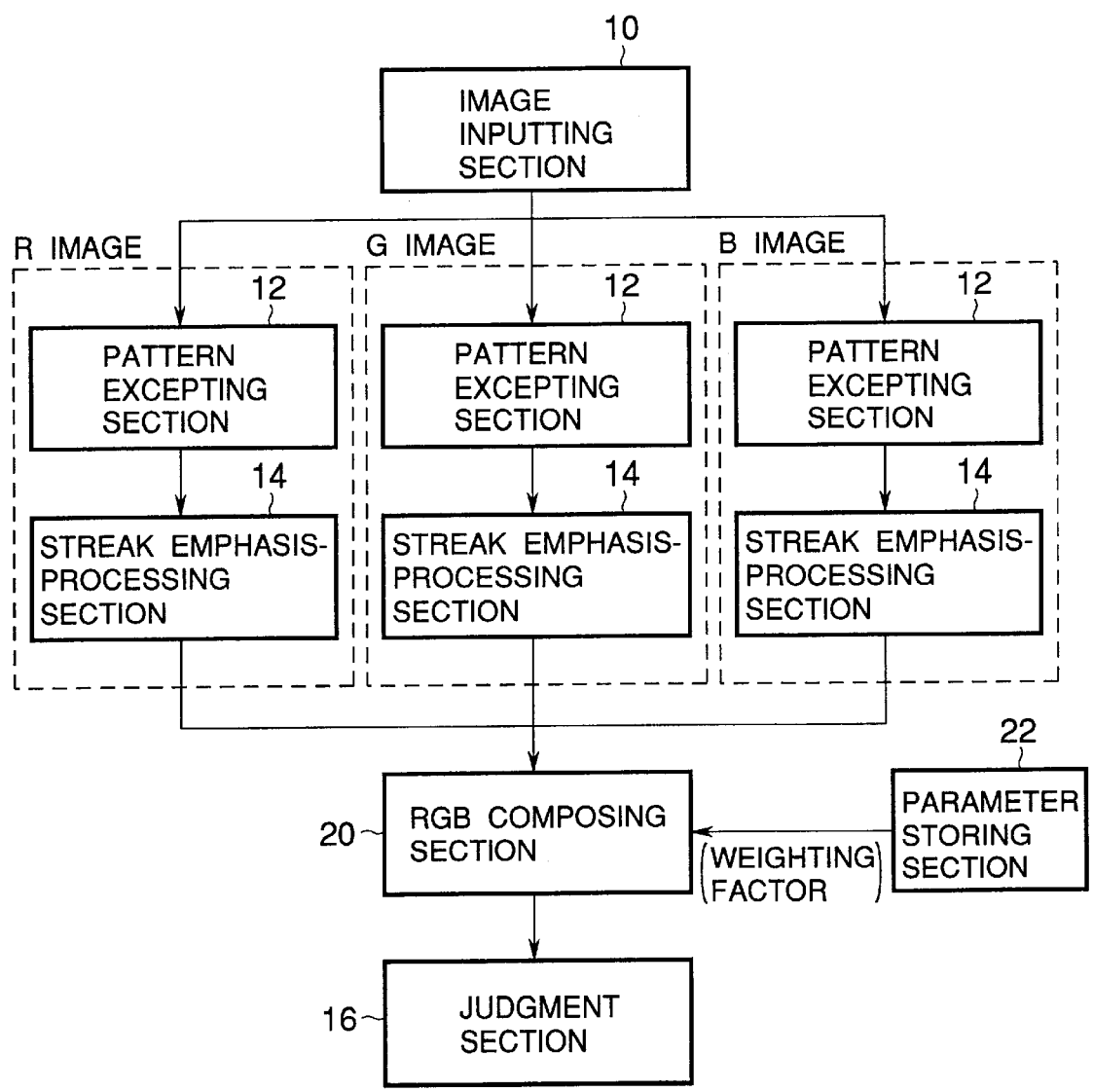
FIG. 52 is a block diagram showing the general arrangement of a streak-like defect inspection device according to a fifth embodiment of the present invention.

Next, a fifth embodiment of the present invention, which is capable of solving such problems, will be described in detail. FIG. 52 is a block diagram showing the construction of a main part of a streak-like defect inspection device according to the fifth embodiment.

The streak-like defect inspection device, including the functions of the respective constitutional elements, according to this embodiment can be substantially identical with those illustrated in FIG. 14, except that when the image to be inspected is input as the color image by the image inputting device 10 which is the same as that of FIG. 14, the image to be inspected is separated in the monochromatic images of the respective frames of R, G, B, and then the separated monochromatic images are input in turn to the pattern excepting sections 12 and the streak emphasis-processing sections 14 which are arranged correspondingly to the monochromatic images, respectively, thereby causing the respective monochromatic images to be subjected to the same processings described above, and the longitudinally added images of the respective monochromatic images processed by the streak emphasis-processing section 14 are composed by the RGB composing section 20 provided before the judgment section 16, and then the weighting coefficient and the like, used at the time of composition are input from the parameter storing section 22 to the composing section 20.

Figure 53:
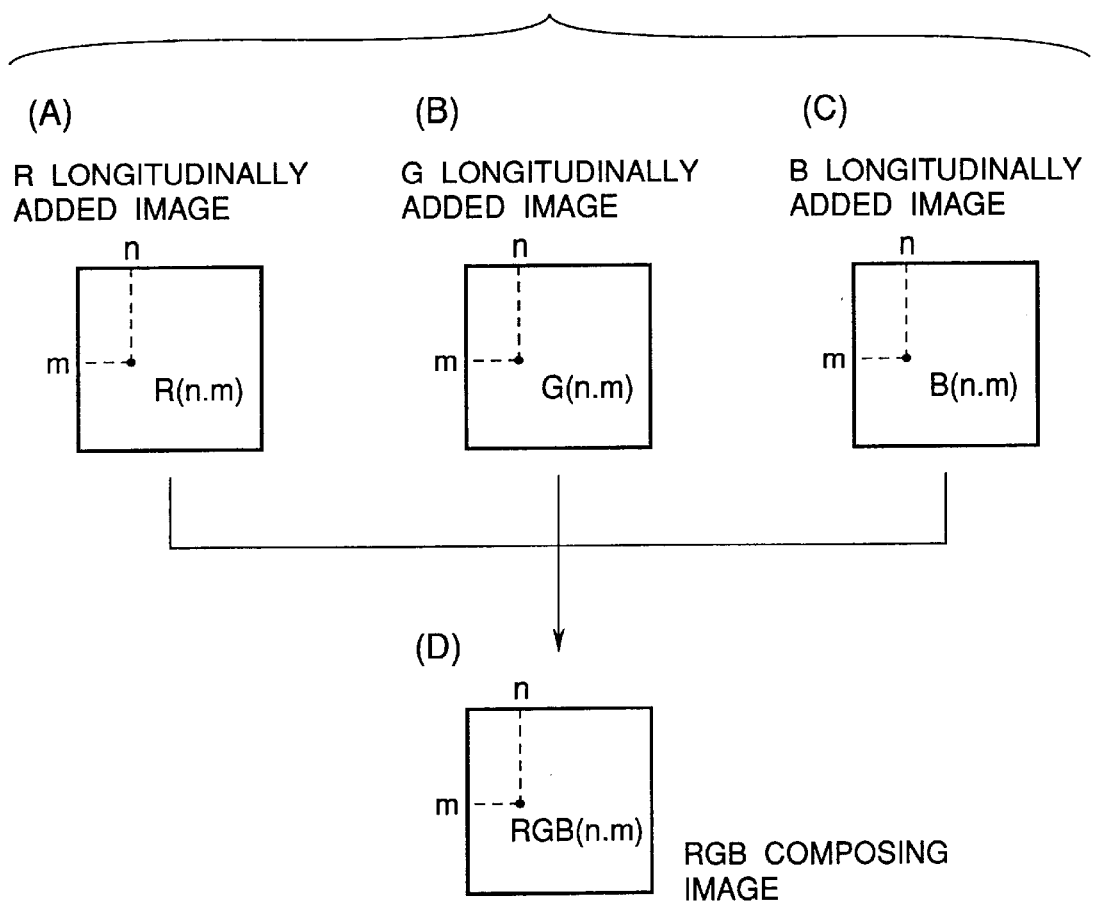
FIG. 53 are diagrams showing a method of composing monochromatic images of R, G, B in the fifth embodiment.
Figure 54:
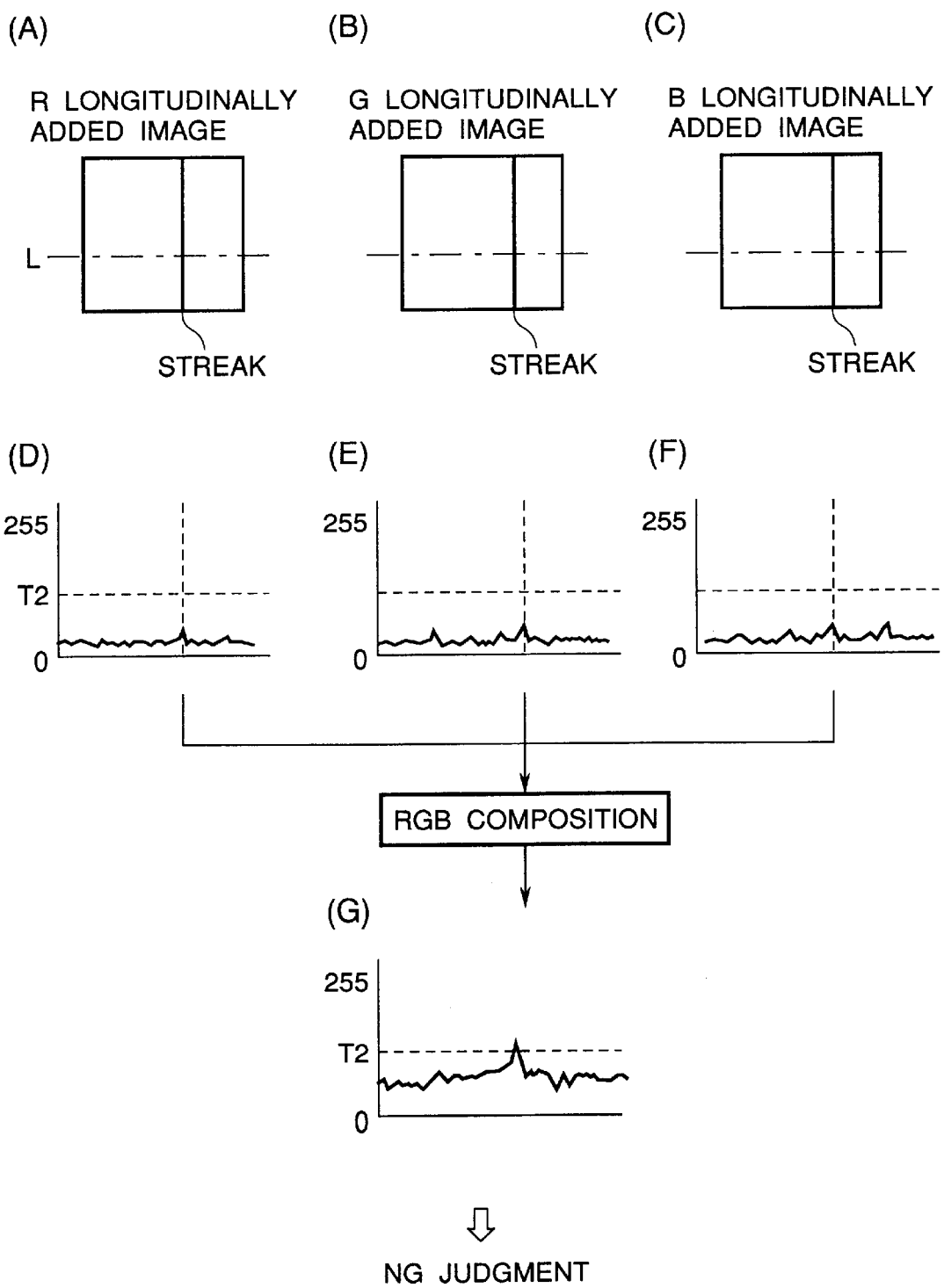
FIG. 54 are diagrams showing the effect of the fifth embodiment.

In this embodiment, as conceptually shown in FIGS. 53(A) to 53(C), the RGB composing section 20, when composing the respective longitudinally added images of R, G, B, calculates the graduation values RGB(n, m) of the composed image by adding the graduation values (brightness values) R(n,m), G(n,m), B(n,m) of the pixels, which are located at the same coordinate position (n,m), of the respective images, by use of the following equation (1):

$$RGB(n, m) = Ar \times R(n, m) + Ag \times G(n, m) + Ab \times B(n, m) \qquad (10)$$

where
Ar: a weighting factor of R
Ag: a weighting factor of G
Ab: a weighting factor of B All the above weighting factors need only to be usually set to the same factor, e.g. 1.0. But, in the case of a yellow streak on the printed matter, e.g. a white paper, setting as Ar=1.0, Ag=1.0, Ab=0.1 prevents the streak from being detected. Thus changing the factors of the respective pixel values of R, G, B when composing the images by use of the equation (10) enables the sensitivity to be adjusted to the specified color.

There will be described the case in which the above-mentioned embodiment is applied to the longitudinally added images of the respective monochromatic images of R, G, B, shown in FIGS. 54(A) to 54(D), which are the same as those of FIGS. 51(A) to 51(D).

As shown in FIGS. 54(A) to 54(D), the method of simply comparing the peak of the brightness value with the threshold value T2 as to each of the monochromatic images is not capable of detecting the streak-like defect as is the case with the FIGS. 51(A) to 51(D); however, according to this embodiment, the judgment is carried out by using the composed image of R, G, B for such an image to be detected, so that the peak value exceeds the threshold value T2 for the composed image, which provides the judgment of NG which means that the streak-like defect exists. In this connection, the RGB composition of FIG. 54 is calculated with the weighting factors in the equation (1) as Ar=Ag=Ab=1.

According to this embodiment described in detail above, there can be surely detected, when inspecting the color image, the streak-like defect which the brightness values of the respective longitudinally added images are changed a little compared with the background. Further, on this occasion, adjusting the weighting factors of R, G, B on occasion demands enables the sensitivity to the specified color to be adjusted as described above, which brings about the inspection with high accuracy according to the subject.

According to this embodiment, when processing the image to be inspected input as the color image, as the monochromatic images of the respective frames of R, G, B, the streak-like defect which is low in detection sensitivity for the respective monochromatic images can be detected with high accuracy.

Moreover, in this embodiment, there is described the case in which the monochromatic images to be composed are of the emphasis-processed longitudinally added images. However, the present invention does not limited to this case, and images which have substantially same streak portion may be used.

Figure 55:
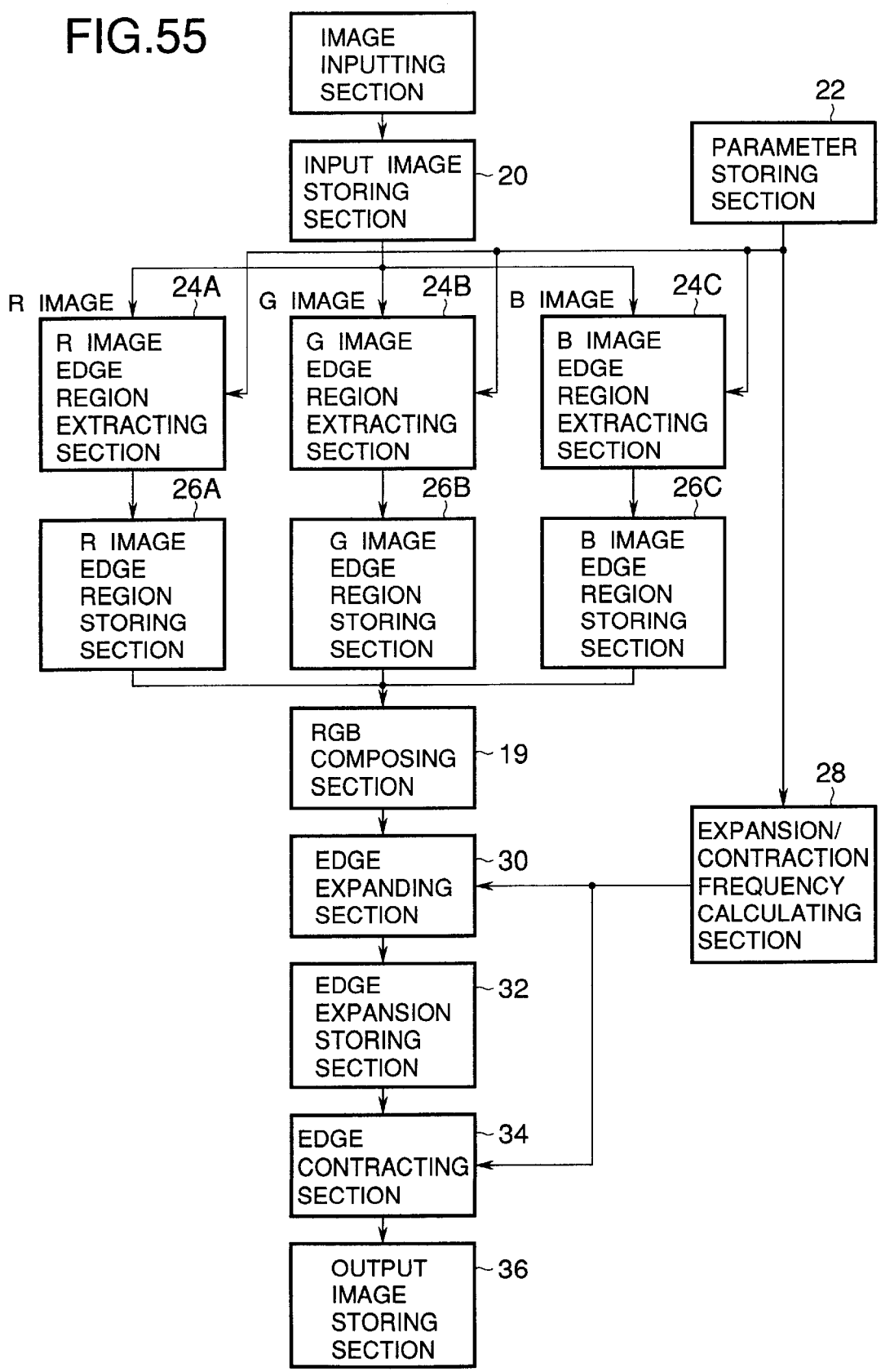
FIG. 55 is a block diagram showing the general arrangement of an edge region extracting device according to a fifth embodiment of the present invention.

FIG. 55 is a block diagram showing a general arrangement of an edge region extracting device according to a sixth embodiment of the present invention.

This embodiment, which is employed when the input image is color, can be substantially identical with those of the first to the fourth embodiments, except that one edge region extracting section 24 and one edge region storing section 26 shown in FIG. 25 are provided with three edge region extracting sections, designated by 24A to 24C, corresponding to the respective images of R, G, B input from the input image storing section 20, and three edge region extracting sections, designated by 26A to 26C, for storing the respective extracted images, and a RGB composing section 19 for composing the respective extracted images of R, G, B input from the storing section 26A to 26C.

According to this embodiment, edge extraction-processing can be carried out for each of the images of R, G, B, the edge region to be rapidly and accurately extracted even if the input image as the subject is color, as is the case with the first to the fourth embodiments.

Figure 56:
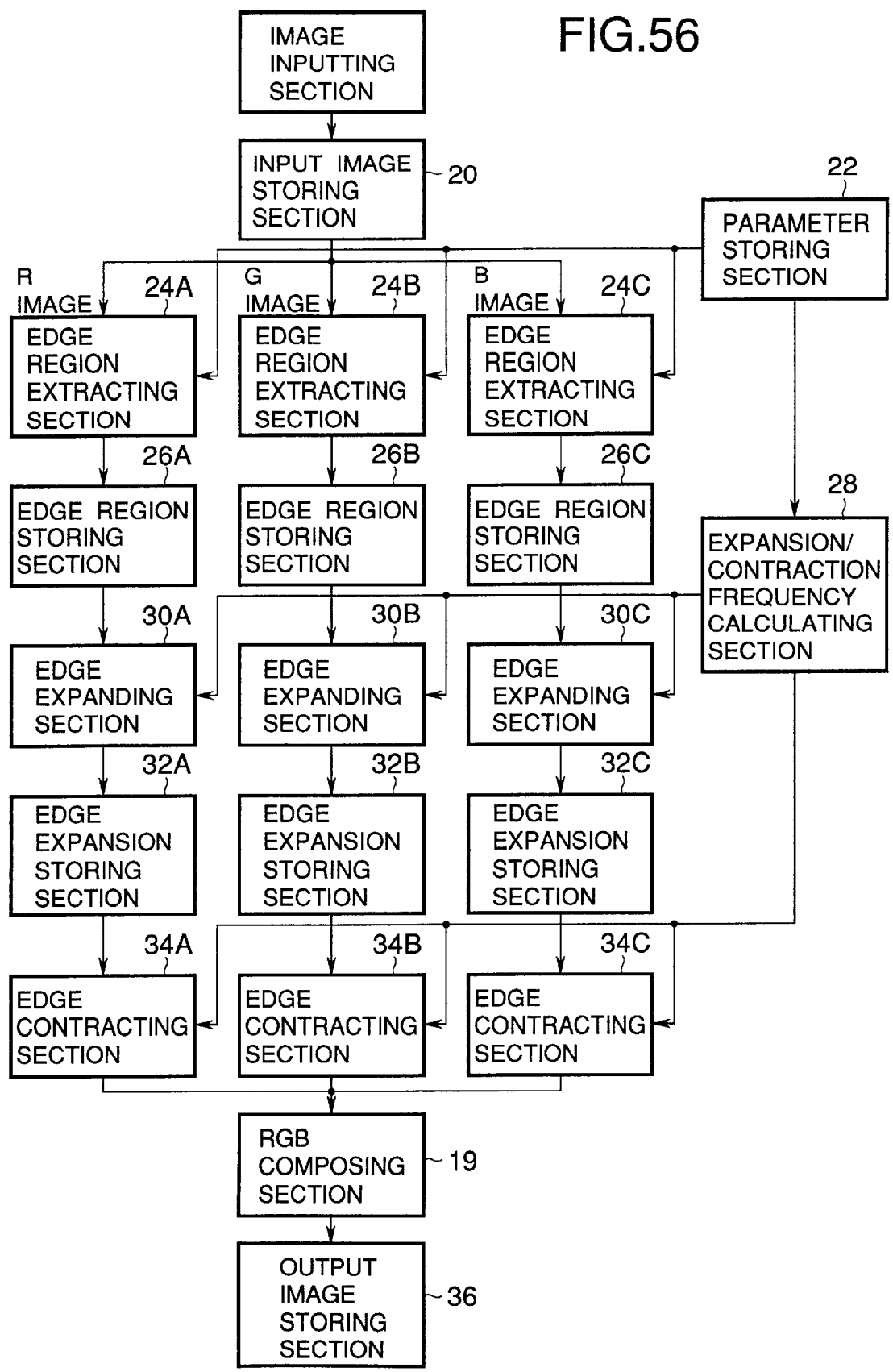
FIG. 56 is a block diagram showing the general arrangement of an edge region extracting device according to a seventh embodiment of the present invention.

FIG. 56 is a block diagram showing a general arrangement of an edge region extracting device according to a seventh embodiment of the present invention.

This embodiment, which is employed when the input image is color as is the case with the sixth embodiment, can be substantially identical with that of the sixth embodiment, except that in addition to the edge region extracting sections 24A to 24C and the edge region storing sections 26A to 26C, all of the edge expanding sections, the edge expansion storing sections, the edge contracting sections and the output image storing sections are provided corresponding to respective images of R, G, B as shown by reference numerals 30A–30C, 32A–32C, 34A–34C and 36A–36C, and the RGB composing section 19 for composing the finally obtained contracting image are provided.

According to this embodiment, all the image processing can be carried out for each of the respective images of R, G, B, which enables the edge region to be extracted with higher accuracy compared with the sixth embodiment.

According to the sixth and the seventh embodiment described above, the edge region which does not include the edge can be extracted, only when the flat portion of the image signal has the width of not more than a predetermined value, from the input image such as the image to be inspected to which the printing pattern is input.

Moreover, in the above embodiments, device for displaying the pixel values by 256 graduation (8 bits) are used and the calculation result of the equation (3) is normalized by use of the equation (5) in such a manner that the graduation value 128 agrees with the origin; however, the embodiment is not limited thereto. For example, when using the device for displaying it by 16 bits, it needs only to simply calculate the equation (3) without normalization.

Further, in the second embodiment and the like, W=3 and L=5 are used as the parameters. However, they are not limited to the above values, but appropriate parameters can be set for each image to be processed.

Next, a binary image preparing device according to an eighth embodiment of the present invention now will be described.

Figure 57:
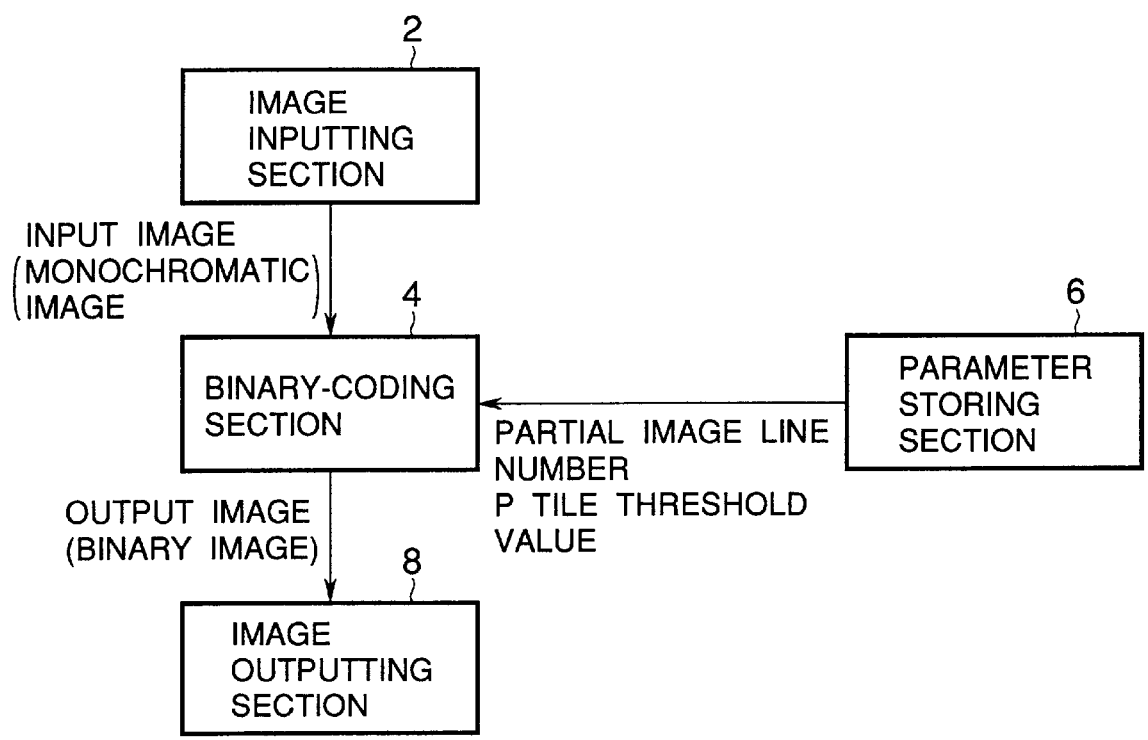
FIG. 57 is a block diagram showing the general arrangement of a binary image preparing device according to an eighth embodiment of the present invention.

FIG. 57, which shows a general arrangement of the eighth embodiment, comprises an image inputting section 42 for inputting an image to be expected to have a streak portion continuing substantially in the same direction, as monochromatic images of monochromes of R, G, or B, a binary-coding section 44 for dividing the input image into continuous partial images each having the width of not less than one line perpendicular to the streak portion, and binary-coding the respective pixels by subjecting the respective divided partial images to the P tile method, a parameter storing section 46 for storing the number of lines of the partial images used for dividing the image and the number of pixels (area ratio) for use in determining the threshold of the P tile method and the like, and an image outputting section 48 for outputting the binary image binary-coded and prepared by the binary-coding section 44.

The operation of this embodiment will now be described with reference to FIG. 58.

Figure 1:
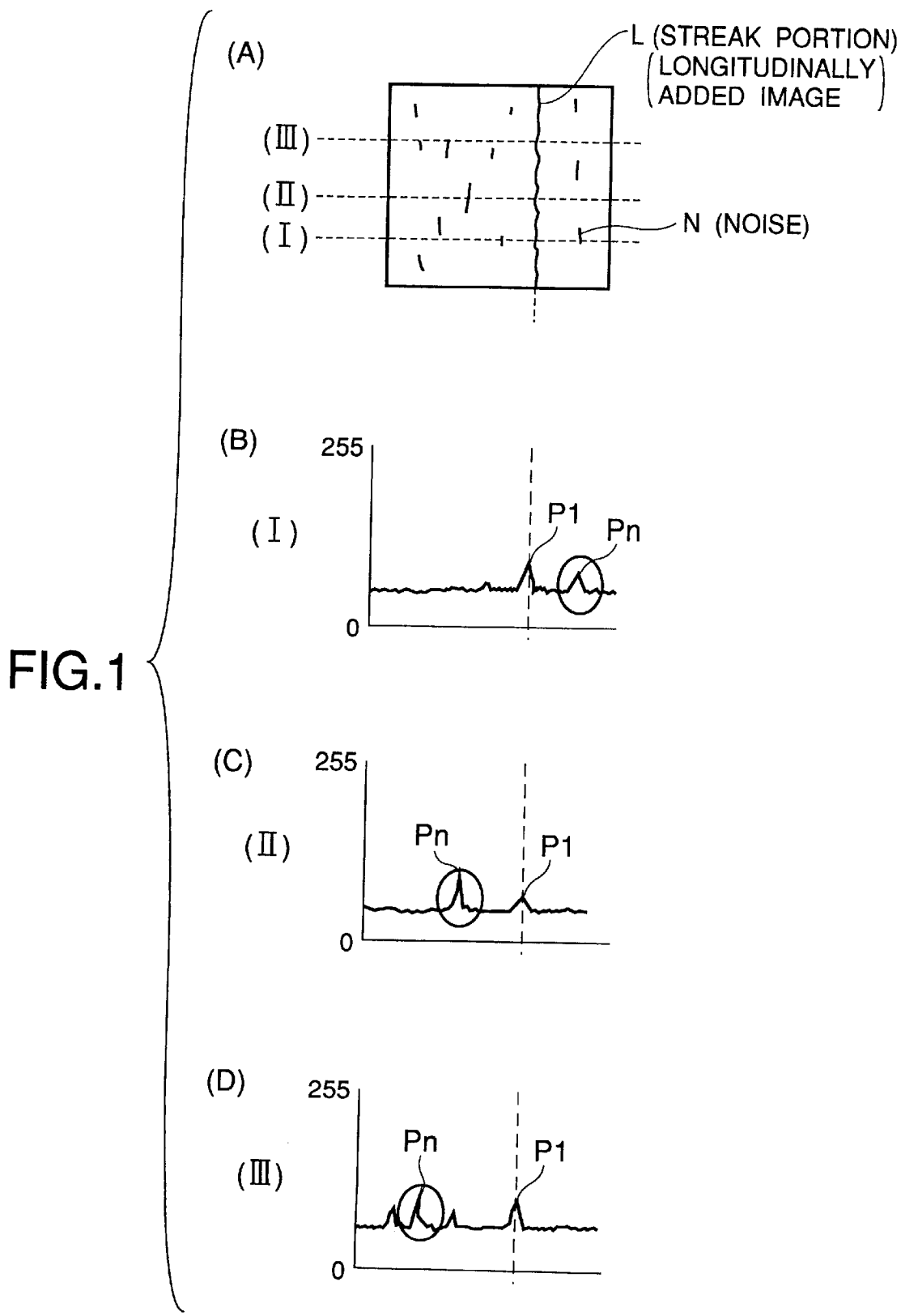
FIG. 1 are diagrams showing one example of an input image and the features thereof.
Figure 2:
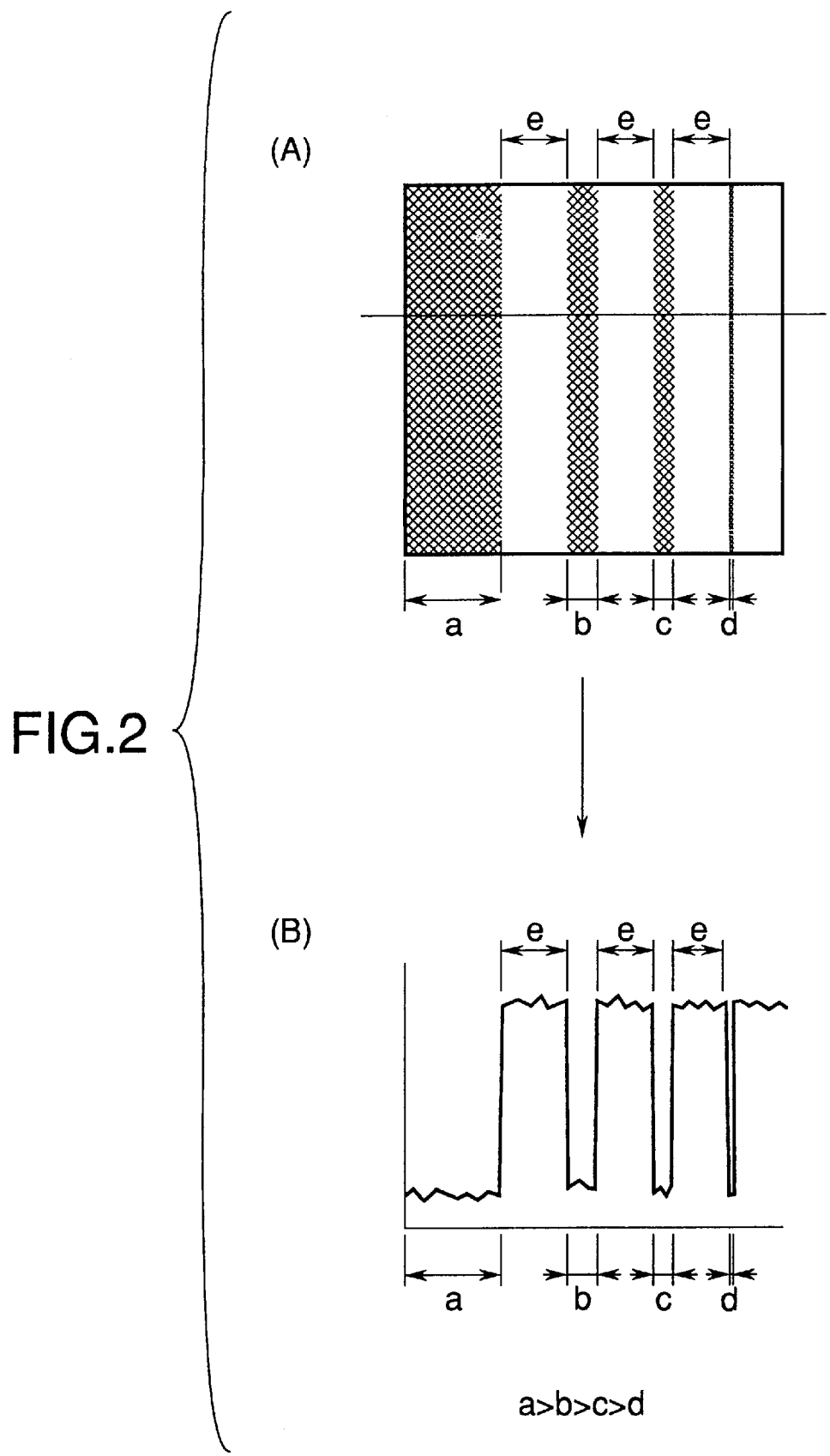
FIG. 2 are explanatory views schematically showing one example of an input image and one-dimensional image inputting signal.
Figure 3:
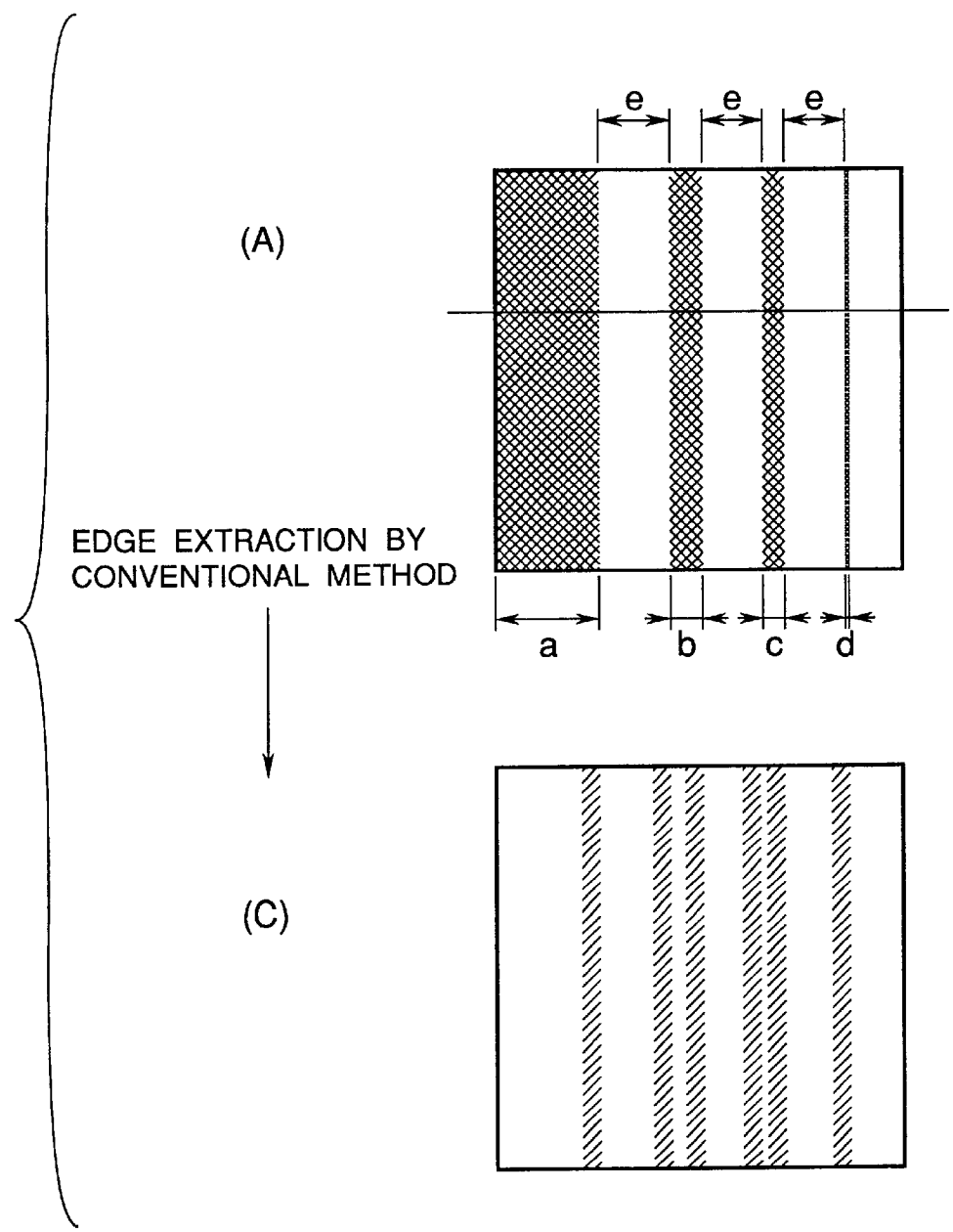
FIG. 3 are explanatory views showing the above input image and an edge region extracted image according to the conventional method.
Figure 4:
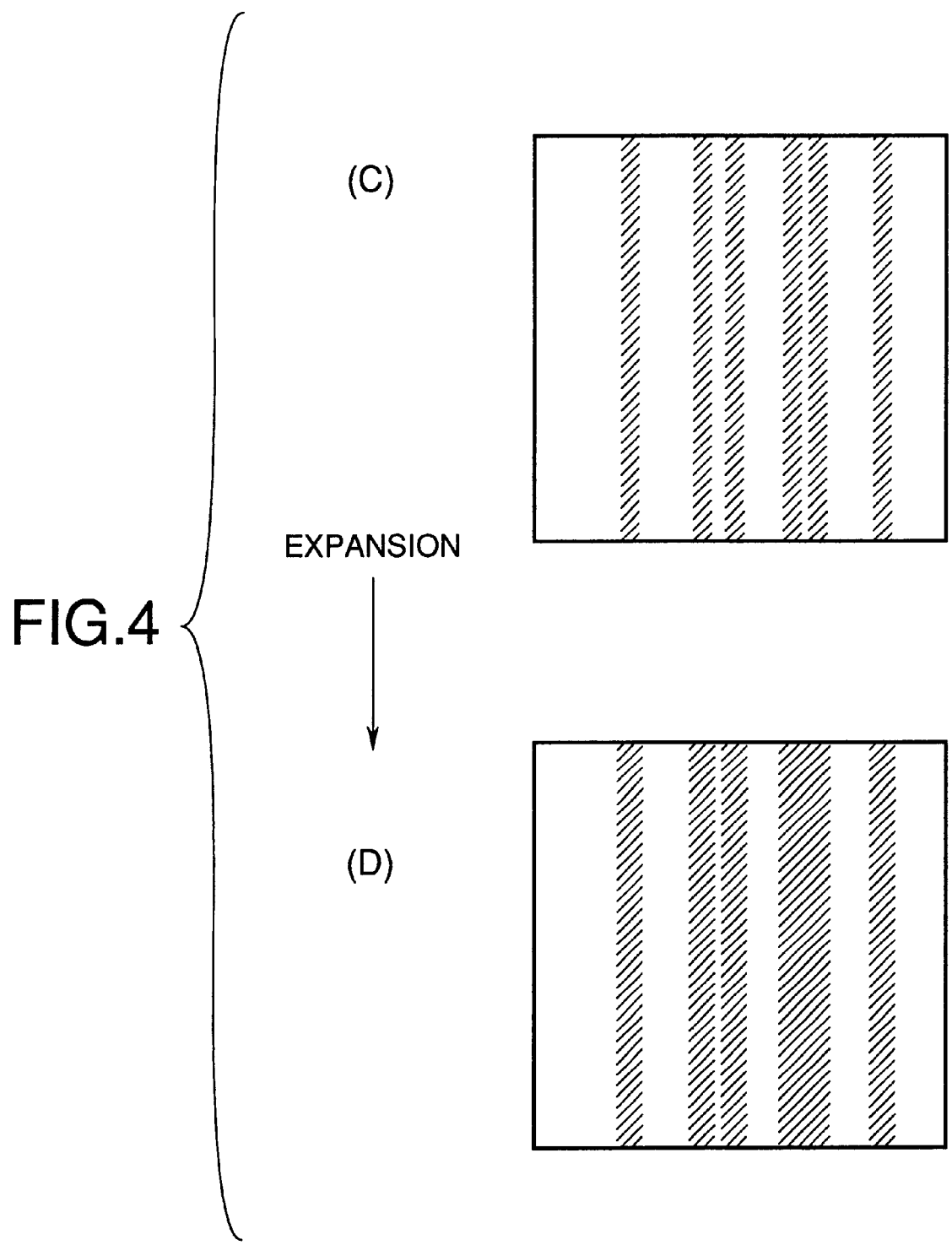
FIG. 4 are explanatory views showing the above extracted image and the expansion-processed image thereof.
Figure 5:
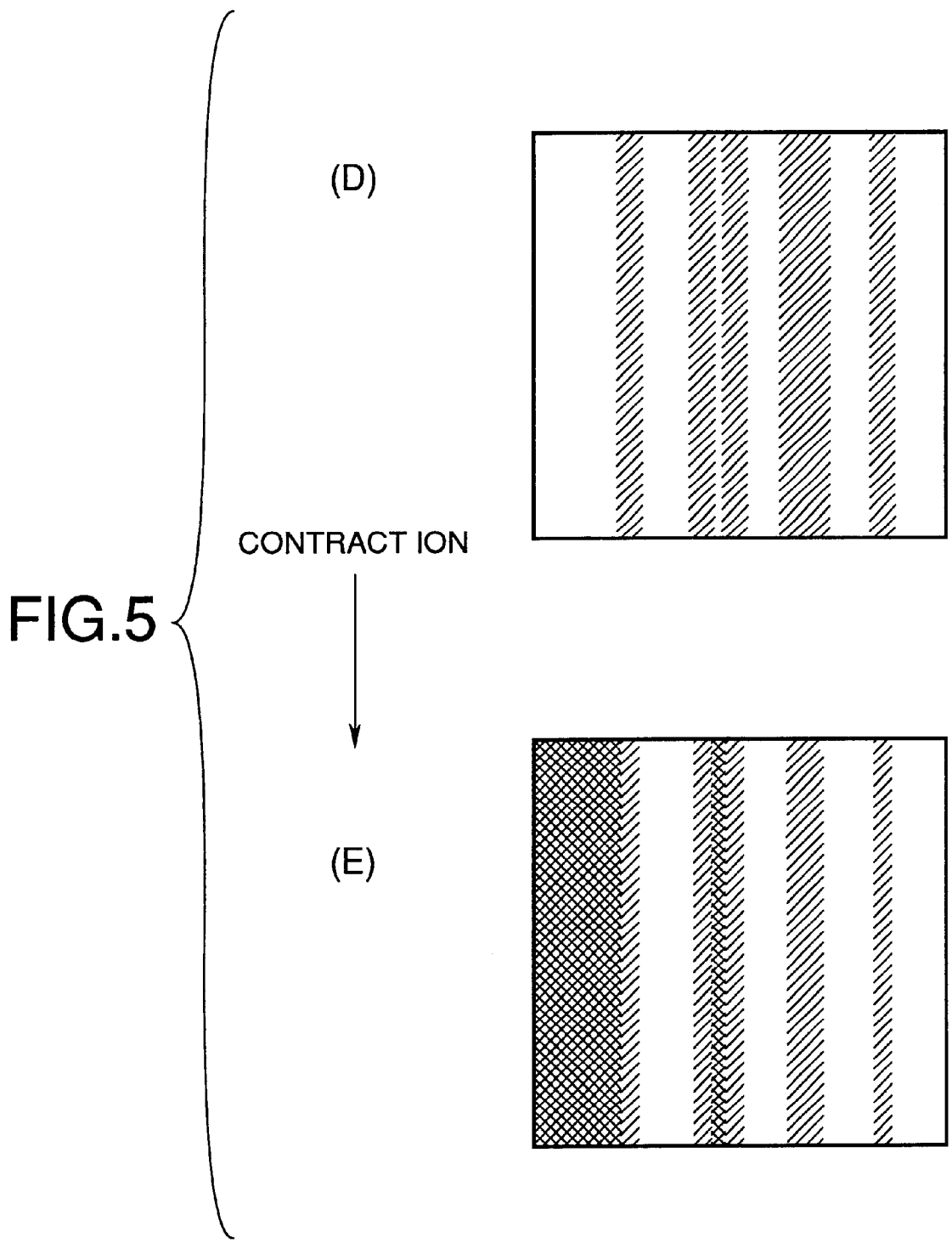
FIG. 5 are explanatory views showing the above expansion-processed image and the contraction-processed image thereof.
Figure 6:
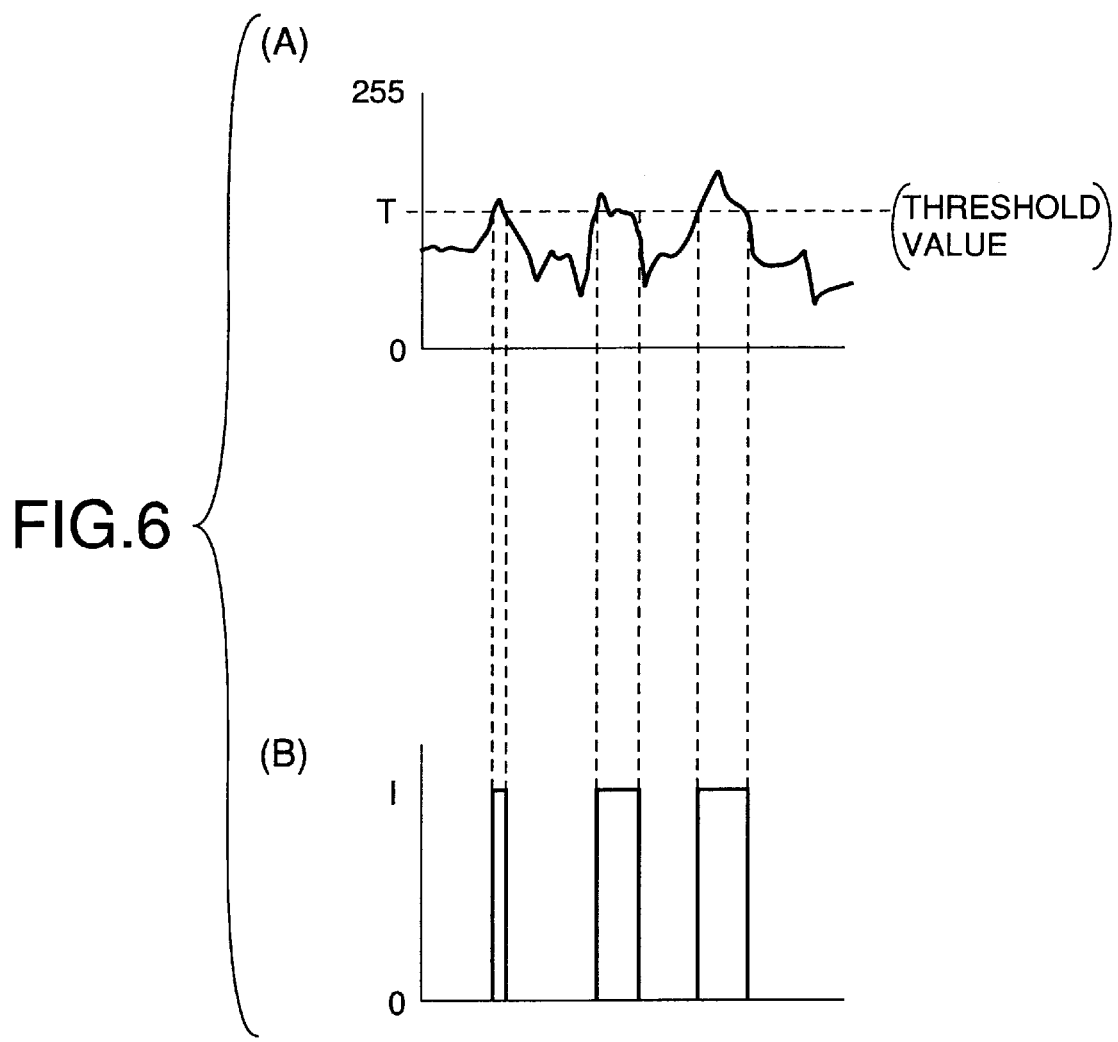
FIG. 6 are diagrams useful in explaining the P tile method.
Figure 7:
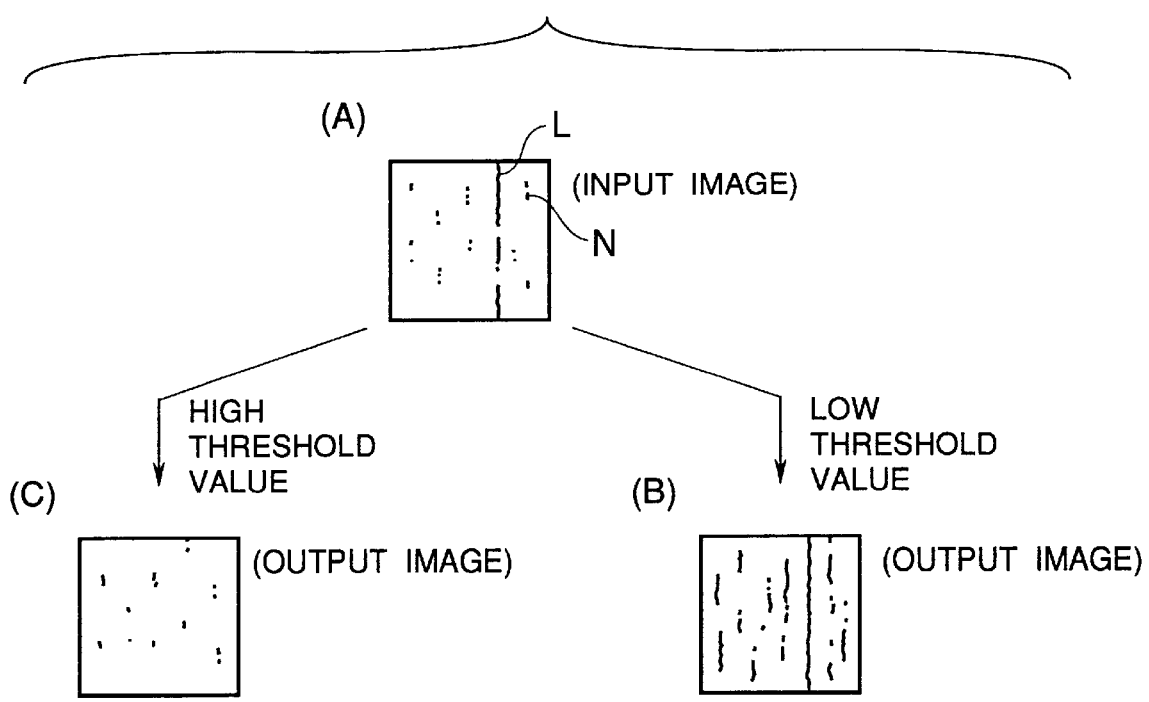
FIG. 7 are diagrams useful in explaining the problems of the fixed threshold value processing method.
Figure 8:
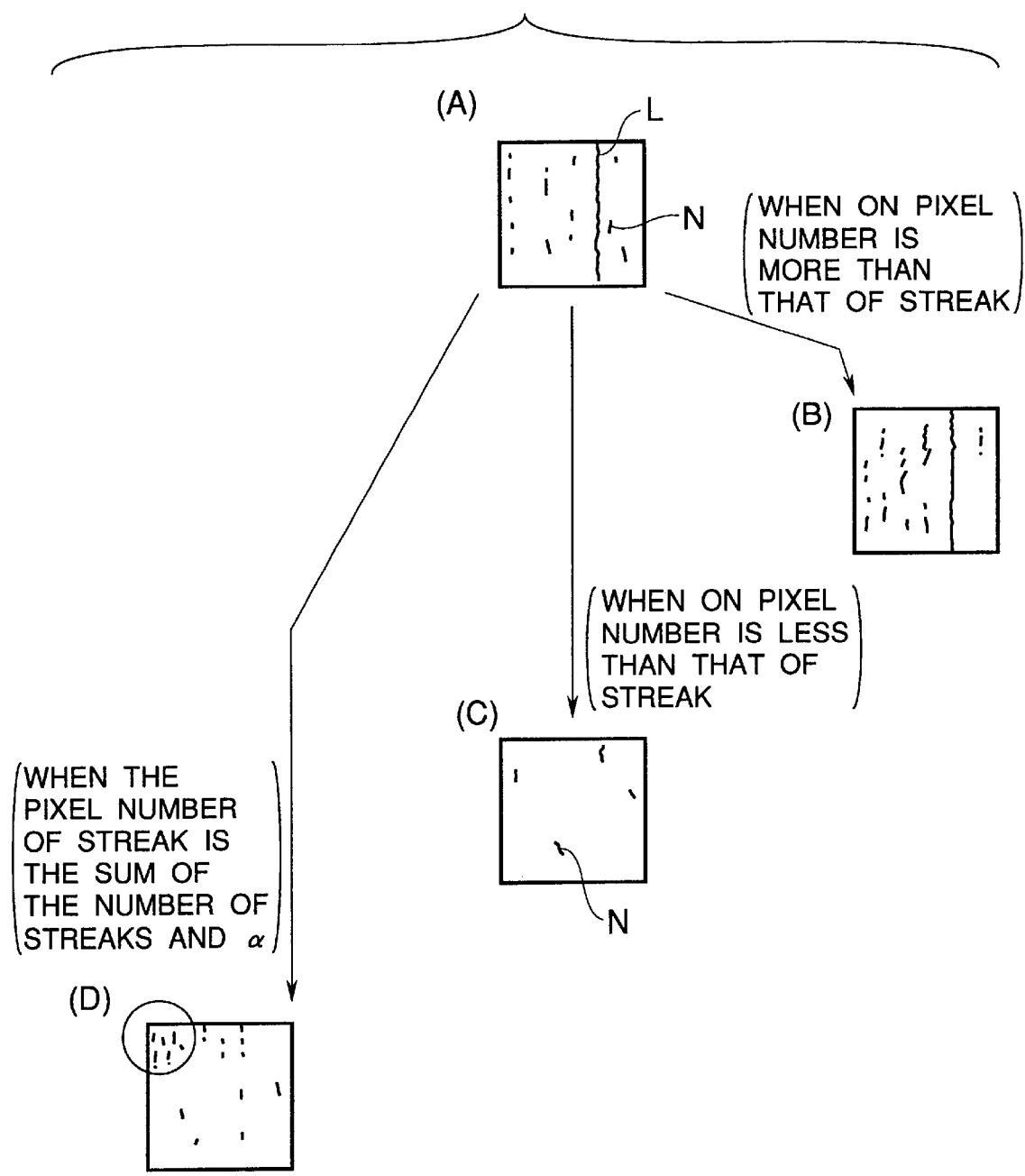
FIG. 8 are diagrams useful in explaining the problems of the conventional P tile method.

FIG. 58(A) shows an input image, which is similar to that of FIG. 1(A) and the like, input by the image inputting section 42. This image has a streak portion L substantially longitudinally continuing, and noises (not shown).

In this embodiment, the binary-coding section 44 first divides the input image into continuous rectangular partial images I1, I2, . . . each perpendicular to the streak portion by using the parameter related to the number of lines of the partial image read out from the parameter storing section 46. The width of this partial image may be of one line (the width of one pixel), or a plurality of lines.

Next, each of the partial images are subjected to the P tile method to realize the binary-coding. On this occasion, the area ratio P is determined in such a manner that the number of pixels which are turned on at the partial image is, for example, three for one line, taking account of the width of the streak portion within the partial image.

Subjecting all the partial images to the P tile method similarly disables the pixels of the streak portion to turn on at the partial image having the noises which are large in graduation value, but enables the pixels of the streak portion to turn on at many of the partial image having no such noises, as shown in FIG. 58(C), which enables the binary image, in which the streak portion L is extracted as a whole image and the noises N is wholly dispersed, to be obtained.

Moreover, the width of the partial images I1, I2, . . . , shown in FIG. 58(B), which are subjected to the P tile method may be of not only one line, but also, of course, several lines of less than ten in the case of a plurality of lines. Further, such the number of lines as to divide the whole image into two parts, i.e. ½ of the total scan lines also are expected to have effect.

This embodiment is characterized by dividing the input image into rectangular partial images continuing in the perpendicular direction to the expected streak portion, as distinct from the conventional image dividing method of dividing the partial image in a grid-like manner. This enables the streak portion as the subject to be binary-coded effectively.

As described above, according to this embodiment, the threshold value is dynamically determined for each of the partial images by using the P tile method. Therefore, the image, in which the streak portion is binary-coded even if the noises exist, can be easily and surely prepared from the image having the streak portion continuing substantially in the same direction at the flat background. This enables the subject (streak portion) and the background to be separated from each other at high accuracy. Moreover, there are advantages that when the partial image has the narrow width of one line, or a plurality of lines, but nearly the one line, the error due to the area fluctuation of the subject to be inspected, which is the disadvantage of the P tile method, can be reduced, and that the processing time is made relatively short.

Next, a streak-like detection device according to a ninth embodiment of the present invention will now be described.

The streak-like defect inspection device of this embodiment utilizes the binary image preparing technique which is substantially identical with that of the eighth embodiment, when detecting the so-called doctor streak caused on web-pressing.

The inspection device of this embodiment aims to detect the streak-like defect caused on the printed matter, from the image input on the printed matter, and comprises, as the first embodiment shown in FIG. 14, an image inputting section 10 for optically inputting an image to be inspected, from the printed matter by a CCD camera or the like, a pattern excepting section 12 for exception-processing a pattern portion from the input image to be inspected, a streak emphasis-processing section 14 for emphasis-processing the streak portion existing on the image from which the pattern portion is excepted, a judgment section 16 for judging the streak-like defect based on the image in which the streak-like portion is emphasis-processed, and a defect displaying section 18 for displaying the judged streak-like defect on a monitor.

Also, in this embodiment, the pattern excepting section 12 includes a mask image preparing section 12A, an edge image preparing section 12B, a masked edge image composing section 12C, the streak-like emphasis-processing section 14 includes a longitudinally adding section 14A, and the judgment section 16 includes a binary-coding section 16A and a line recognizing section 16B, respectively, as is the case with the first embodiment.

In this embodiment, the binary-coding section 16A comprises means for inputting an image to be expected to have a streak portion continuing substantially in the same direction, and means for dividing the input image into continuous partial images each having the width of not less than one line perpendicular to the streak portion, and means for subjecting each of the divided partial images to the P tile method to binary-code each of the pixels, which are the same as the binary-coding device of the eighth embodiment.

Figure 58:
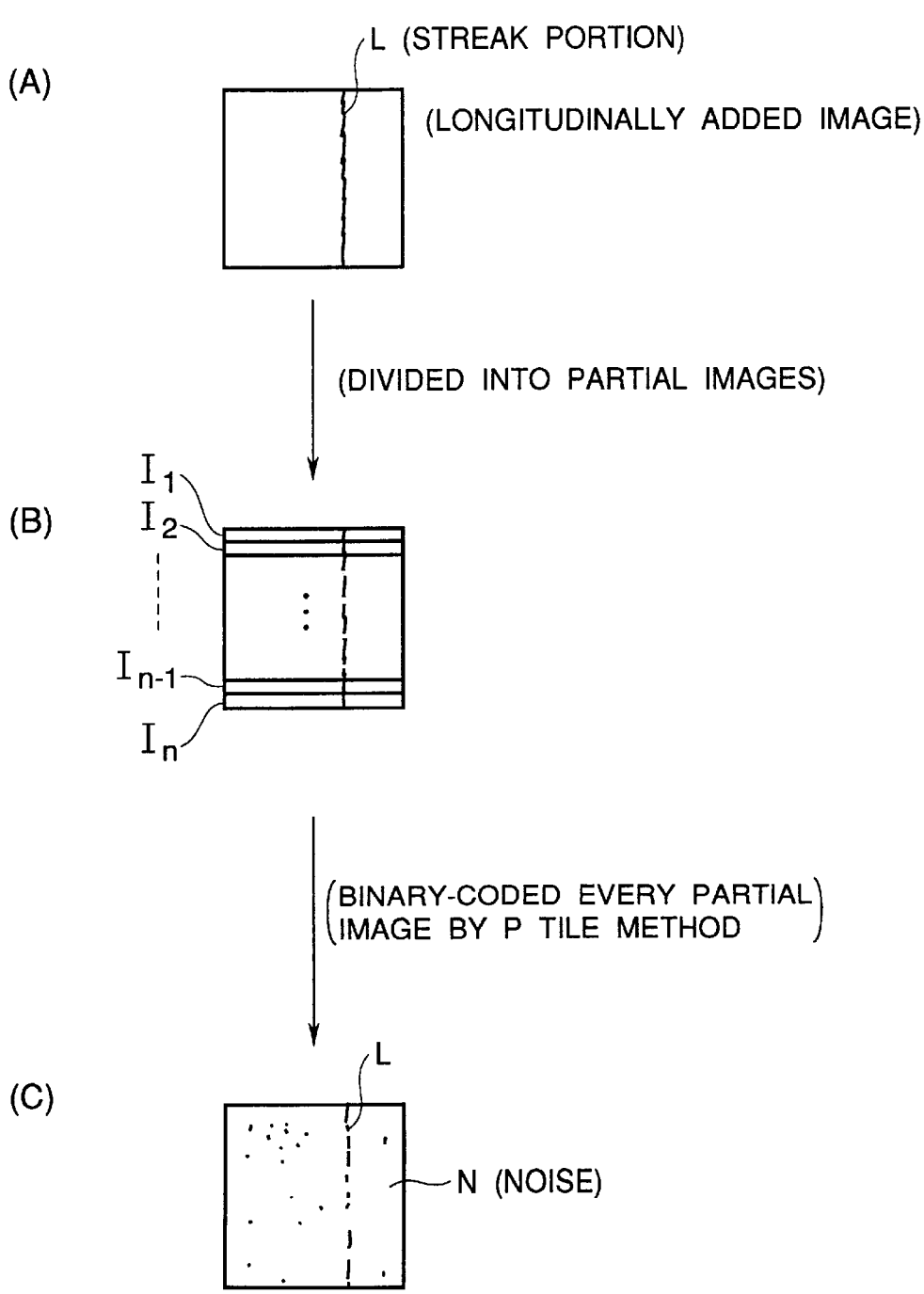
FIG. 58 are a diagram conceptually showing a binary image preparing procedure in the eighth embodiment.

The operation of this embodiment can be identical with that of the first embodiment, except that the binary-coding section 16A carries out the binary-coding processing using the P tile method depending on the procedures shown in FIG. 58 which is substantially identical with that of the eighth embodiment. Therefore, the description of the operation is omitted.

According to this embodiment, the masking-processing is made for excepting the edge portion which is high in contrast from the subject of processing, the streak portion which is low in contrast is emphasized by carrying out the longitudinal addition-processing, and then the P tile method according to the present invention is further applied to the emphasized image, thereby enabling the streak portion to be surely binary-coded, even if the image to be inspected includes the pattern, which causes the streak-like defect to be detected based on the binary-coded image.

Therefore, according to this embodiment, the streak-like defect which is low in contrast can be detected from the image to be inspected without detecting the edge portion of the pattern even if the image includes the pattern. This enables the fine streak-like defect also, which is low in contrast, called the doctor streak to be automatically detected, which has been capable of being detected only by the visual check in conventional inspection of printed matter.

Moreover, there is described in this embodiment the case in which the concrete subject of binary-coding is directed to the doctor streak, and the input image is directed to the image subjected to a predetermined processing; however, this embodiment is not limited thereto. So long as the image has the streak-like thing continuing substantially in the same direction on the flat background, no particular limitation can be applied to the image.

Next, an image inputting device according to a tenth embodiment of the present invention will now be described in detail.

Figure 59:
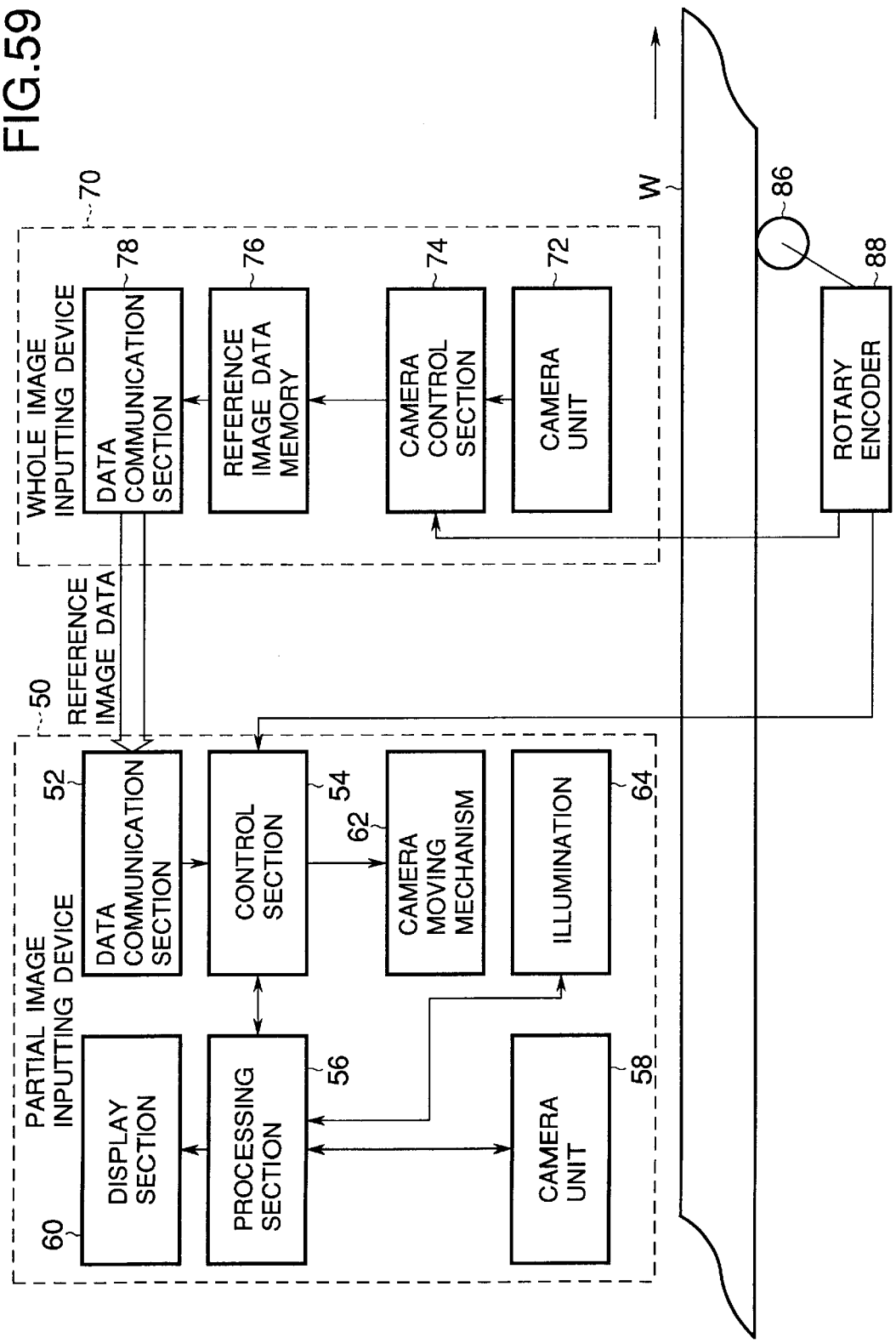
FIG. 59 is a block diagram showing the general arrangement of an image inputting device according to a tenth embodiment of the present invention.

FIG. 59 is a block diagram schematically showing a whole image inputting device and a partial image inputting device which constitute the tenth embodiment.

The partial image inputting device 50 in this embodiment is used for inputting a part of the printed pattern from an original piece W which is printed by a print drum (not shown) of a web press and continuously transferred in a flow-direction shown by an arrow, and uses the whole pattern including the whole pattern separately input by a whole image inputting device 70, as a reference image for guiding.

For convenience, the whole image inputting device 70 will be first described. The whole image inputting device 70 is disposed at a predetermined position along the flow-direction of an original piece W, and comprises a wholly inputting camera (camera unit) 72 which is capable of inputting (photographing) the whole image including the whole pattern on the original piece W, a camera control section 74 for controlling the image inputting by the wholly inputting camera 72, a reference image data memory 76 for storing the whole image input through the control section 74, as a reference image, and a data communication section 78 for reading out the data of the whole image and the like from the data memory 76 and transferring them to the partial image inputting device 50.

On the other hand, the partial image inputting device 50 comprises a data communication section 52 for receiving the data such as the whole image data transmitted from the data communication section 78, a control section 54 including respective means for executing the calculation for control described later, a processing section 56 for carrying out the image processing and the signal transmission, a partially inputting camera (camera unit) 58 for inputting a part of the pattern on the original piece W based on the control signal input from the control section 54 through the processing section 56, a displaying section (display) 60 for displaying the processing result on the processing section 56, a camera moving mechanism 62 for moving the partially inputting camera 58 in the width-directionwise position of the original piece W corresponding to a predetermined photographing point, and an illumination (electronic flash) 64 moving together with the partially inputting camera 58 for emitting light in synchronization with the photographing based on the control signal input through the processing section 56.

Further, there is provided a roller 86 rotating so as to interlock with the transferring of the original piece W. The roller 86 is provided with a rotary encoder 88 for converting the moving amount of the original piece into the pulse number, which enables a pulse signal from the encoder 88 to be input to the camera control section 74 of the whole image inputting device 70 and the control section 54 of the partial image inputting device 50, respectively.

The reference image data memory 76 of the whole image inputting device 70 stores information, which are used for calculation described later together with the whole image data, such as a distance L between the wholly inputting camera 72 and the partially inputting camera 58, a circumferential length T of the print drum used, a pulse resolution of the rotary encoder 88, and the prearranged origin on the moving mechanism 62. These information are transmitted to the partial image inputting device 50 together with the whole image data.

In this embodiment, the partial image inputting device 50 is used when inspecting the printing condition, with the pattern printed on the running original piece W as the subject of inspection, based on the image to be inspected to which a part of the pattern input by the partially inputting camera 58 movable in the width-direction of the original piece W by the moving mechanism 62.

In this embodiment, when the normal printing surface is obtained after the printing is started and the printing condition is stabilized, the wholly inputting camera 72, which is arranged a predetermined distance L apart from the partially inputting camera 58 in the flow-direction of the original piece W, inputs the whole image including the whole pattern, and then stores the input image in the reference image data memory 76. There are schematically shown in FIG. 60 the relationship between the partially inputting camera 58 supported movably in the width-direction on the camera moving mechanism (width-directionwise moving mechanism) 62 with a linear guide, the wholly inputting camera 72 comprising two sets of cameras, the original piece W, and the whole pattern including a triangle pattern on the original piece W.

Then, the whole image (reference image) is transmitted together with the other data from the memory 76 to the partial image inputting device 50 through the data communication sections 78, 52, and then the calculation for control described later in detail is executed by the control section 54.

When the partially inputting camera 58 first is on the origin (origin of the width-directionwise moving mechanism) set on the camera moving mechanism 62, the width-directionwise position on the whole image and the width-directionwise position on the moving mechanism 62 are coordinated to each other, based on the relationship between the position of the partial image on the whole image which is capable of being input by the camera 58 and the width-directionwise reference point S previously set on the whole image.

Figure 60:
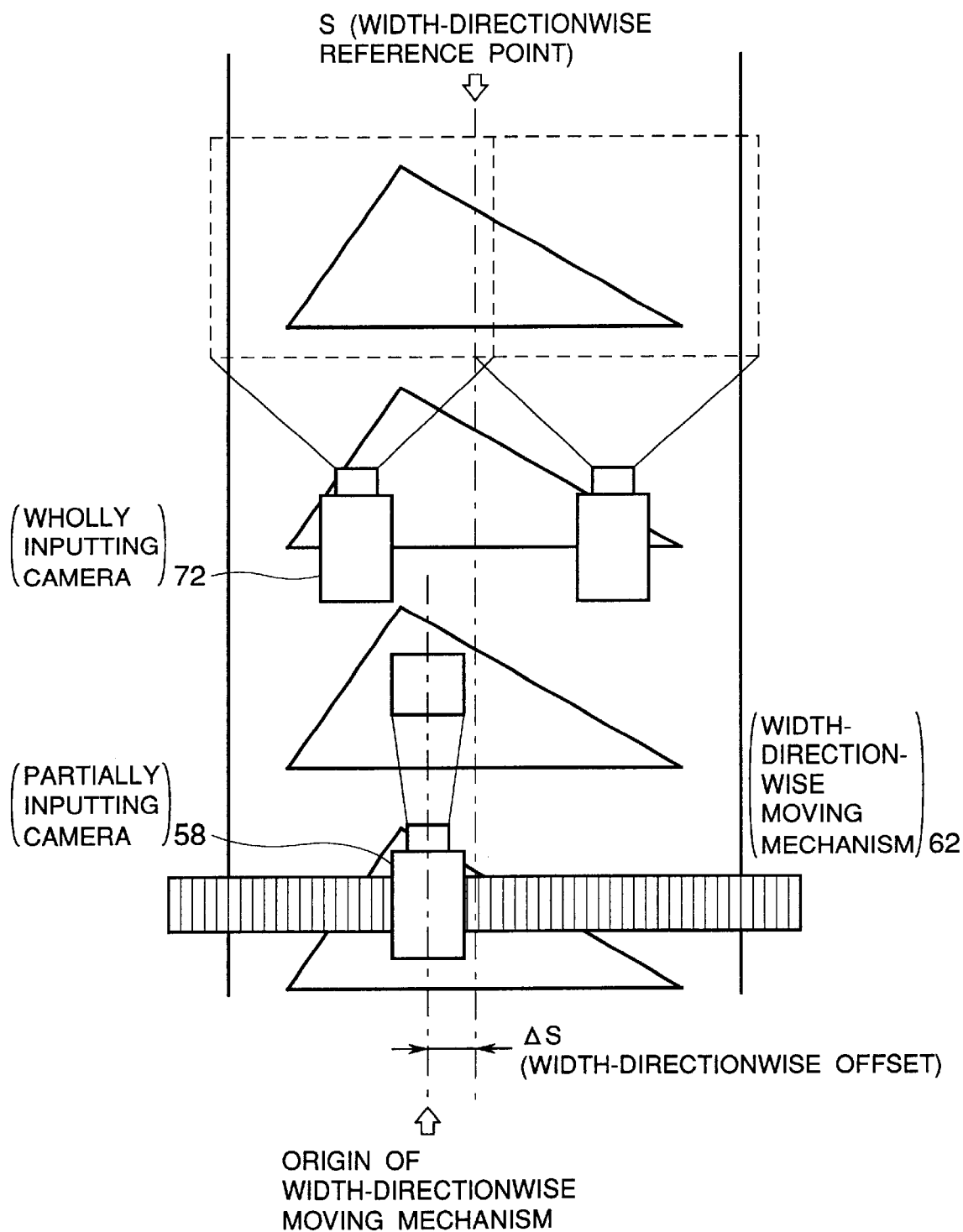
FIG. 60 is an explanatory view showing the width-directionwise positional relationship between a wholly inputting camera and a partially inputting camera, and the like in the tenth embodiment.

There is conceptually illustrated in FIG. 60 the condition of the above-mentioned coordination, that is, the center of the partial image which is capable of being input from the partially inputting camera 58 positioned on the origin on the moving mechanism 62 is coordinated on the position which is a width-directionwise offset $\Delta S$ apart from the width-directionwise reference point S on the whole image. Therefore, registering this offset (distance) $\Delta S$ enables the partially inputting camera 58 to be moved to an accurate width-directionwise position by the moving mechanism 62, with the width-directionwise reference point S as the origin of the camera on the whole image.

Next, the reference inputting timing at which the partial image positioned at the flow-directionwise reference point on the whole image is capable of being input by the partially inputting camera 58 is calculated based on the flow-directionwise distance L between the wholly inputting camera 72 and the partially inputting camera 58 and the print drum circumferential length T.

Figure 61:
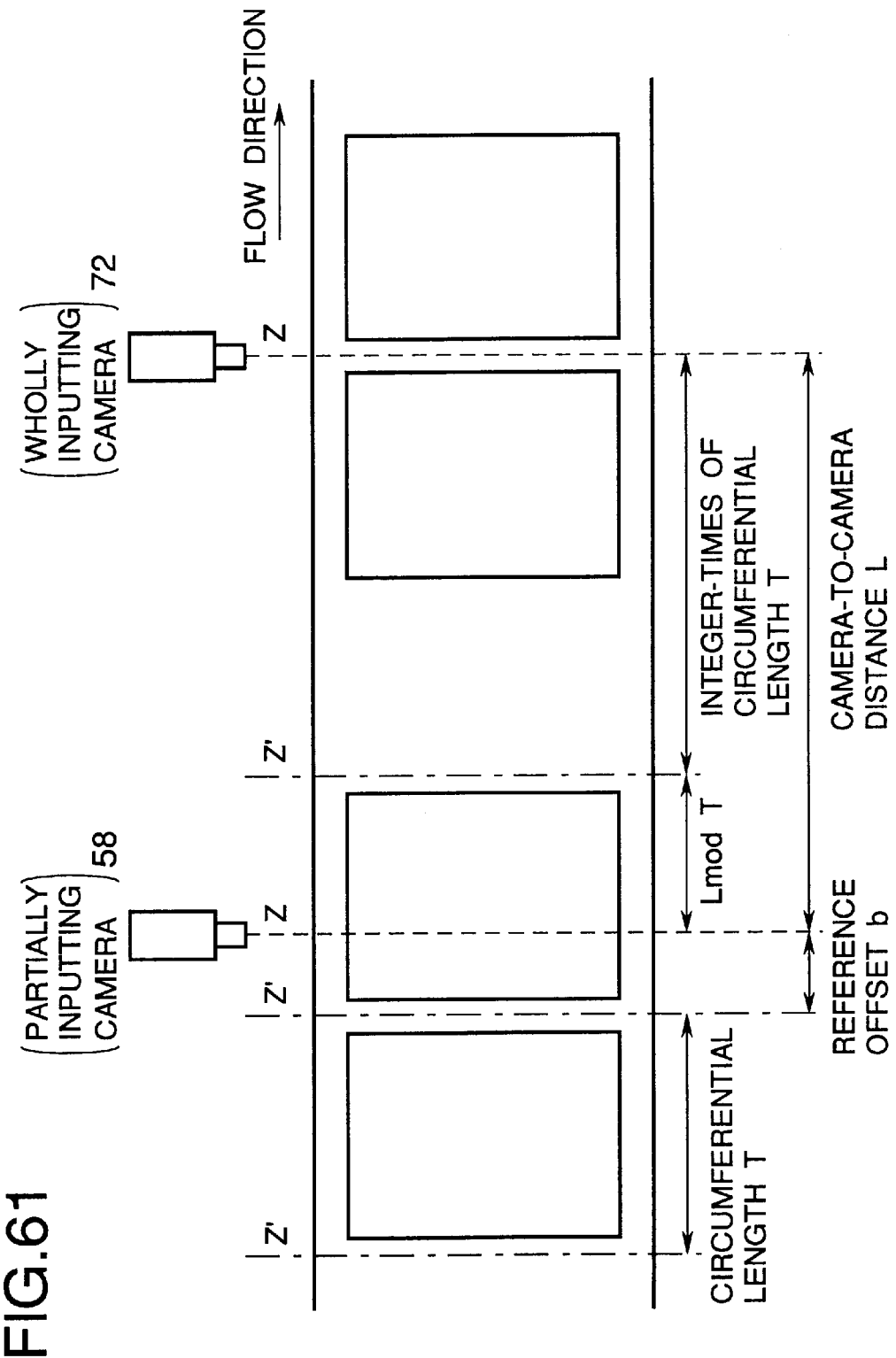
FIG. 61 is an explanatory view showing the flow-directionwise positional relationship between the wholly inputting camera and the partially inputting camera, and the like in the tenth embodiment.

There is conceptually shown in FIG. 61 the reference inputting timing calculating method set according to this embodiment. On this occasion, the partially inputting camera 58 is arranged at a portion upstream of the wholly inputting camera 72. In order to partially input the same pattern as the pattern positioned substantially at the center of the visual field (width-directionwise reference point) of the wholly inputting camera 72 shown in FIG. 61, supposing that the timing input by the wholly inputting camera 72 corresponds to the phase Z of the rotary encoder 88, it needs only to input the image at the timing (reference inputting timing) of a phase Z' delayed from a phase Z by such a phase as to excessively transmit the original piece having the length corresponding to the reference offset b.

Inputting the above-mentioned image causes the original piece W having the length corresponding to the distance L to exist between both the cameras 58, 72, and the pattern corresponding to the period of integer (N) times of the print drum circumferential length T and the pattern having the length of Lmod: remainder left by dividing L by T to exist on the original piece W. This causes the same pattern apart from the input pattern of the flow-directionwise reference point by the pattern period of integer (N+1) times to be input when the image is input at the phase Z by the wholly inputting camera 72.

However, the reference inputting timing is set by the pulse number output from the rotary encoder 88 by converting the reference offset b, that is, (T−Lmod T) into the reference offset pulse B by use of the following equation (11):

$$B = (T - L \bmod T) \div R \qquad (11)$$

where R denotes the pulse resolution of the rotary encoder (mm/pulse).

Figure 62:
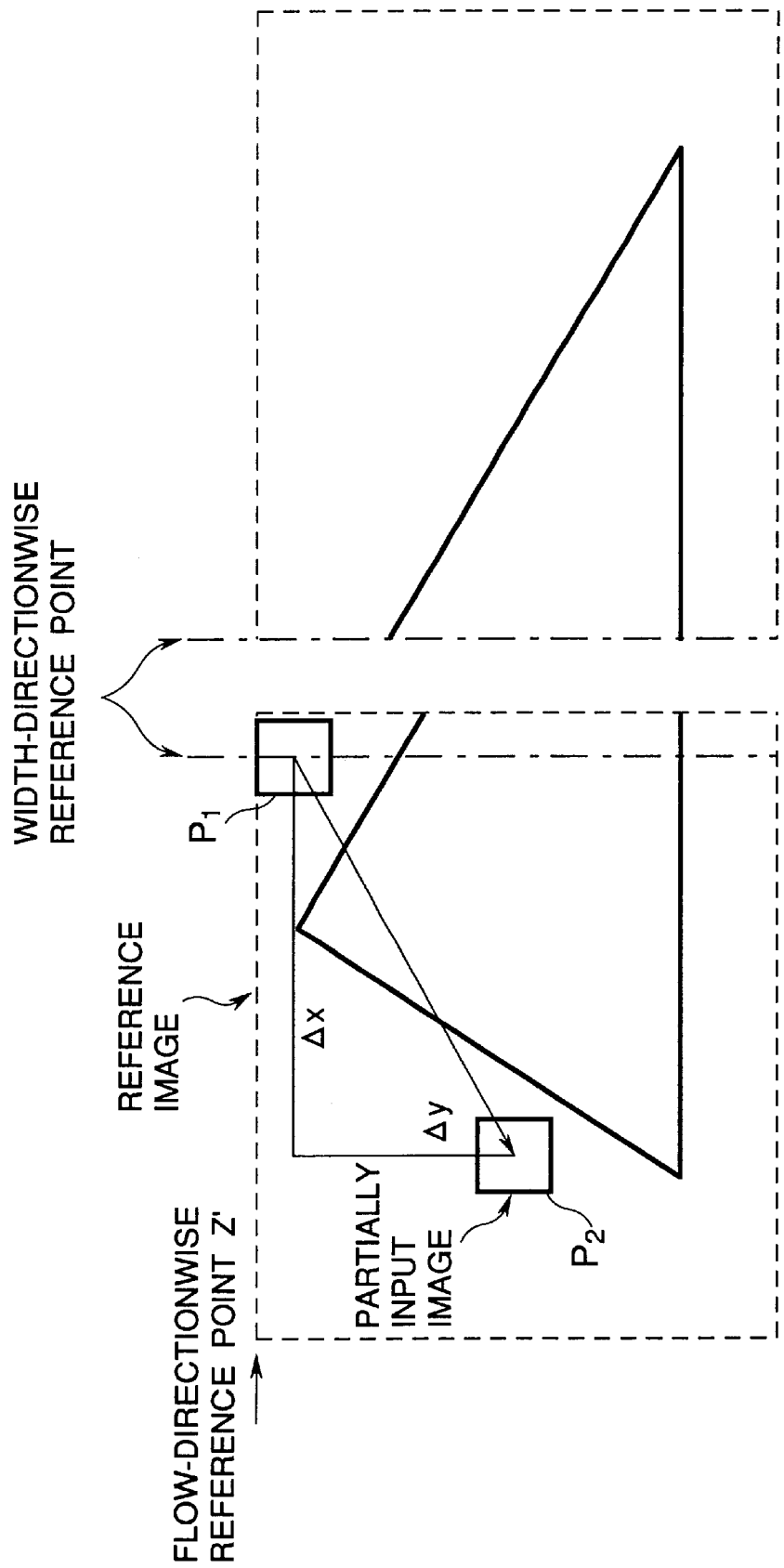
FIG. 62 is an explanatory view showing the relationship between a whole image and a photographing point in the same embodiment.

Next, the photographing point to be input by the partially inputting camera 58 is positioned and then set on the whole image in the width- and the flow-directions. FIG. 62 conceptually shows the case in which the photographing point at P2, in which P1 designates the partial image which is capable of being input by the partially inputting camera 58 at the reference timing corresponding to the flow-directionwise reference point Z' shown in FIG. 61 with the width-directionwise reference point on the whole image as a center.

There are calculated a width-directionwise pixel number $\Delta x$ between the photographing point P2 and the width-directionwise reference point S and a flow-directionwise pixel number $\Delta y$ between the photographing point P2 and the flow-directionwise reference point Z', on the whole image of FIG. 62.

The width-directionwise moving amount on the moving mechanism 62 coordinated with the width-directionwise reference point S on the whole image is calculated by multiplying the calculated width-directionwise pixel number Δx by a horizontal resolution (width-directionwise resolution) of the whole image. That is, the actual width-directionwise moving amount is calculated by use of the following equation (12):

$$\text{Width-directionwise moving amount} = \text{Pixel number } \Delta x \times \text{Horizontal resolution} \quad (12)$$

Moreover, the actual distance (length of original piece W) is obtained by multiplying the calculated flow-directionwise pixel number Δy by a vertical resolution (flow-directionwise resolution) of the whole image, and then a waiting time from the reference offset pulse B to the actual inputting is calculated based on the above distance. Here, the waiting time is set by the pulse number from the rotary encoder 88 as the flow-directionwise shift pulse number from the reference offset pulse B, calculated by use of the following equation (13):

$$\text{Flow-directionwise shift pulse umber} = \text{Pixel number } \Delta y \times \text{Vertical resolution} \div R \quad (13)$$

After the control section 54 finishes the above calculation, it outputs the calculation result to the processing section 56 and the moving mechanism 62. The output calculation result is changed to the value of the corresponding motor control signal, by which the moving mechanism 62 moves the partially inputting camera 58 to the target position corresponding to the width-directionwise moving amount.

Next, the partially inputting camera 58 inputs the partial image at the timing of the shift pulse number (waiting time) having elapsed from the reference offset pulse B.

As described above in detail, according to this embodiment, only instructing (setting) the photographing point P2 on the whole image by, for example, the coordinate value of its center causes the partially inputting camera 58 to move to the corresponding suitable width-directionwise position, and inputting the image at the suitable timing enables the corresponding partial image to be accurately input, as shown in FIG. 62. This enables the pattern portion located at a desired position to be easily photographed.

On this occasion, the photographing point may be set manually, or may be automatically set by previously registering the coordinate value of at least one point on a memory, and then reading out the coordinate value.

Figure 63:
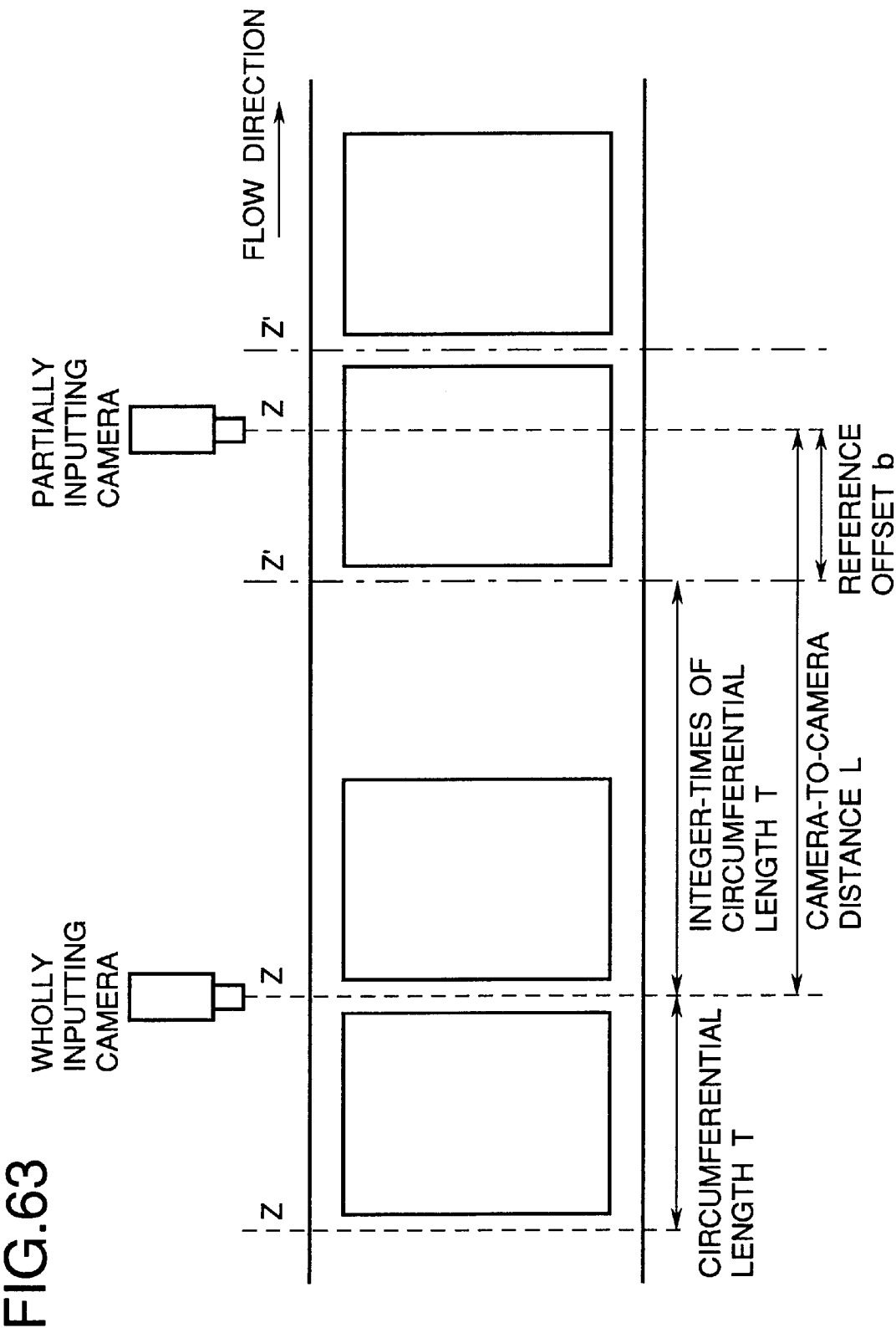
FIG. 63 is an explanatory view showing the flow-directionwise relationship between the wholly inputting camera and the partially inputting camera in an image inputting device according to an eleventh embodiment of the present invention.

FIG. 63 shows features of a partial image inputting device according to an eleventh embodiment of the present invention.

This embodiment can be substantially identical with that of the tenth embodiment, except that the partially inputting camera 58 is arranged at a portion downstream of the wholly inputting camera 32, and then the reference offset pulse B set by use of the equation (11) in the tenth embodiment is set by use of the following equation (14) in this embodiment:

$$B = (L \bmod T) \div R \quad (14)$$

Next, an image inputting device according to a twelfth embodiment of the present invention will now be described.

Figure 64:
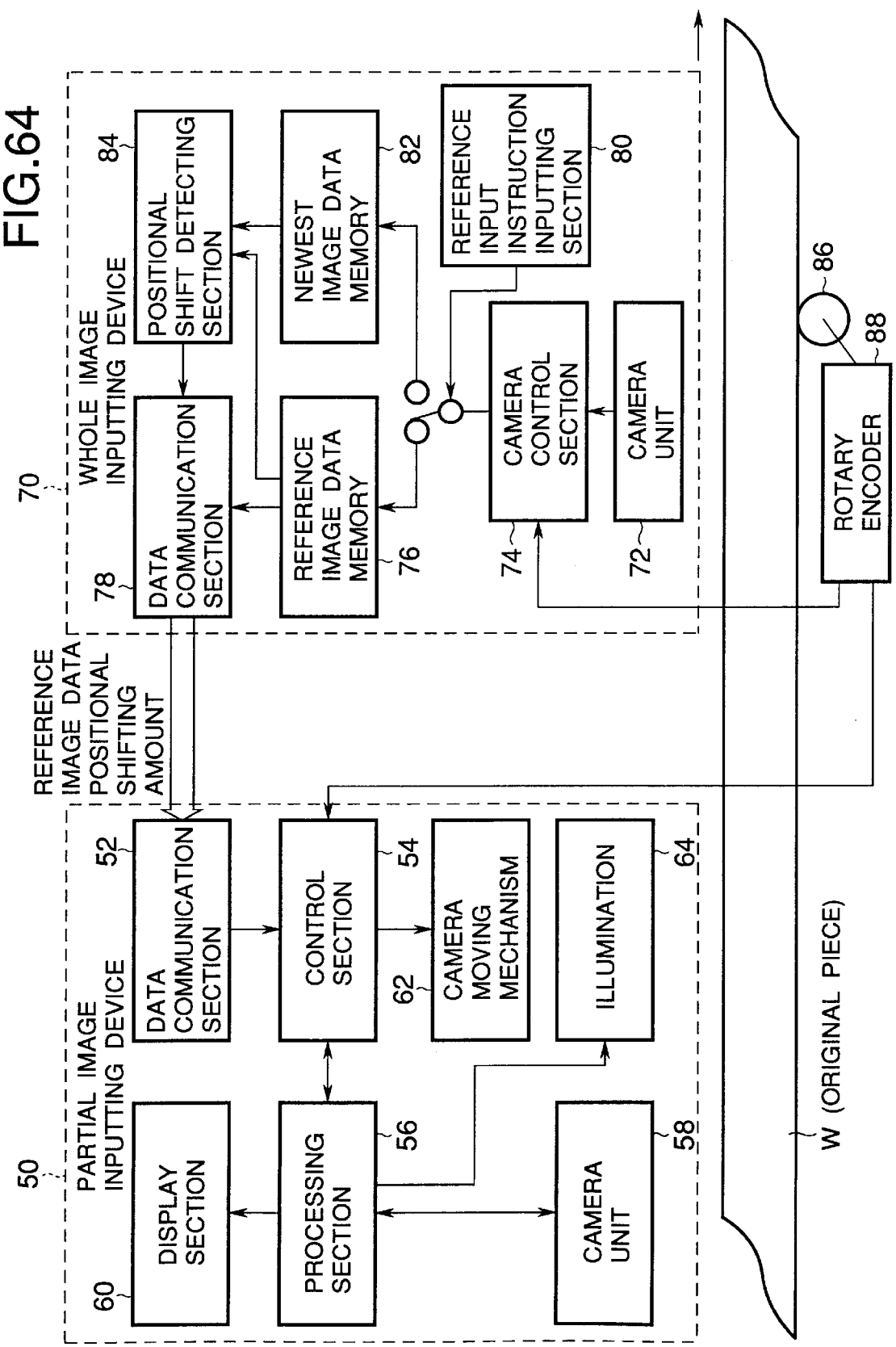
FIG. 64 is a block diagram showing the general arrangement of an image inputting device according to a twelfth embodiment of the present invention.

FIG. 64 is a block diagram schematically showing a whole image inputting device and a partial image inputting device, which constitute the twelfth embodiment.

The partial image inputting device 50 of this embodiment can be identical with that of the tenth embodiment, and description thereof is omitted.

On the other hand, the whole image inputting device 70 comprises, in addition to the wholly inputting camera (camera unit) 72, the camera control section 74, the reference image data memory 76, and the data communication section 78, which are identical with those of the tenth embodiment, a reference input instruction inputting section 80 for inputting the reference image from the wholly inputting camera 72 with the switches changed as illustrated in the drawing at the beginning of the printing, and inputting the newest whole image from the camera 72, a newest image data memory 82 for storing the input newest whole image, and a positional shift detecting section 84 for comparing the newest image from the memory 82 with the reference image from the memory 76 to detect the width- and the original piece flow-directionwise positional shifts.

Further, the reference image data memory 76 stores. not only the reference image data comprising the whole image, but also the distance L between the wholly inputting camera 72 and the partially inputting camera 58, the print drum circumferential length T, the pulse resolution of the rotary encoder 88, the camera origin on the moving mechanism 62, and the like, and further transmits them to the partial image inputting device 50 through the data communication section 78, together with the reference image data and the positional shift data suitably detected by the detecting section 84.

In this embodiment, the reference image, which is input at the beginning of the printing and then stored in the reference image data memory 36, is subjected to the various kinds of the processing carried out on the whole image which is momentarily changed in the tenth embodiment.

Figure 65:
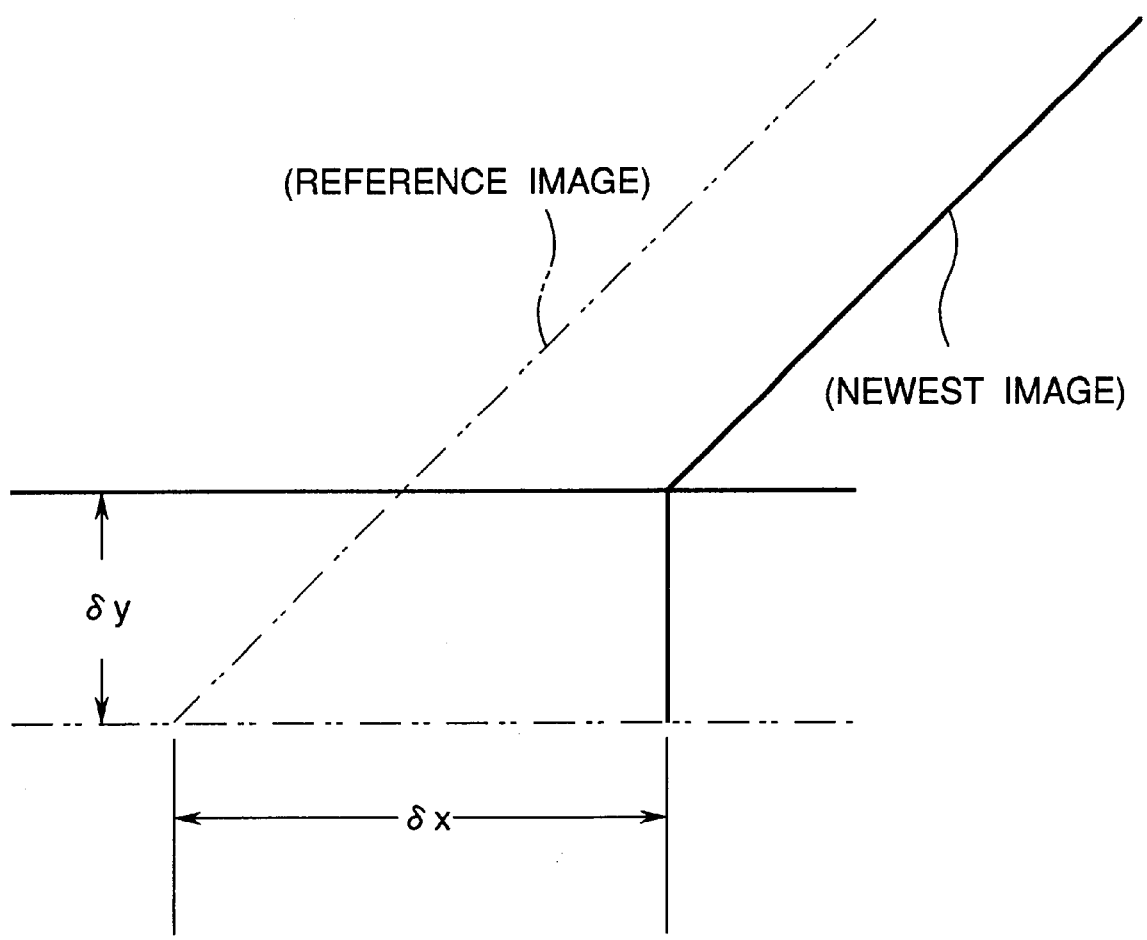
FIG. 65 is a diagram showing the positional shift of the newest image from a reference image in the twelfth embodiment.

Besides, this embodiment is adapted to set the target photographing point by using the reference image and to input the image by the partially inputting camera 58 as is the case with the tenth embodiment. Further, the newest whole image (the newest image) is input by the wholly inputting camera 72 to store them in the newest image data memory 82, to compare the newest image read out from the memory 82 with the reference image read out from the reference image data memory 76 to detect whether or not the positional shift is caused, by the positional shift detecting section 84, and amend, when the sift is caused, as follows:

On this occasion, suppose that as to the positional relationship between the input newest image and the reference image used for setting the photographing point, the newest image represented by the actual line are shifted in position by δx in the width-direction and by δy in the original piece flow-direction compared with the reference image represented by the two-dot chain line, as shown by the partially enlarged pattern of triangle in FIG. 65. This positional shifting amount can be obtained by use of the method disclosed in Japanese Patent Provisional Publication (Kokai) No. 7-249122.

In this case, the width-directionwise moving amount by the equation (12) and the flow-directionwise shift pulse number by the equation (13), which are used when inputting the photographing point P set to the reference image shown in FIG. 64 are set by use of the following equations (12') and (13'):

$$\text{Width-directionwise moving amount} = (\text{Pixel number } \Delta x - \delta x) \times \text{Horizontal resolution} \quad (12')$$

$$\text{Flow-directionwise shift pulse number} = (\text{Pixel number } \Delta y - \delta y) \times \text{Vertical resolution} \div R \quad (13')$$

As a result, according to this embodiment, the partial image of the target photographing point, which is initially set, can be accurately input even when the newest image is shifted in position with respect to the reference image.

Next, a partial image inputting device according to a thirteenth embodiment of the present invention will now be described.

This embodiment is substantially identical with that of the twelfth embodiment, except that the partially inputting camera 58 is arranged at a portion downstream of the wholly inputting camera 72 as is the case with the eleventh embodiment, and that the reference offset pulse B set by use of the equation (11) in the twelfth embodiment is set by use of the equation (14).

Moreover, in the tenth to the thirteenth embodiments, the wholly inputting camera for inputting the whole pattern comprises two cameras; however, it may comprises one or not less than three cameras.

Also, the photographing point may be set not only in the width-direction and in the flow-direction on the whole image as described in the twelfth and the thirteenth embodiments, but also only in the width-direction, which enables the printing defect caused continuously in the flow-direction to be surely detected.

According to the tenth to the thirteenth embodiments as described above, the pattern portion of the photographing point can be easily input even if there are many photographing points to be partially input, on the printed pattern. Particularly, according to the twelfth and the thirteenth embodiments, the partial image can be accurately input even if the pattern is shifted with the passage of time in the width-direction or in the flow-direction of the original piece.

Next, a plain region selecting device according to a fourteenth embodiment of the present invention will be described in detail.

Figure 66:
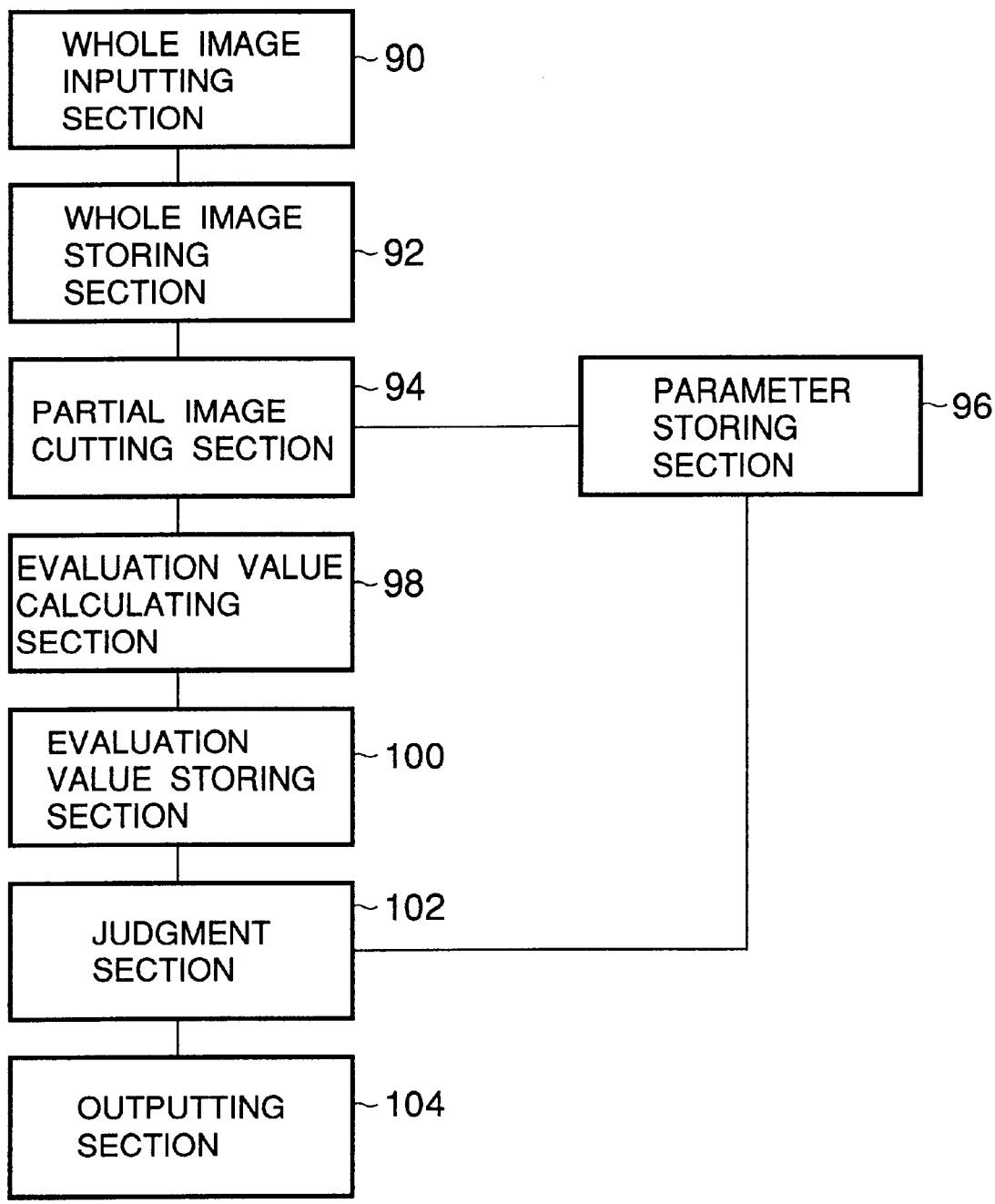
FIG. 66 is a block diagram showing the general arrangement of a plain region selecting device according to a fourteenth embodiment of the present invention.

FIG. 66 is a block diagram showing a general arrangement of the fourteenth embodiment.

The plain region selecting device of this embodiment is applied to the selection of the plain region in order to detect the printing condition by inputting the plain region of the whole pattern by the partially inputting camera, which is movable in the width-direction of the original piece, disposed on the inspection device (not shown).

The plain region selecting device comprises a whole image inputting section 90 for inputting a whole image in which the printed whole pattern is included, a whole image storing section 92 for storing the data of the input whole image, a partial image cutting section 94 for cutting a partial image read out from the storing section 92 with the size corresponding to the image to be inspected as a unit according to the method described later in detail, a parameter storing section 96 for storing parameters such as the size of the partial image used for the processing of the cutting section 94, and the number of the partial images selected as the inspection point by the judgment section 102 described later, an evaluation value calculating section 98 for calculating an evaluation value, representing the flatness of brightness, of the respective partial images cut by the cutting section 94, an evaluation value storing section 100 for storing the evaluation value of the respective partial images calculated by the calculating section 98, a judgment section 102 for selecting the respective partial images, which are high in the flatness of brightness, based on the evaluation value read out from the storing section 100 to judge the selected partial images according to the number of the partial images input from the parameter storing section 96, as inspection points, and an output section 104 for outputting the positional (address) information of the partial images judged as the inspection point.

When the positional information related to the inspection points judged by the judgment section 102 are input from the outputting section 104 to the inspection device, the inspection device moves the partially inputting camera (not shown) to the inspection point on the printed matter corresponding to the judged inspection point, and then inputs the image to be inspected from the inspection point by the camera.

The plain region selecting device of this embodiment being described in detail, the whole image inputting section 90 may comprises an image pickup device such as a CCD camera installed on the printing line, or a storing device such as a data base in which the image of a normal printed matter is previously input and stored.

Figure 67:
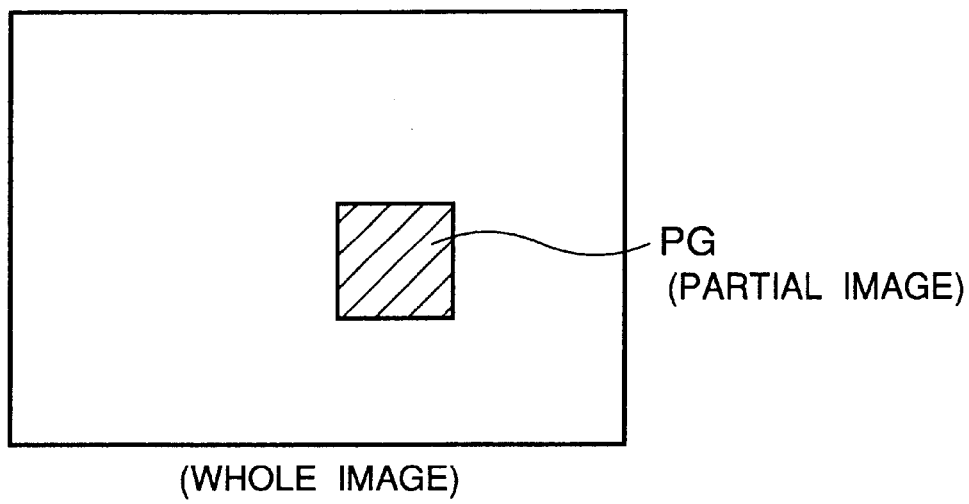
FIG. 67 is a diagram showing the relationship between a whole image and a partial image in the fourteenth embodiment.

The partial image cutting device 94 extracts (cuts) a partial image with the size corresponding to the range on the printed matter to be actually detected, as a unit, from the whole image input from the wholly inputting section 90, as conceptually shown in FIG. 67. The size of the partial image is input from the parameter storing section 96 as a separately set parameter, as described above.

Figure 68:
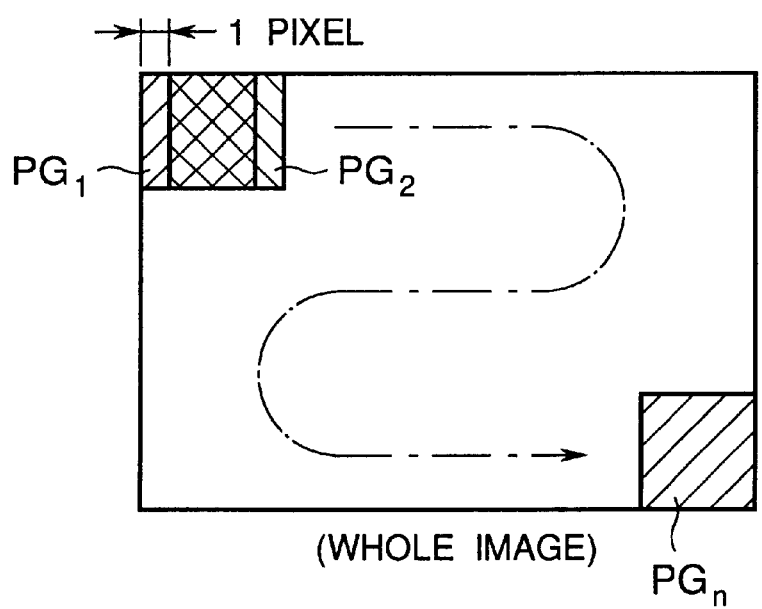
FIG. 68 is a diagram showing a partial image cutting method in the same embodiment.

As shown conceptually in FIG. 68, the concrete cutting method comprises the steps of cutting the partial images from the partial image PG1 located at the upper left portion of the whole image while shifting one pixel at a time in the lateral direction shown by the arrow as is the partial image PG2, finally to the final partial image PGn located at the lower right portion of the whole image. On this occasion, as to the longitudinal moving amount required when the cut partial image is shifted to the next cutting column after the cutting for the first column has been finished with respect to the whole width in the lateral direction, any moving amount may be employed insofar as it disables the gap to be caused in the longitudinal direction.

As to all the partial images, included in the whole image, cut by the partial image cutting section 94, i.g. with the method shown in FIG. 68 used, the evaluation calculating section 98 calculates the evaluation value representing the flatness of the brightness.

The calculating section 98 employs, as the evaluation value, any one of (1) the maximum frequency of the brightness distribution (histogram) related to all the pixels included in the partial image, (2) the dispersion of the above distribution of the brightness, and (3) the brightness value (hereinafter referred to as "the partially divided brightness value") of dividing the above brightness distribution into the higher brightness value side portion or the lower brightness side portion, of a predetermined rate.

Figure 69:
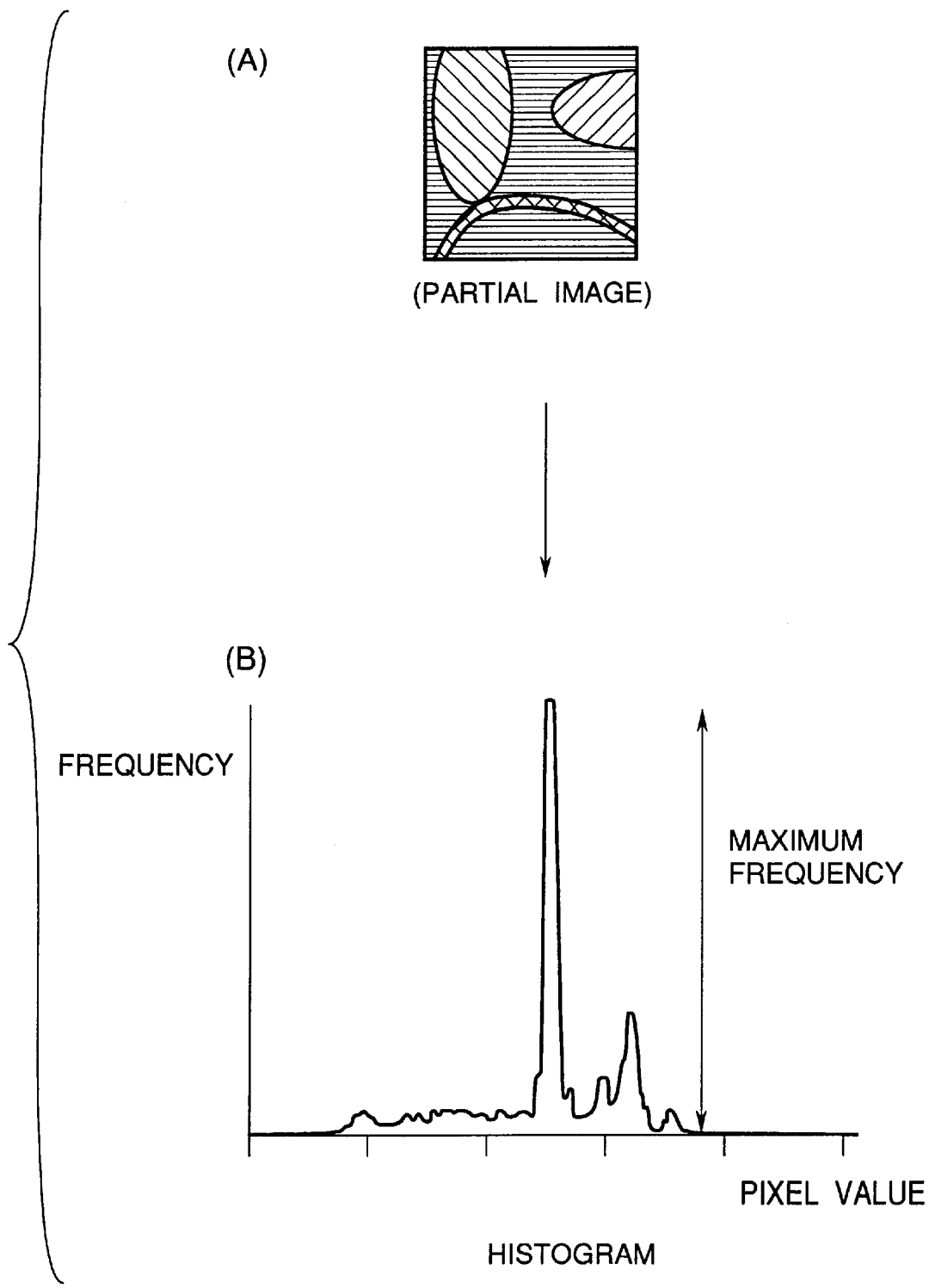
FIG. 69 are diagrams showing the partial image and one example of the brightness distribution thereof.

The maximum frequency of the brightness distribution of (1) is the maximum value in the histogram related to the number (frequency) of the pixels having the same brightness value (graduation value) in the partial image, as shown in FIG. 69(B) which shows the brightness distribution related to all the pixels included in one of the partial images schematically shown in FIG. 69(A).

According to this embodiment, the evaluation value storing section 100 stores the calculated maximum frequencies for all the partial images in the whole image, respectively, and the judgment section 102 judges that the as the maximum frequency is increased, the portion of the printed matter corresponding to the partial image come near to the solid portion having less shading (the density difference is less), that is, the plain region. Moreover, when employing such the maximum frequency, there may be employed as the evaluation value the sum of the frequencies related to the respective pixel values included in some width ranges with the pixel value of the above maximum frequency as a center.

Employing such the maximum frequency as the evaluation value causes the calculation processing to be accelerated compared with the case in which the dispersion described later is used, and further brings about the effects that the region further nearer to the plain region can be selected when there is little the plain portion, and there are a plurality of peaks on the brightness distribution.

The above-mentioned distribution of brightness of (2) is calculated by the following equation (15):

$$\sigma = (1/N^2)\sum_{i=1}^{N}(ai-\overline{a})^2 \qquad (15)$$

where N designates the number of pixels in the partial image, ai the i-th pixel value, and $\overline{a}$ designates the average pixel value of the partial image.

When the dispersion σ is employed as the evaluation value also, this value is obtained for each of the partial images cut from the whole image, and then the values are stored similarly in the storing section 20. Then, the judgment section 22 judges as the dispersion a is decreased, the portion of the printed matter corresponding to the partial image come nearer to the solid portion.

When the dispersion a is employed as the evaluation value also, this value is obtained for each of the partial images cut from the whole image, and then the values are stored similarly in the storing section 100. Then, the judgment section 102 judges as the dispersion is decreased, the portion of the printed matter corresponding to the partial image come nearer to the solid portion.

Figure 70:
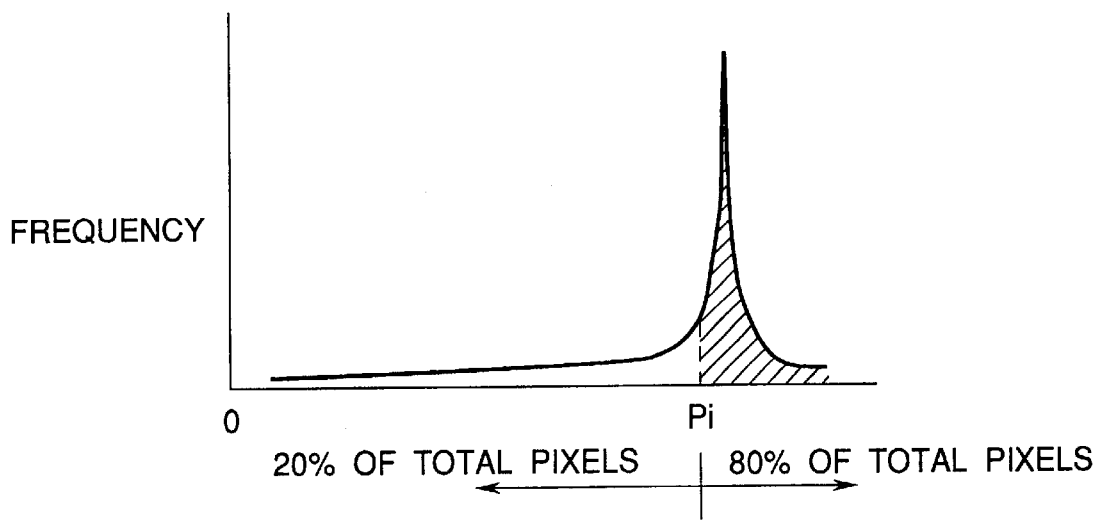
FIG. 70 is a diagram helpful in explaining a divided pixel value.

The above-mentioned partially divided brightness value of (3) is obtained by the brightness value (pixel value) Pi of dividing the whole distribution (whole frequency=total pixel number) into the higher brightness side portion of 80% and the lower brightness side portion of 20%, as conceptually shown in FIG. 70 of the case in which the i-th partial image is one-sided toward the higher brightness value.

This partially divided pixel value is calculated for each of all the partial images, and then the calculated partial images are stored in the storing section 100 and used for the judgment by the judgment section 102. The larger the partially divided value Pi is, the brighter the region corresponding to the partially divided pixel value Pi is considered. The partially divided pixel value Pi is characterized in that the larger it is, the nearer the region corresponding to the partially divided pixel value Pi may possibly come to the solid portion.

The evaluation of the flatness of this partially divided pixel value P1 can be changed by changing the division ratio of the distribution of brightness. The partially dividing direction can be selected by changing the above ratio from 20%:80% to 80%:20%, so that the solid portion can be selected for the dark portion in the similar manner.

The judgment section 102 reads out the evaluation value related to all the partial images stored in the storing section 100, and selects the inspection points, which are input from the parameter storing section 96, according to the preset number based on the evaluation value. On this occasion, selecting a plurality of the inspection points in the order of their reducing distance to the solid portion based on only the evaluation value may possibly cause the inspection points to be concentrated in a narrow range. Therefore, in order to prevent the concentration, when the evaluation values are of the same order and the regions on the images are overlapped one another, the inspection points may be selected with the one excluded by using the positional information of the respective partial images.

Further, the outputting section 104 outputs the positional information of the inspection points on the image selected by the judgment section 102, as described above.

Figure 71:
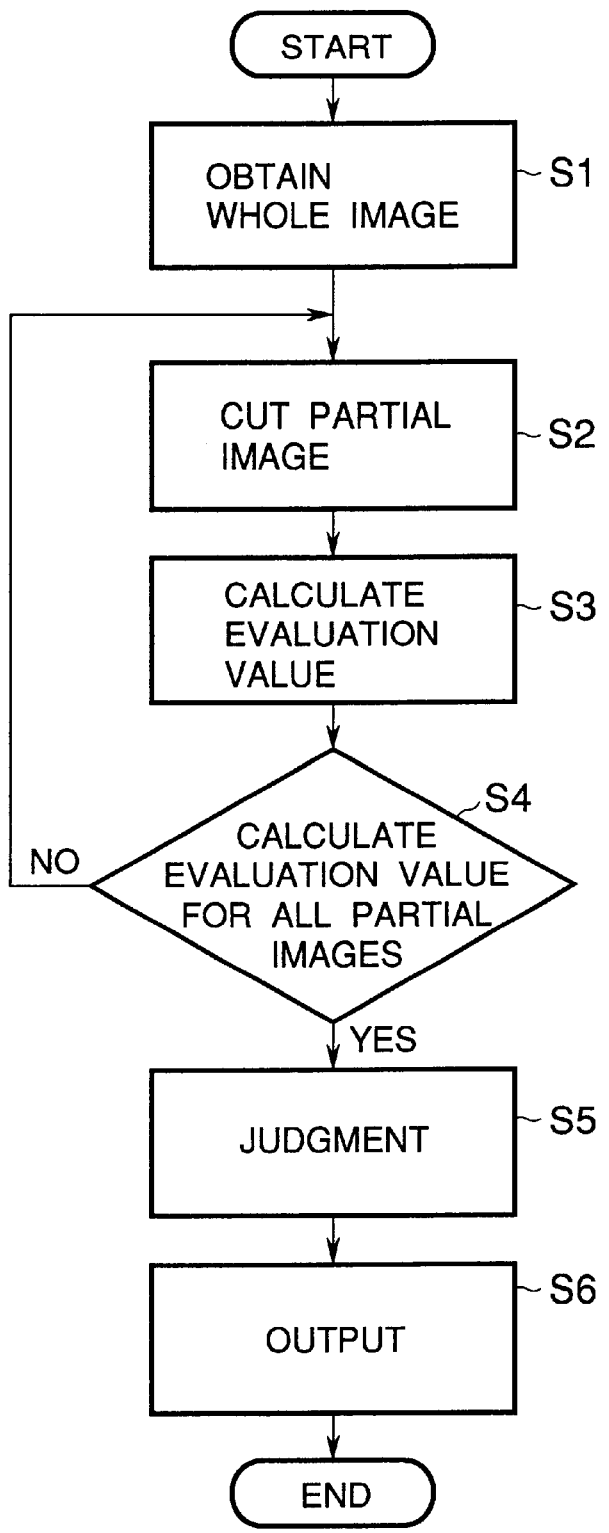
FIG. 71 is a flowchart showing a processing procedure in the fourteenth embodiment.

In this embodiment, the plain region is selected according to the flowchart shown in FIG. 71.

First, the whole image inputting section 90 obtains (inputs) the whole image including the whole pattern on the printed matter which is in the normal printing condition, and then stores it in the whole image storing section 92 (step S1).

This whole image may be directly input by the wholly inputting camera (not shown) at a step in which the printing is stabilized after the printing processing is started, or may be input from the data base or the like if the data of the whole image of the same pattern has been already stored.

Next, the partially inputting section 94 cuts the partial image from the whole image read out from the storing section 92, as shown in FIG. 68 (step S2).

Then, the evaluation value of the first cut partial image is calculated (step S3), and then all the partial images are subjected in turn to the similar calculation (step S4).

Next, the judgment section 102 judges (selects) a predetermined number of the partial images, which are high in flatness, as the inspection point on the image by using the evaluation value of all the partial images, and then outputs the positional information of the respective points to the inspection device.

When the positional information of the respective inspection points on the image are input to the inspection device, the inspection device moves the partially inputting camera to the width-directionwise position corresponding to the inspection points on the corresponding printed matter based on the positional information, and then inputting the image at the timing corresponding to the flow-directionwise position of the inspection points to form the image to be inspected.

As a result, the image can be input by selecting a plain or almost plain solid portion of from the whole pattern as the inspection point, which enables the fine printing defect such as the doctor defect to be surely detected.

Figure 72:
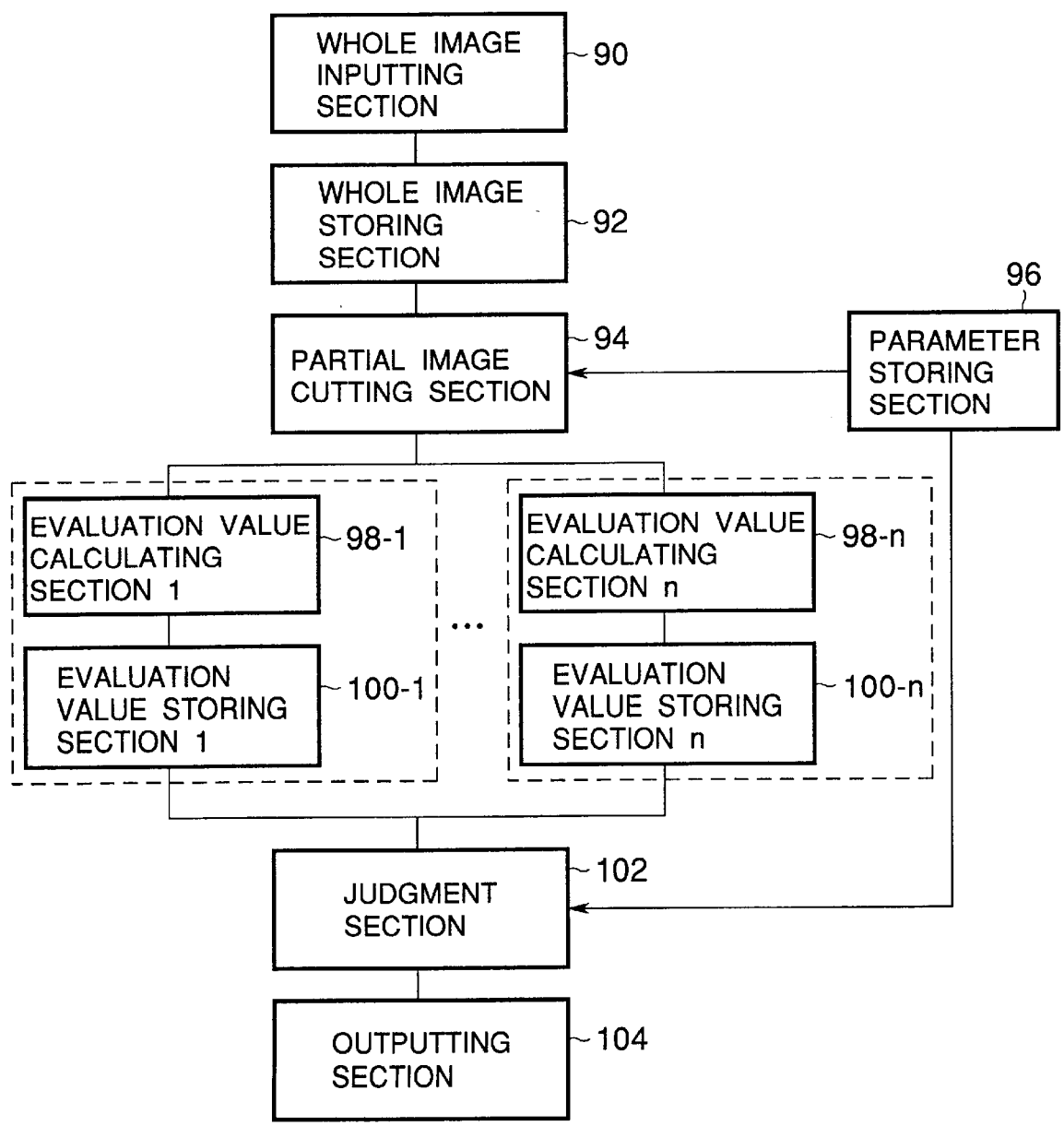
FIG. 72 is a block diagram showing the general arrangement of a plain region selecting device according to a fifteenth embodiment of the invention.

FIG. 72 is a block diagram showing a general arrangement of a plain region selecting device according to a fifteenth embodiment on the invention.

The plain region selecting device of this embodiment comprises n (plural) of sets of an evaluation value calculating section 98 and an evaluation value storing section 100, designated by 98-1 to 98-n, and 100-1 to 100-n, which aim to calculate and then store n kinds of evaluation values individually. The judgment section 102 judges a predetermined number of inspection points preset for each of the evaluation values, and the outputting section 104 carries out a parallel processing of outputting, in turn, the positional information related to the inspection point for each of the evaluation values.

In this embodiment, provided that when the above-mentioned parallel processing is carried out, there are two kinds of evaluation values for convenience, and there are set one inspection point per each of the evaluation values for each of a plurality of the inspection regions obtained by dividing the whole image with a predetermined width in the longitudinally, that is, total two inspection points for each of the inspection regions, the judgment section 102 outputs the positional information related to the inspection points on a predetermined number of images determined for each of the evaluation values, in turn, with the predetermined number as a unit.

Therefore, when the positional information related to the inspection points for each of the evaluation values are input to the inspection device from the outputting section 104, the inspection device can input the inspection point on the printed matter represented by five rectangles, as shown in FIG. 73(A) which schematically shows the relationship with the printed matter including the whole pattern exhibited when five inspection points are determined by the first evaluation value.

Thereafter, when the positional information related to the inspection point similarly determined based on the second evaluation value, the inspection point on the printed matter, the pattern of which is different from that of the first evaluation, can be input, as shown in FIG. 73(B).

Figure 74:
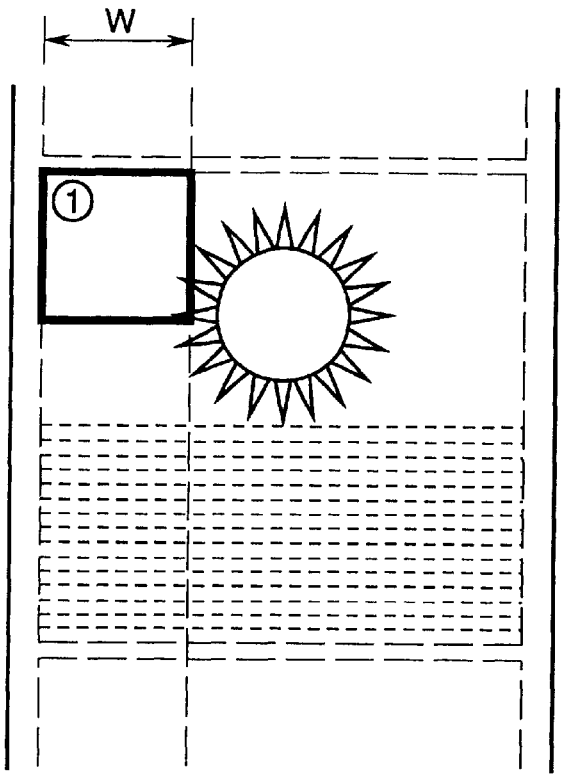
FIG. 74 is an explanatory view showing an inspection point when using only one evaluation value in the same embodiment.

In this embodiment, there can be alternately carried out the inspection due to the above-mentioned first evaluation value (for example, the maximum frequency of the above (1)), and the inspection due to the second evaluation (for example, the partially divided pixel value of the above (3)). Therefore, as shown in FIG. 74, if the inspection point is determined in the region of the width W within the whole pattern, selecting the position (1) according to the first evaluation value as the inspection point disables the defect to be detected so long as the inspection is carried out at the inspection point (1) even if the doctor streak and the like which is the same color (or invisible color on the inspection point (1) according to the printing order of the respective colors) as the pattern of the point (1) are caused at that position.

Figure 75:
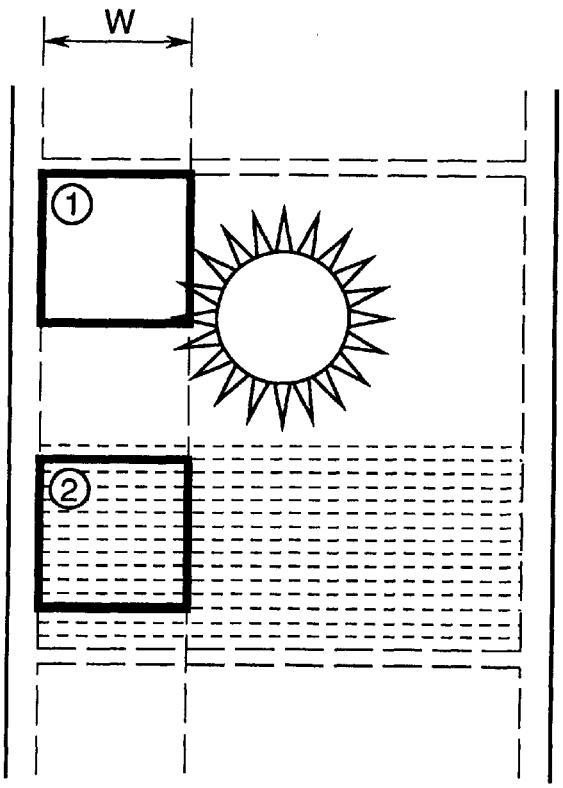
FIG. 75 is an explanatory view showing an inspection point when using two evaluation values in the same embodiment.

However, in this embodiment, as shown in FIG. 75, by use of the evaluation value which is different from the first evaluation value used for selecting the inspection point (1), particularly the second evaluation value (the above-mentioned partially divided pixel value) including the brightness in the region, another inspection point (2) can be selected, and then the selection carried out at the point (2). As a result, when the color at the inspection point (1) is blue and then the longitudinal continuous doctor streak also is blue or nearly blue, inputting the image at the inspection point (1) disables the doctor streak to be detected, whereas when the inspection point (2) is selected out of substantially white base, it enables the blue doctor streak to be surely detected. Therefore, using both the two evaluation values of the flatness, which are different in the characteristic as the image data from each other, results in the further improvement of the reliability of inspection.

Moreover, there are two inspection points for each of the regions in the above description; however, not less than three of inspection points obtained by using not less than three kinds of the evaluation values, respectively, may be used.

Also, in this embodiment, there is described the case in which the inspection points are selected separately based on each of a plurality kinds of the evaluation values; however, the optimum one inspection point may be selected for each of the longitudinal inspection regions by collectively judging the calculation result of a plurality of the evaluation values.

Figure 73:
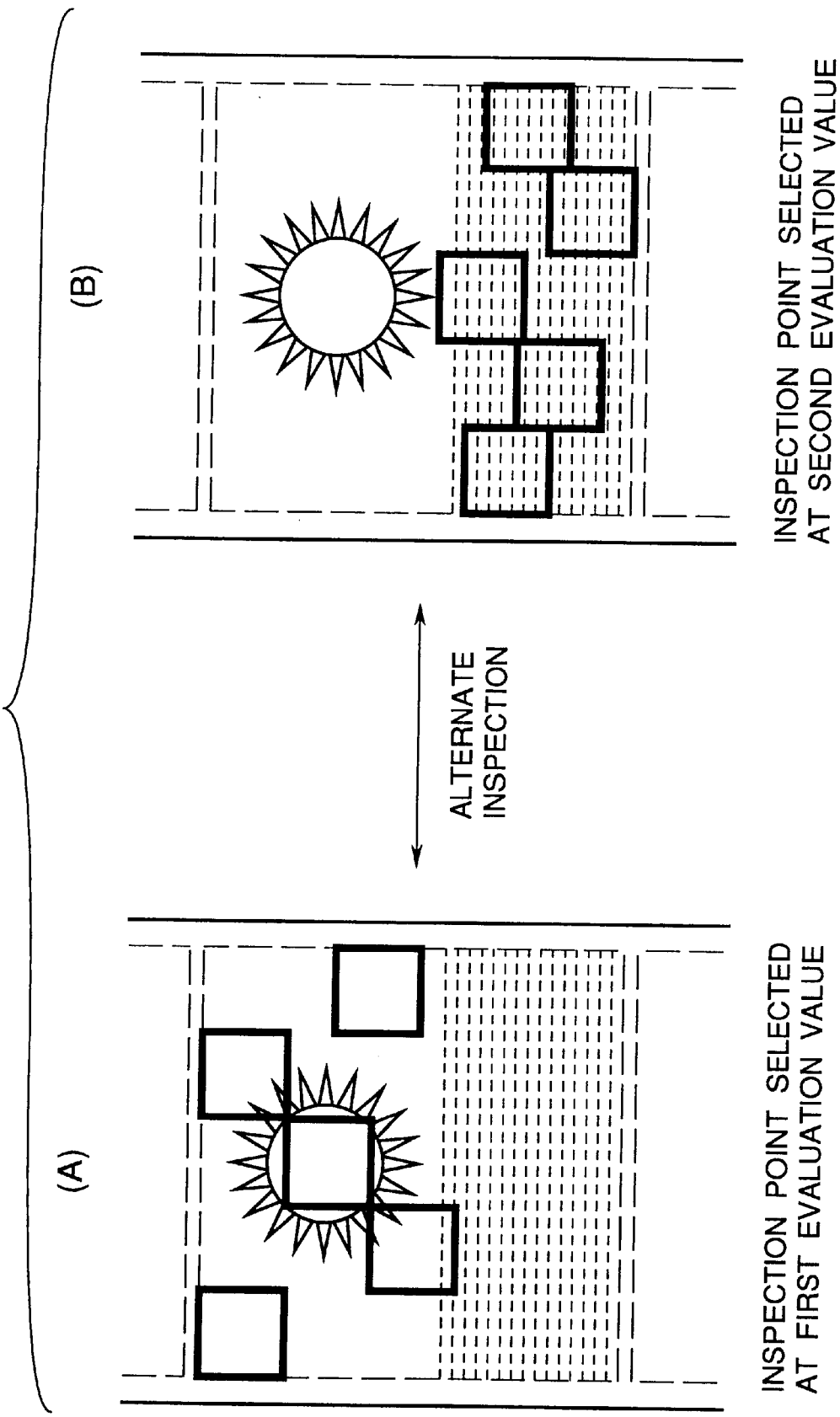
FIG. 73 are explanatory views showing a parallel procedure in the fifteenth embodiment.

In other words, in the case of two evaluation values in FIG. 73, one of the inspection points may be selected in the same inspection region by selecting the optimum method in FIGS. 73(A) and 73(B) without alternately inspecting two of the inspection points in the same inspection region, as shown in FIGS. 73(A) and 73(B).

Figure 76:
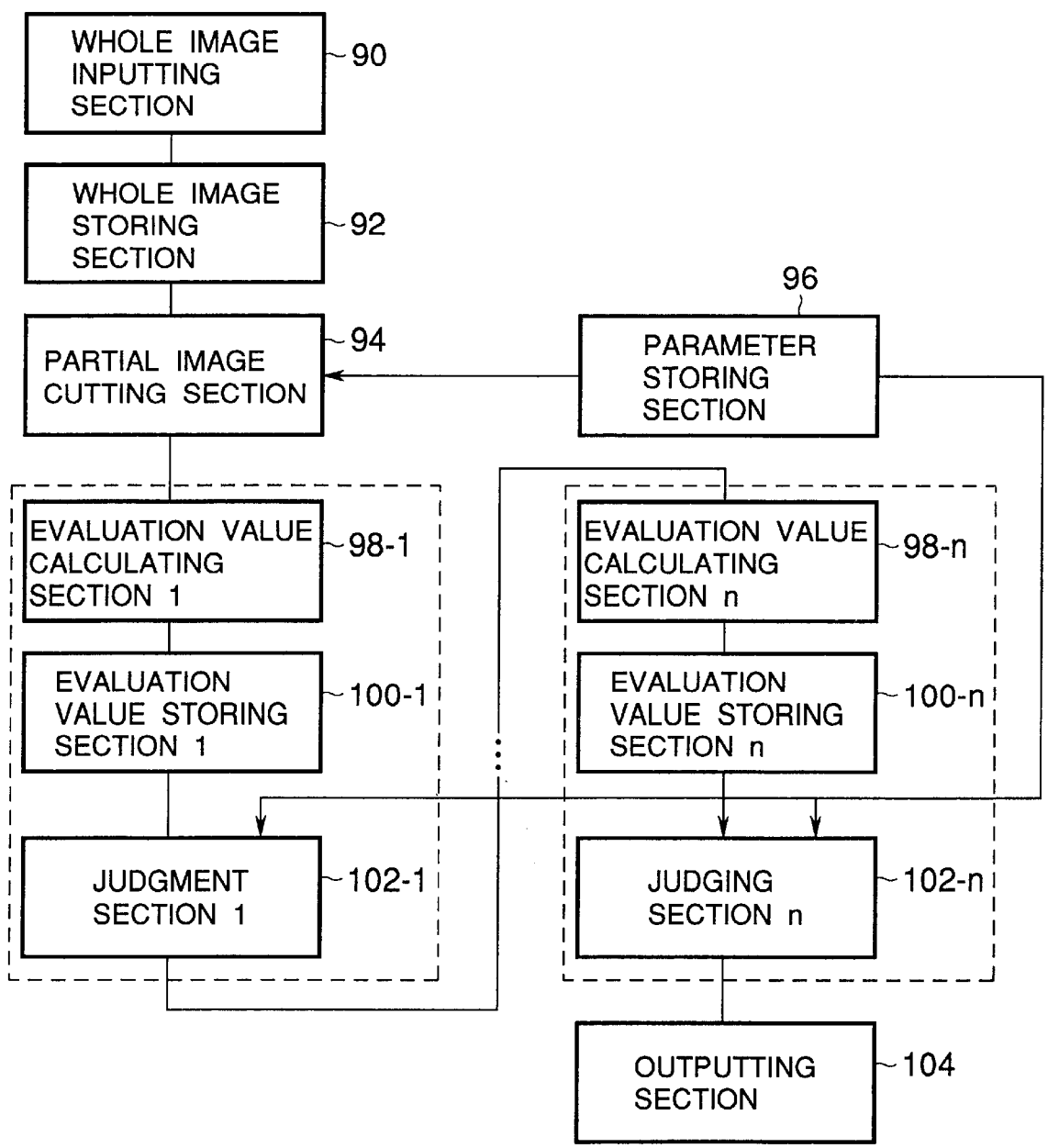
FIG. 76 is a block diagram showing the general arrangement of a plain region selecting device according to a sixteenth embodiment of the present invention.

FIG. 76 is a block diagram showing a general arrangement of a plain region selecting device according to a sixteenth embodiment of the present invention.

The plain region selecting device of this embodiment is substantially identical with that of the fourteenth embodiment, except that n (plural) of judgment sections 102, as designated by 102-1 to 102-n, are provided in addition to the evaluation value calculating sections 98 and the evaluation value storing section 100 of the fifteenth embodiments. Further, from the evaluation value calculating section 98 to the judgment section 102 are connected in series as one unit for each of the evaluation values, and then the outputting section 104 outputs the final judgment result.

In this embodiment, all the first to the n-th evaluation values can be subjected to the processings up to the judgment; therefore carrying out the judgment of the evaluation values from the first one, respectively, enables the candidature of the inspection point to be gradually restricted.

Accordingly, making the calculation of the evaluation value faster as the calculation processing is carried out faster enables the suitable inspection point to be rapidly selected.

Moreover, in this embodiment, there is concretely exemplified by three kinds of the evaluation values; however the present invention may not restricted to this example. Any other values may be employed insofar as it is capable of evaluating the flatness of the brightness value.

According to the above-mentioned fourteenth to the sixteenth embodiments, the portion having a small density difference can be input as the inspection image from the whole pattern on the printed matter so as to prevent the pattern portion included in the input inspection image from resulting in the mis-inspection of the fine defect.

The invention are described above concretely; however, the invention may not be restricted to the embodiments. The invention can be variously modified so long as they are not deviated from the gist of the invention.

For example, in the above embodiments, there are described the case in which the longitudinal streak-like defect is detected; however, the present invention may not restricted to this longitudinal one. The present invention may be employed for the case in which the defect is extended horizontally, or in an arbitrary direction such as an oblique direction although the calculation processing becomes difficult.

Industrial Availability

According to the present invention, the fine streak-like defect, which is low in contrast, can be surely detected from the image to be inspected including the pattern, when inspecting the printed matter.

What is claimed is:

1. An image inputting method for use in printed matter inspection of a printing condition of a pattern printed on a running original piece (W) by a print drum, in which a partial image of said pattern is input by a partially inputting camera which is capable of being moved in a width-direction of said original piece by a moving mechanism, said method comprising the steps of:

inputting a whole image including the whole pattern by a wholly inputting camera disposed apart from said partially inputting camera by a predetermined distance in a direction in which said original piece (W) flows;

coordinating, based on a relationship between a position, on said whole image, of said partial image which is capable of being input by said partially inputting camera and a width-directionwise reference point (S) set on said whole image, the width directionwise position on said whole image and the width-directionwise position on said moving mechanism with each other, when said partially inputting camera is located on an origin set on said moving mechanism;

positioning and then setting a photographing point, which is to be input by said partially inputting camera, on said whole image;

calculating a width-directionwise pixel number between said set photographing point and said width-directionwise reference point (S) on said whole image;

multiplying said calculated width-directionwise pixel number by a width-directionwise resolution of said whole image to calculate the width-directionwise moving amount on said moving mechanism;

moving said partially inputting camera up to a target position corresponding to said width-directionwise moving amount; and inputting said partial image at an arbitrary timing by said partially inputting camera moved up to said target position.

2. An image inputting method for use in a printed matter inspection, as set forth in claim 1, further comprising the steps of:

calculating a reference inputting timing in which said partially inputting camera is capable of inputting a pattern portion positioned at a flow directionwise reference point on said whole image, based on a flow-directionwise distance (L) between said wholly inputting camera and said partially inputting camera, and a print drum circumferential length (T);

positioning and then setting a photographing point, to be input by said partially inputting camera, on said whole image also with respect to a flow direction other than said width-direction;

calculating a flow-directionwise pixel number between said set photographing point and said flow-directionwise reference point, on said whole image;

calculating a waiting time from said reference inputting timing based on an actual distance obtained by multiplying said calculated flow-directionwise pixel number by a flow-directionwise resolution of said whole image; and inputting said partial image at a timing after the elapse of said waiting time from said reference input timing, by said partially inputting camera moved up to said target position by said moving mechanism.

3. An image inputting method for use in printed matter inspection, as set forth in claim 2, wherein:

said partially inputting camera is arranged at a portion upstream of said wholly inputting camera; and when said reference inputting timing is set by the pulse number output from a rotary encoder for detecting said flow-directionwise moving amount of said original piece (W), said reference inputting timing is set by a reference shift pulse B which is calculated by use of following equation:

$$B = (T - L \bmod T) \div R$$

(T: a print drum circumferential length, Lmod T: a remainder left when the distance L between said wholly inputting camera and said partially inputting camera is divided by said T value, R: pulse resolution of said rotary encoder).

4. An image inputting method, as set forth in claim 2, wherein:

said partially inputting camera is arranged at a portion downstream of said wholly inputting camera; and when said reference inputting timing is set by the pulse number output from a rotary encoder for detecting said flow-directionwise moving amount of said original piece (W), said reference inputting timing is set by a reference shift pulse B which is calculated by use of following equation:

$$B = (L \bmod T) \div R$$

(T: a print drum circumferential length, Lmod T: the remainder left when the distance L between said wholly inputting camera and said partially inputting camera is divided by said T value, R: pulse resolution of said rotary encoder).

5. An image inputting method for use in printed matter inspection, as set forth in claim 1, wherein:

said inputting of said whole image includes inputting said whole pattern as a reference image by said wholly inputting camera to carry out said process based on said reference image, and inputting said whole image as newest image suitably by said wholly inputting camera; and further comprising the step of:

amending the width-directionwise moving amount of said partially inputting camera based on a width-directionwise difference between said newest image and said reference image.

6. An image inputting method for use in a printed matter inspection, as set forth in claim 5, further comprising the steps of:

calculating a reference inputting timing in which said partially inputting camera is capable of inputting a pattern portion positioned at a flow-directionwise reference point on said reference image, based on a flow-directionwise distance (L) between said wholly inputting camera and said partially inputting camera, and a print drum circumferential length (T);

positioning and then setting a photographing point, to be input by said partially inputting camera, on said reference image also with respect to a flow direction other than said width-direction;

calculating a flow-directionwise pixel number between said set photographing point and said flow-directionwise reference point, on said reference image;

calculating a waiting time from said reference inputting timing based on an actual distance obtained by multiplying said calculated flow-directionwise pixel number by a flow-directionwise resolution of said reference image;

inputting said partial image at a timing after elapse of said waiting time from said reference input timing by said partially inputting camera moved up to said target position by said moving mechanism; and amending the partial image inputting timing of said partially inputting camera based on a flow-directionwise difference between said newest image and said reference image.

7. An image inputting method for use in printed matter inspection, as set forth in claim 6, wherein:

said partially inputting camera is arranged at a portion upstream of said wholly inputting camera; and when said reference inputting timing is set by a pulse number output from a rotary encoder for detecting said flow-directionwise moving amount of said original piece (W), said reference inputting timing is set by a reference shift pulse B which is calculated by use of following equation:

$$B = (T - L \bmod T) \div R$$

(T: a print drum circumferential length, Lmod T: remainder left when the distance L between said wholly inputting camera and said partially inputting camera is divided by said T value, R: pulse resolution of said rotary encoder).

8. An image inputting method for use in printed matter inspection, as set forth in claim 6, wherein:

said partially inputting camera is arranged at a portion downstream of said wholly inputting camera; and when said reference inputting timing is set by a pulse number output from a rotary encoder for detecting said flow-directionwise moving amount of said original piece (W), said reference inputting timing is set by a reference shift pulse B which is calculated by use of following equation:

$$B=(L \bmod T) \div R$$

(T: a print drum circumferential length, Lmod T: remainder left when the distance L between said wholly inputting camera and said partially inputting camera is divided by said T value, R: pulse resolution of said rotary encoder).

9. An image inputting device for use in printed matter inspection of a printing condition of a pattern printed on a running original piece (W) by a print drum in which a partial image of said pattern is input by a partially inputting camera which is capable of being moved in a width-direction of said original piece by a moving mechanism comprising:

a wholly inputting camera for inputting a whole image including a whole pattern, disposed apart from said partially inputting camera by a predetermined distance in a direction in which said original piece (W) flows;

means for coordinating, based on a relationship between a position, on said whole image, of said partial image which is capable of being input by said partially inputting camera and a width-directionwise reference point (S) set on said whole image, a width-directionwise position on said whole image and a width-directionwise position on said moving mechanism with each other, when said partially inputting camera is located on an origin set on said moving mechanism;

means for positioning and then setting a photographing point, which is to be input by said partially inputting camera, on said whole image;

means for calculating a width-directionwise pixel number between said set photographing point and said width-directionwise reference point (S) on said whole image;

means for multiplying said calculated width-directionwise pixel number by a width-directionwise resolution of said whole image to calculate the width-directionwise moving amount on said moving mechanism;

means for moving said partially inputting camera up to a target position corresponding to said width-directionwise moving amount; and means for inputting said partial image at an arbitrary timing by said partially inputting camera moved up to said target position.

10. An image inputting device for use in a printed matter inspection, as set forth in claim 9, further comprising:

means for calculating a reference inputting timing in which said partially inputting camera is capable of inputting a pattern portion positioned at a flow-directionwise reference point on said whole image, based on a flow-directionwise distance (L) between said wholly inputting camera and said partially inputting camera, and a print drum circumferential length (T);

means for positioning and then setting a photographing point, to be input by said partially inputting camera, on said whole image also with respect to a flow direction other than said width-direction;

means for calculating a flow-directionwise pixel number between said set photographing point and said flow-directionwise reference point, on said whole image;

means for calculating a waiting time from said reference inputting timing based on an actual distance obtained by multiplying said calculated flow-directionwise pixel number by a flow-directionwise resolution of said whole image; and means for inputting said partial image at a timing after the elapse of said waiting time from said reference input timing by said partially inputting camera moved up to said target position by said moving mechanism.

11. An image inputting device for use in printed matter inspection, as set forth in claim 10, wherein:

said partially inputting camera is arranged at a portion upstream of said wholly inputting camera; and when said reference inputting timing is set by a pulse number output from a rotary encoder for detecting said flow-directionwise moving amount of said original piece (W), said reference inputting timing is set by a reference shift pulse B which is calculated by use of following equation:

$$B=(T-L \bmod T) \div R$$

(T: a print drum circumferential length, Lmod T: remainder left when the distance L between said wholly inputting camera and said partially inputting camera is divided by said T value, R: pulse resolution of said rotary encoder).

12. An image inputting device for use in printed matter inspection, as set forth in claim 10, wherein:

said partially inputting camera is arranged at a portion downstream of said wholly inputting camera; and when said reference inputting timing is set by a pulse number output from a rotary encoder for detecting said flow-directionwise moving amount of said original piece (W), said reference inputting timing is set by a reference shift pulse B which is calculated by use of following equation:

$$B=(L \bmod T) \div R$$

(T: a print drum circumferential length, Lmod T: remainder left when the distance L between said wholly inputting camera and said partially inputting camera is divided by said T value, R: pulse resolution of said rotary encoder).

13. An image inputting device for use in printed matter inspection, as set forth in claim 9, wherein:

said means for inputting said whole image inputs said whole pattern as a reference image by said wholly inputting camera to carry out said process based on said reference image, and inputs said whole image as a newest image suitably by said wholly inputting camera; and further comprising:

means for amending the width-directionwise moving amount of said partially inputting camera based on a width-directionwise difference between said newest image and said reference image.

14. An image inputting device for use in a printed matter inspection, as set forth in claim 13, further comprising:

means for calculating a reference inputting timing in which said partially inputting camera is capable of inputting a pattern portion positioned at a flow-directionwise reference point on said reference image, based on a flow-directionwise distance (L) between said wholly inputting camera and said partially inputting camera, and a print drum circumferential length (T);

means for positioning and then setting a photographing point, to be input by said partially inputting camera, on said reference image also with respect to a flow direction other than said width-direction;

means for calculating a flow-directionwise pixel number between said set photographing point and said flow-directionwise reference point, on said reference image;

means for calculating a waiting time from said reference inputting timing based on an actual distance obtained by multiplying said calculated flow-directionwise pixel number by a flow-directionwise resolution of said reference image;

means for inputting said partial image at a timing after elapse of said waiting time from said reference input timing by said partially inputting camera moved up to said target position by said moving mechanism;

means for amending the partial image inputting timing of said partially inputting camera based on a flow-directionwise difference between said newest image and said reference image.

15. An image inputting device for use in printed matter inspection, as set forth in claim 14, wherein:

said partially inputting camera is arranged at a portion upstream of said wholly inputting camera; and when said reference inputting timing is set by pulse number output from a rotary encoder for detecting said flow-directionwise moving amount of said original piece (W), said reference inputting timing is set by a reference shift pulse B which is calculated by use of following equation:

$$B = (T - L \bmod T) \div R$$

(T: a print drum circumferential length, Lmod T: remainder left when the distance L between said wholly inputting camera and said partially inputting camera is divided by said T value, R: pulse resolution of said rotary encoder).

16. An image inputting device for use in printed matter inspection, as set forth in claim 14, wherein:

said partially inputting camera is arranged at a portion downstream of said wholly inputting camera; and when said reference inputting timing is set by pulse number output from a rotary encoder for detecting said flow-directionwise moving amount of said original piece (W), said reference inputting timing is set by a reference shift pulse B which is calculated by use of following equation:

$$B = (L \bmod T) \div R$$

(T: a print drum circumferential length, Lmod T: remainder left when the distance L between said wholly inputting camera and said partially inputting camera is divided by said T value, R: pulse resolution of said rotary encoder).

* * * * *